(12) United States Patent
Holloway et al.

(10) Patent No.: US 9,009,330 B2
(45) Date of Patent: Apr. 14, 2015

(54) INTERNET-BASED PROXY SERVICE TO LIMIT INTERNET VISITOR CONNECTION SPEED

(75) Inventors: Lee Hahn Holloway, Santa Cruz, CA (US); Matthew Browning Prince, San Francisco, CA (US); Ian Gerald Pye, Santa Cruz, CA (US)

(73) Assignee: Cloudflare, Inc., San Francisco, CA (US)

( * ) Notice: Subject to any disclaimer, the term of this patent is extended or adjusted under 35 U.S.C. 154(b) by 814 days.

(21) Appl. No.: 12/939,919

(22) Filed: Nov. 4, 2010

(65) Prior Publication Data

US 2012/0117267 A1    May 10, 2012
US 2015/0032903 A9    Jan. 29, 2015

Related U.S. Application Data

(60) Provisional application No. 61/397,721, filed on Apr. 1, 2010.

(51) Int. Cl.
   *G06F 15/16*    (2006.01)
   *G06F 21/00*    (2013.01)
   *H04L 29/06*    (2006.01)

(52) U.S. Cl.
   CPC .............. *G06F 15/16* (2013.01); *G06F 21/00* (2013.01); *H04L 63/1441* (2013.01)

(58) Field of Classification Search
   USPC ......................................................... 709/227
   See application file for complete search history.

(56) References Cited

U.S. PATENT DOCUMENTS

| | | | |
|---|---|---|---|
| 5,826,025 A | 10/1998 | Gramlich | |
| 6,104,716 A | 8/2000 | Crichton et al. | |
| 6,108,703 A | 8/2000 | Leighton et al. | |
| 6,170,012 B1 * | 1/2001 | Coss et al. | 709/229 |
| 6,286,046 B1 * | 9/2001 | Bryant | 709/224 |
| 6,353,855 B1 | 3/2002 | Hendren, III | |
| 6,389,462 B1 | 5/2002 | Cohen et al. | |
| 6,654,789 B1 | 11/2003 | Bliss et al. | |
| 6,820,133 B1 | 11/2004 | Grove et al. | |
| 7,058,633 B1 | 6/2006 | Gnagy et al. | |
| 7,103,651 B2 | 9/2006 | Bohannon et al. | |
| 7,127,493 B1 | 10/2006 | Gautier | |
| 7,178,166 B1 | 2/2007 | Taylor et al. | |

(Continued)

OTHER PUBLICATIONS

Non-Final Office Action, U.S. Appl. No. 13/251,004, dated Dec. 6, 2011, 11 pages.

(Continued)

*Primary Examiner* — Alicia Baturay
(74) *Attorney, Agent, or Firm* — Blakely, Sokoloff, Taylor & Zafman LLP

(57) ABSTRACT

A proxy server for limiting Internet connection speed of visitors that pose a threat. The proxy server receives from a client device a request to perform an action on an identified resource that is hosted at an origin server for a domain. The proxy server receives the request as a result of a DNS request for the domain resolving to the proxy server. The origin server is one of multiple origin servers that belong to different domains that resolve to the proxy server and are owned by different entities. The proxy server analyzes the request to determine whether a visitor belonging to the request poses a threat. If the proxy server determines that the visitor poses a threat, the proxy server reduces the speed at which the proxy server processes the request while keeping a connection to the client device open.

12 Claims, 28 Drawing Sheets

(56) References Cited

U.S. PATENT DOCUMENTS

| | | | |
|---|---|---|---|
| 7,231,458 B2 | 6/2007 | Tenereillo et al. | |
| 7,240,100 B1 | 7/2007 | Wein et al. | |
| 7,269,649 B1 | 9/2007 | Brown et al. | |
| 7,330,908 B2 | 2/2008 | Jungck | |
| 7,366,793 B2 | 4/2008 | Kenner et al. | |
| 7,373,500 B2 | 5/2008 | Ramelson et al. | |
| 7,392,325 B2 | 6/2008 | Grove et al. | |
| 7,395,355 B2 | 7/2008 | Afergan et al. | |
| 7,409,708 B2* | 8/2008 | Goodman et al. | 726/13 |
| 7,418,733 B2 | 8/2008 | Connary et al. | |
| 7,424,741 B1* | 9/2008 | Grimm et al. | 726/22 |
| 7,430,607 B2* | 9/2008 | Bolles et al. | 709/229 |
| 7,454,457 B1 | 11/2008 | Lowery et al. | |
| 7,467,408 B1* | 12/2008 | O'Toole, Jr. | 726/22 |
| 7,480,699 B2* | 1/2009 | Alam et al. | 709/217 |
| 7,508,767 B2* | 3/2009 | Shinomiya | 370/242 |
| 7,562,153 B2 | 7/2009 | Biliris et al. | |
| 7,584,500 B2 | 9/2009 | Dillon et al. | |
| 7,606,915 B1 | 10/2009 | Calinov et al. | |
| 7,647,424 B2* | 1/2010 | Kim et al. | 709/238 |
| 7,684,394 B1 | 3/2010 | Cutbill et al. | |
| 7,783,741 B2* | 8/2010 | Hardt | 709/224 |
| 7,827,311 B2* | 11/2010 | Cooley et al. | 709/245 |
| 7,849,502 B1 | 12/2010 | Bloch et al. | |
| 7,849,507 B1* | 12/2010 | Bloch et al. | 726/22 |
| 7,895,653 B2 | 2/2011 | Calo et al. | |
| 7,904,959 B2* | 3/2011 | Sidiroglou et al. | 726/22 |
| 7,936,682 B2* | 5/2011 | Singh et al. | 370/241 |
| 7,945,678 B1 | 5/2011 | Skene | |
| 8,015,605 B2* | 9/2011 | Yegneswaran et al. | 726/22 |
| 8,024,468 B2 | 9/2011 | Raciborski et al. | |
| 8,065,722 B2* | 11/2011 | Barford et al. | 726/14 |
| 8,112,471 B2 | 2/2012 | Wei et al. | |
| 8,127,356 B2* | 2/2012 | Thiele et al. | 726/23 |
| 8,141,132 B2 | 3/2012 | Oliver et al. | |
| 8,201,081 B2 | 6/2012 | Stroe et al. | |
| 8,275,790 B2 | 9/2012 | Fredricksen et al. | |
| 8,286,246 B2* | 10/2012 | Zhou et al. | 726/24 |
| 8,375,449 B1* | 2/2013 | Zhou et al. | 726/24 |
| 8,381,292 B1* | 2/2013 | Warner et al. | 726/22 |
| 8,443,450 B1* | 5/2013 | Zhou et al. | 726/24 |
| 8,468,597 B1* | 6/2013 | Warner et al. | 726/22 |
| 2002/0042841 A1* | 4/2002 | Nishio et al. | 709/245 |
| 2002/0087696 A1 | 7/2002 | Byrnes | |
| 2002/0124101 A1 | 9/2002 | Schaeck | |
| 2002/0133509 A1 | 9/2002 | Johnston et al. | |
| 2002/0165466 A1 | 11/2002 | Givens et al. | |
| 2003/0014539 A1 | 1/2003 | Reznick | |
| 2003/0023754 A1 | 1/2003 | Eichstadt et al. | |
| 2003/0055994 A1 | 3/2003 | Herrmann et al. | |
| 2003/0069968 A1 | 4/2003 | O'Neil et al. | |
| 2003/0079027 A1 | 4/2003 | Slocombe et al. | |
| 2003/0135548 A1 | 7/2003 | Bushkin | |
| 2003/0177196 A1 | 9/2003 | Bhasin et al. | |
| 2003/0208570 A1 | 11/2003 | Lapidous | |
| 2003/0208600 A1 | 11/2003 | Cousins | |
| 2003/0225873 A1 | 12/2003 | Wade | |
| 2004/0006710 A1 | 1/2004 | Pollutro et al. | |
| 2004/0044912 A1 | 3/2004 | Connary et al. | |
| 2004/0059951 A1 | 3/2004 | Pinkas et al. | |
| 2005/0005027 A1 | 1/2005 | Drouet et al. | |
| 2005/0018618 A1 | 1/2005 | Mualem et al. | |
| 2005/0108517 A1 | 5/2005 | Dillon | |
| 2005/0114453 A1 | 5/2005 | Hardt | |
| 2005/0120113 A1 | 6/2005 | Bunch et al. | |
| 2005/0120201 A1 | 6/2005 | Benaloh et al. | |
| 2005/0188079 A1 | 8/2005 | Motsinger et al. | |
| 2005/0188080 A1 | 8/2005 | Motsinger et al. | |
| 2005/0188221 A1 | 8/2005 | Motsinger et al. | |
| 2006/0095578 A1 | 5/2006 | Paya et al. | |
| 2006/0101516 A1* | 5/2006 | Sudaharan et al. | 726/23 |
| 2006/0136374 A1* | 6/2006 | Shelest et al. | 707/3 |
| 2006/0218289 A1 | 9/2006 | Assad | |
| 2006/0253458 A1 | 11/2006 | Dixon et al. | |
| 2006/0288119 A1 | 12/2006 | Kim et al. | |
| 2007/0022082 A1 | 1/2007 | Azagury et al. | |
| 2007/0039053 A1 | 2/2007 | Dvir | |
| 2007/0097976 A1* | 5/2007 | Wood et al. | 370/392 |
| 2007/0101405 A1 | 5/2007 | Engle et al. | |
| 2007/0130151 A1 | 6/2007 | Wiles | |
| 2007/0143496 A1 | 6/2007 | Golovinsky et al. | |
| 2007/0180147 A1 | 8/2007 | Leigh | |
| 2007/0186282 A1* | 8/2007 | Jenkins | 726/22 |
| 2007/0198531 A1 | 8/2007 | Lim et al. | |
| 2007/0255821 A1 | 11/2007 | Ge et al. | |
| 2007/0266145 A1 | 11/2007 | Nesbitt et al. | |
| 2007/0271614 A1* | 11/2007 | Capalik | 726/23 |
| 2008/0016570 A1* | 1/2008 | Capalik | 726/23 |
| 2008/0072293 A1 | 3/2008 | D'Urso | |
| 2008/0077982 A1 | 3/2008 | Hayler et al. | |
| 2008/0109657 A1 | 5/2008 | Bajaj et al. | |
| 2008/0183573 A1 | 7/2008 | Muschetto | |
| 2008/0282338 A1* | 11/2008 | Beer | 726/12 |
| 2009/0089119 A1 | 4/2009 | Ranjan | |
| 2009/0089417 A1 | 4/2009 | Giffin et al. | |
| 2009/0144421 A1 | 6/2009 | Bunch | |
| 2009/0144829 A1 | 6/2009 | Grigsby et al. | |
| 2009/0287653 A1 | 11/2009 | Bennett | |
| 2009/0292925 A1 | 11/2009 | Meisel | |
| 2009/0300162 A1 | 12/2009 | Demarie et al. | |
| 2009/0300206 A1 | 12/2009 | Todorov | |
| 2009/0328208 A1* | 12/2009 | Peters | 726/22 |
| 2010/0031315 A1 | 2/2010 | Feng et al. | |
| 2010/0067377 A1* | 3/2010 | Wang et al. | 370/230 |
| 2010/0076851 A1 | 3/2010 | Jewell | |
| 2010/0077444 A1 | 3/2010 | Forristal | |
| 2010/0138921 A1* | 6/2010 | Na et al. | 726/22 |
| 2010/0169465 A1 | 7/2010 | Amidon et al. | |
| 2010/0180333 A1 | 7/2010 | Bono et al. | |
| 2010/0229223 A1 | 9/2010 | Shepard et al. | |
| 2010/0242106 A1 | 9/2010 | Harris et al. | |
| 2010/0250779 A1 | 9/2010 | B'Far et al. | |
| 2010/0325287 A1 | 12/2010 | Jagadeeswaran et al. | |
| 2011/0137973 A1 | 6/2011 | Wei et al. | |
| 2011/0209076 A1 | 8/2011 | Saxena et al. | |
| 2011/0282997 A1* | 11/2011 | Prince et al. | 709/226 |
| 2011/0283359 A1 | 11/2011 | Prince et al. | |
| 2011/0296509 A1 | 12/2011 | Todorov | |
| 2012/0022942 A1* | 1/2012 | Holloway et al. | 705/14.49 |
| 2012/0023090 A1* | 1/2012 | Holloway et al. | 707/709 |
| 2012/0030559 A1 | 2/2012 | Manion et al. | |
| 2012/0066759 A1 | 3/2012 | Chen et al. | |
| 2012/0069845 A1* | 3/2012 | Carney et al. | 370/392 |
| 2012/0096558 A1 | 4/2012 | Evrard | |
| 2012/0116896 A1* | 5/2012 | Holloway et al. | 705/14.73 |
| 2012/0117239 A1* | 5/2012 | Holloway et al. | 709/226 |
| 2012/0117458 A1* | 5/2012 | Holloway et al. | 715/234 |
| 2012/0117641 A1* | 5/2012 | Holloway et al. | 726/12 |
| 2012/0117649 A1* | 5/2012 | Holloway et al. | 726/24 |
| 2012/0254333 A1 | 10/2012 | Chandramouli et al. | |
| 2013/0145421 A1 | 6/2013 | Kougiouris et al. | |

OTHER PUBLICATIONS

Non-Final Office Action, U.S. Appl. No. 12/939,902, dated Jan. 23, 2012, 10 pages.

Non-Final Office Action, U.S. Appl. No. 13/251,001, dated Jan. 23, 2012, 11 pages.

Final Office Action, U.S. Appl. No. 13/251,004, dated May 10, 2012, 15 pages.

Final Office Action, U.S. Appl. No. 13/251,001, dated Jun. 1, 2012, 10 pages.

Notice of Allowance, U.S. Appl. No. 12/939,902, dated Jun. 8, 2012, 8 pages.

Non-Final Office Action, U.S. Appl. No. 12/939,923, dated Jun. 12, 2012, 13 pages.

Non-Final Office Action, U.S. Appl. No. 12/939,926, dated Aug. 23, 2012, 13 pages.

Notice of Allowance, U.S. Appl. No. 12/939,902, dated Sep. 27, 2012, 9 pages.

Non-Final Office Action, U.S. Appl. No. 12/939,931, dated Oct. 1, 2012, 26 pages.

(56) References Cited

OTHER PUBLICATIONS

Notice of Allowance, U.S. Appl. No. 12/939,935, dated Dec. 21, 2012, 10 pages.
Non-Final Office Action, U.S. Appl. No. 13/078,900, dated Jan. 3, 2013, 17 pages.
Final Office Action, U.S. Appl. No. 12/939,923, dated Jan. 7, 2013, 15 pages.
"A quick guide to SSI (server side includes)," 2005, 5 pages, downloaded from http://www.easywebtutorials.com/tutorials/ssi.html.
Notice of Allowance, U.S. Appl. No. 12/939,935, dated Sep. 20, 2013, 10 pages.
Final Office Action, U.S. Appl. No. 12/939,926, dated Aug. 1, 2013, 18 pages.
Enhanced Security Web Proxy and Reverse Web Proxy; Intellectual Property (IP) Publication, http://ip.com/pdf/ipcompad/IPCOM000176082D, Nov. 4, 2008.
Non-Final Office Action, U.S. Appl. No. 13/078,899, dated Jul. 22, 2013, 14 pages.
Final Office Action, Application No. 12/939,931, dated Jul. 11, 2013, 32 pages.
Final Office Action, U.S. Appl. No. 12/939,926, dated Feb. 13, 2013, 20 pages.
Notice of Allowance, U.S. Appl. No. 13/251,001, dated Mar. 15, 2013, 10 pages.
Non-Final Office Action, U.S. Appl. No. 12/939,931, dated Mar. 13, 2013, 27 pages.
Non-Final Office Action, U.S. Appl. No. 13/078,899, dated Mar. 13, 2013, 12 pages.
Roberts P., Phishing Attacks Use Word as Bait, Inforworld, May 29, 2006; 28(22):18, Available from: Internet and Personal Computing Abstracts, Ipswich, MA., Accessed Mar. 4, 2013, p. 18.
Non-Final Office Action, U.S. Appl. No. 12/939,908, dated Mar. 7, 2013, 22 pages.
Non-Final Office Action, U.S. Appl. No. 13/078,900, dated May 16, 2013, 19 pages.
Notice of Allowance, U.S. Appl. No. 13/251,001, dated Jun. 25, 2013, 11 pages.
Notice of Allowance, U.S. Appl. No. 12/939,935, dated Feb. 3, 2014, 6 pages.
Non-Final Office Action, U.S. Appl. No. 12/939,931, dated Oct. Dec. 4, 2013, 36 pages.
Non-Final Office Action, U.S. Appl. No. 13/251,004, dated Mar. 5, 2014, 15 pages.
Non-Final Office Action, U.S. Appl. No. 12/939,923, dated Feb. 11, 2014, 15 pages.
Non-Final Office Action, U.S. Appl. No. 13/078,900, dated Feb. 4, 2014, 15 pages.
Final Office Action, U.S. Appl. No. 13/078,899, dated Dec. 19, 2013, 13 pages.
Notice of Allowance, U.S. Appl. No. 12/939,931, dated Mar. 27, 2014, 10 pages.
Notice of Allowance, U.S. Appl. No. 13/078,900, dated May 27, 2014, 2014, 19 pages.
Final Office Action, U.S. Appl. No. 12/939,923, dated Sep. 19, 2014, 16 pages.
Final Office Action, U.S. Appl. No. 13/251,004, dated Sep. 19, 2014, 16 pages.
Non-Final Office Action, U.S. Appl. No. 13/078,899, dated Oct. 30, 2014, 12 pages.
Non-Final Office Action, U.S. Appl. No. 14/066,557, dated Nov. 3, 2014, 14 pages.
Notice of Allowance, U.S. Appl. No. 12/939,931, dated Oct. 9, 2014, 11 pages.

* cited by examiner

THREAT REPORTING INTERFACE 2310

| VISITOR #1<br>IP Addr/User-Agent/Country/Previous Visits<br>Pages Visited:     Posts<br>- Page A          - Post X<br>- Page B          - Post Y | (THREAT 2325) (NOT THREAT 2330) |
|---|---|
| VISITOR #2<br>IP Addr/User-Agent/Country/Previous Visits<br>Pages Visited:     Posts<br>- Page C          - Post Z | (THREAT 2325) (NOT THREAT 2330) |

{ VISITOR STATISTICS 2315 }

THREAT FORM 2410

Threat Type
- ⦿ Attack POST
- ○ Excessive Bandwidth
- ○ Vulnerability
- ○ Other:

(SUBMIT 2415)

FIG. 24

INTERNET-BASED PROXY SERVICE TO LIMIT INTERNET VISITOR CONNECTION SPEED

CROSS-REFERENCE TO RELATED APPLICATIONS

This application claims the benefit of U.S. Provisional Application No. 61/397,721, filed Apr. 1, 2010, which is hereby incorporated by reference.

BACKGROUND

1. Field

Embodiments of the invention relate to the field of network services; and more specifically to Internet-based proxy security services.

2. Background

Internet servers, by their nature, are accessible via the Internet and are capable of being compromised and/or attacked. These attacks include, among other things, blog or other comment spam POSTs, SQL injection POSTs, cross-site scripting POSTs, denial of service (DoS) attacks, query floods, excessive bandwidth use, or requests that exploit other known weakness of the servers. Attacks may be implemented using botnets (or sometimes referred to as bots), which are typically infected personal computers running on home or office networks. The personal computers may be infected in a number of ways, for example by visiting a site with malicious code, executing software that installs malicious code, etc. The legitimate users of these infected personal computers are often unaware of the infection and their use in a botnet attack.

Web application firewalls (WAFs), which are either hardware devices installed in a network operator's data center or software that is installed on the web server, may monitor traffic routed to the web server in order to detect and stop potential attacks. Unlike traditional firewalls that focus on the network layer, web application firewalls perform deep packet inspection to look for attack signatures at the application level.

BRIEF DESCRIPTION OF THE DRAWINGS

The invention may best be understood by referring to the following description and accompanying drawings that are used to illustrate embodiments of the invention. In the drawings:

FIG. 23 is a block diagram illustrating an exemplary threat reporting interface for customers according to one embodiment of the invention;

FIG. 24 is a block diagram illustrating an exemplary threat type form according to one embodiment of the invention;

DETAILED DESCRIPTION

Figure 1:
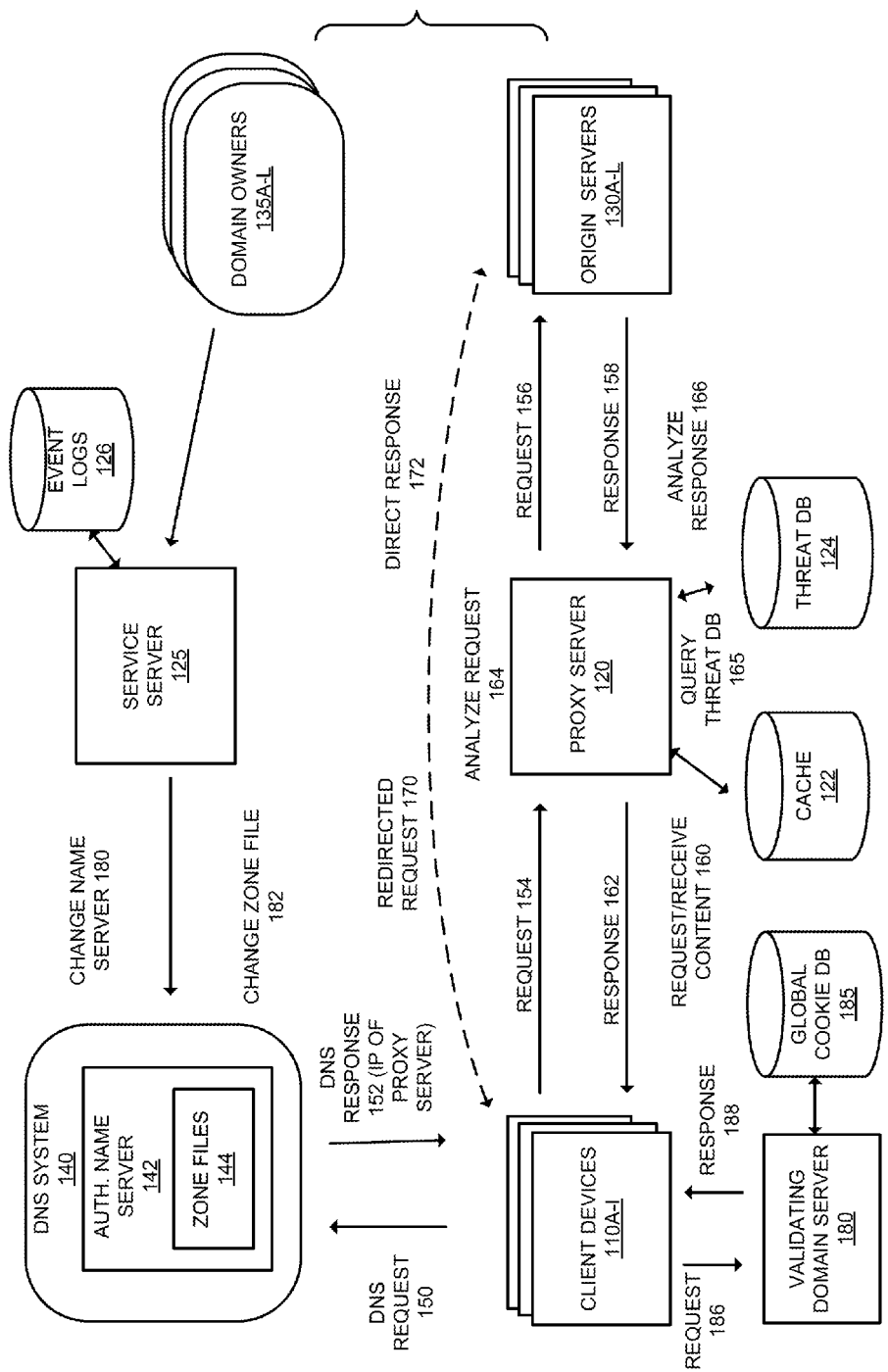
FIG. 1 illustrates an exemplary architecture of an Internet-based proxy service according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Methods and apparatuses for providing Internet-based proxy services (hereinafter "service") is described. The service, which is available over the Internet and does not require customers (e.g., owners of a domain and/or personnel working on behalf of domain owner to install hardware or software, allows customers (e.g., owners of a domain)) to protect their network against Internet-based threats; empower fast, reliable, and robust performance from their network resources; assist in protecting the Internet community by proactively stopping botnets, cleaning viruses, trojans, and worms; or any combination thereof. Unlike other products that require installation of hardware or software, the service described herein exists at the network level (and thus does not require customers to install hardware or software). In some embodiments, the service provides performance services for the customers. For example, the service can participate in a content delivery network (CDN) and dynamically cache customer's files closer to visitors. As used herein, a visitor is an entity causing an instance of a client network application (e.g., a web browser, an FTP (File Transfer Protocol) client, an SSH (Secure Shell) client, a Telnet client, etc.) implementing a network protocol to access content through a network (e.g., the Internet). A visitor can be a human user or a bot (a software application that automatically performs Internet related tasks). Examples of bots include search engines or other crawlers (e.g., email harvesters, indexers, etc.).

In some embodiments, customers register for the service by changing their authoritative name server to an authoritative name server of the service, and also changing the IP address(es) that resolve to their origin server(s) (which hosts content of their domain) to point to a proxy server of the service. In other embodiments, customers of the service change individual DNS records to point to a proxy server (or point to other domain(s) that point to a proxy server of the service). For example, the customers may change their DNS records to point to a CNAME that corresponds with a proxy server of the service. Regardless of the embodiment, requests from visitors for actions to be performed on identified resources of the customer's domain are received at the proxy server.

The proxy server analyzes the requests and performs one or more request related actions. For example, for each request, analyzing the request includes performing one or more of the following: determining whether the visitor making the request is allowed access to the requested content; determining whether the visitor poses an Internet security threat (e.g., is a bot, is infected with a virus or other vulnerability, etc.); determines whether the request itself poses an Internet security threat (e.g., an SQL injection attack, etc.); determines whether the request is malformed; determines the type and/or size of the requested content; determines whether the origin server is offline; and determines whether the requested content is available in cache. Based on the results of the analyzing, the proxy server takes appropriate request related actions. For example, the proxy server may respond to the request locally (e.g., by blocking the request, displaying an indication that the visitor may be infected with a virus, worm, or other vulnerability, serving cached content, etc.) and may transmit the request to the appropriate origin server for processing.

The responses from the origin servers may also pass through the proxy server, which may analyze the response and perform one or more response related actions. For example, the proxy server may perform one or more of the following when analyzing the response: determining whether the response poses an Internet security threat (e.g., whether the content includes a virus, worm, or other vulnerability); determining whether the response includes one or more elements that are to be excluded from being delivered to the visitor; determining whether to modify element(s) of the response; determining whether to obfuscate elements of the response (e.g., obfuscating an email address such that it will be displayed on the rendered page but obfuscated from the page source); determining whether to add content to the response; and determining whether to cache the contents. Based the results of the analyzing, the proxy server takes appropriate response related actions.

FIG. 1 illustrates an exemplary architecture of the service according to one embodiment of the invention. The domain owners 135A-L are customers of the service and register their respective domains for the service. For example, the authoritative name servers for each the domains of the domain owners 135A-L are changed to the authoritative name server 142 of the service at operation 180. It should be understood that the backup authoritative name servers serving the domains may also be changed to an authoritative name server of the service. The zone file records for the domains are also changed such that DNS resolution requests for the domains owned by the domain owners 135A-L, which correspond with the origin servers 130A-L respectively, resolve to the proxy server 120, at operation 182. In one embodiment, customers (e.g., the domain owners 135A-L or other entity (e.g., web administrators) on behalf of the domain owners 135A-L) may use the service server 125 to change their authoritative name server to the authoritative name server 142 and change their zone file to have their domain point to the service proxy server (herein after "proxy server") 120.

The service server 125, operated by the service, provides a set of tools and interfaces for the domain owners 135A-L and is accessible over the Internet. For example, the service server 125, among other things, allows the domain owners 135A-L to register for the service, view statistics/logs of events, and report suspicious events. The service server 125 includes tools to assist the domain owners 135A-L in changing their authoritative name servers and zone file record. It should be understood, however, that the domain owners 135A-L may change their authoritative name server and zone file without use of the service server 125 (i.e., they may directly change the authoritative name server and zone file).

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin servers 130A-L. Accordingly, when the DNS system 140 resolves a request for a domain corresponding to one of the origin servers 130A-L, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

The client devices 110A-I are computing devices (e.g., laptops, workstations, smartphones, palm tops, mobile phones, tablets, gaming systems, set-top boxes, etc.) that are capable of accessing network resources (e.g., they include software such as web browsers that are capable of accessing network resources). Users at the client devices 110A-I request network resources (e.g., HTML pages, images, word processing documents, PDF files, movie files, music files, or other computer files) through a client network application such as a web browser or other application (e.g., FTP client, SSH client, Telnet client, etc.). The client devices 110A-I may be susceptible to being infected with viruses, worms, or other vulnerabilities and may be part of a botnet network.

The origin servers 130A-L are computing devices that serve network resources (e.g., HTML pages, images, word processing documents, PDF files, movie files, music files, or other computer files). The origin servers 130A-L respond to requests for network resources (e.g., from an HTTP request, FTP request, telnet request, etc.). Although not illustrated in FIG. 1, it should be understood that the network resources of the origin servers 130A-L may be stored separately from the device that responds to the requests.

The proxy server 120 is a computing device that is situated between the client devices 110A-I and the origin servers 130A-L and provides many of the features of the service. Certain network traffic passes through the proxy server 120 (traffic sent from the client devices 110A-I and/or traffic sent from the origin servers 130A-L). Based on at least in part on this traffic, the proxy server 120 provides a set of one or more services for the benefit of the customers and/or users of the client devices 110A-I. For example, the proxy server 120 may provide one or more of the following services: participation in a content delivery network by providing cached files of the origin servers 130A-L (e.g., through the cache 122); providing cached copies of files (if available) of the origin servers 130A-L during periods when they are offline (e.g., through the cache 122); restricting access to the origin servers 130A-L (which may be based on a set of one or more factors such as the characteristics of the requester, the type of request, and the content of the request); scanning the traffic (sent from a client device 110 and/or sent from an origin servers 130) for vulnerabilities (e.g., virus, worm, etc.) and acting accordingly (e.g., blocking the request, alerting the sender and/or receiver of the vulnerability, throttling the connection to slow down the request, etc.); and modifying the content of the request and/or the reply (which may be based on a set of one or more factors such as the content of the request, the content of the reply, and the characteristics of the requester).

While FIG. 1 illustrates a single proxy server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

In some embodiments, the proxy server 120 maintains a log of events. For example, the proxy server 120 logs each request that is received as well as each response that is transmitted to a visitor client device. In addition, in embodiments where the proxy server 120 participates in a CDN, the proxy server 120 cases each request and whether there was a cache hit (the requested resource is in the cache) or a cache miss (the requested object is not in the cache and the origin server was queried). Each proxy server in the service is assigned a unique identifier. Each log stores the server's unique identifier plus a timestamp plus additional information about the event that generated the log (e.g., the IP address of the visitor client device initiating the request, the previous server that relayed the request, the response, etc.).

Each proxy server maintains its own logs and reports events in the logs to the service server 125 over the network. While in one embodiment the events are reported to the service server 125 in real time, in other embodiments the events are reported to the service server 125 differently (e.g., event logs are batched and transmitted to the service server 125 at regular intervals or as the system resources allow, event logs are batched and downloaded from the service server 125 at regular intervals or as the system resources allow, or other possible mechanisms).

The service server 125 maintains an event log data structure 126, which stores the events of the proxy servers. The service server 125 sorts the logs in order to retrieve multiple requests that constitute a single session by any particular visitor, even if the visitor's requests were made to multiple proxy servers. Customers of the service can access the service server 125 to view data reports such as such as a list of IP addresses that have visited one of their website(s) protected by the service, average time between page loads of particular IP address, whether a particular visitor downloads all the resources of a web page or just the HTML, etc. The service server 125 can also report data such as the percentage of visitors to a web site that are search engines, the percentage that are humans, the percentage that were blocked, etc. In one embodiment, the visitors that are threats as displayed to customers can be sortable by the type of threat (e.g., email harvester, comment spammer, etc.), suspicious but not known to be a threat, and/or sortable by a known threat level.

While FIG. 1 illustrates multiple origin servers 130A-L coupled with the proxy server 120, in some embodiments the proxy server is coupled with a single origin server. Moreover, in some embodiments, there are multiple proxy servers providing service for a particular domain.

The owner of the proxy server 120 is typically different than the owners of the origin servers 130A-L. In addition, the proxy server 120 is not typically part of the local network of the origin web servers 130A-L. For example, the proxy server 120 is outside of the local area network of the origin web servers 130A-L and is typically not physically accessible by owners/administrators of the origin servers 130A-L.

The validating domain server 180 a computing device that is used to validate whether a request should be subject to restriction if its IP address is listed on a restricted list. Since IP addresses may not be static (e.g., they may be assigned dynamically through DHCP, may change who they are assigned to over time, and are subject to being hijacked or spoofed), it is possible for an IP address to be listed on a restricted list even though the visitor currently associated with that IP address was not responsible for the IP address being added to the restricted list. The validating domain server 180 determines whether the listing on the restricted list is valid. For example, after the proxy server 120 determines that an IP address of a request is listed on a restricted list (which will be described in greater detail later herein), the proxy server 120 redirects the corresponding client device to the validating domain server 180. The validating domain server 180, which corresponds with a validating domain for the service, stores and reads cookies for the validating domain in the global cookie database 185. Each cookie includes an indication whether a client device should be allowed unrestricted access or be subject to its IP address being on a restricted list. For example, as will be described in greater detail later herein, a human user of a client device may prove that he or she is not a bot, which can be represented in their corresponding global cookie.

The client devices 110A-I request DNS resolution when a domain name is used or requested by a local application and is not known (e.g., is not in a local DNS cache or the DNS record in its local cache has expired). Consider the following example, where a user of the client device 110A enters the website example.com into a web browser of the device (the origin server 130A serves the website example.com). If the client device 110A does not know the IP address of example.com, (e.g., the cache on the client device 110A does not have an entry for example.com or it has expired), the client device makes a DNS request 150 to the DNS system 140 for the IP address for example.com. The domain owner of example.com has changed its authoritative name server to the authoritative name server 142, and the DNS zone file has been changed so that the IP address returned by the authoritative name server 142 will be that of the proxy server 120. As such, the DNS system 140 performs a recursive or iterative DNS process until the authoritative name server 142 returns the IP address for the proxy server 120 in the DNS response 152.

Sometime after the DNS resolution is complete and the client device 110A learns the IP address that points to example.com (which is the IP address of the proxy server 120), the client device 110A makes the request 154 (e.g., an HTTP GET request, an HTTP POST request, other HTTP request method, or other request for an action to be performed on an identified resource belonging to an origin server), which is transmitted to the proxy server 120. The proxy server 120 analyzes the request at operation 164 and determines a set of one or more request related actions to perform based on the results of the analyzing. In one embodiment, for each request 154, the proxy server 120 performs one or more of the following: determines whether the visitor making the request is allowed access to the requested content; determines whether the visitor poses an Internet security threat (e.g., is a bot, has a virus, has previously been identified as performing malicious activities (e.g., email spamming, comment spamming, SQL injection attacker, participant in a denial of service attack, etc.), etc.); determines whether the request itself poses an Internet security threat (e.g., an SQL injection attack, etc.); determines whether the request is malformed; determines the type and/or size of the requested content; determines whether the origin server is offline; and determines whether the requested content is available in cache.

In some embodiments, the service maintains the threat database 124, which contains information that indicates whether the visitor poses a threat and whether the visitor is allowed access to the requested content. The proxy server 120 accesses the threat database 124 through the query threat database operation 165. While in some embodiments the threat database 124 is a central database common to multiple proxy servers, in other embodiments the threat database 124 is part of a distributed database system.

In some embodiments, the threat database 124 includes one or more of the following: a global restricted IP address list that identifies IP addresses that are not allowed to access content of any of the origin web servers protected by the service (e.g., the origin servers 130A-L); a local restricted IP address list for each of the origin servers 130A-L that identifies IP addresses that are not allowed access to that origin server (which may be based on location for the IP addresses); a local restricted cookie list for each of the origin servers 130A-L that identifies cookies that are not allowed access to that origin server; global allow cookie list common to the origin servers 130A-L that indentifies cookies that are allowed access to each of the origin servers 130A-L; a local allow cookie list for each of the origin servers 130A-L that identifies cookies that are allowed access to that origin server; vulnerability signatures to detect viruses, worms, trojan horses, and other vulnerabilities; and visitor statistics. In some embodiments, the threat database also includes the reason why a visitor is on a restricted list (e.g., email harvester, email and/or comment spammer, participated in denial of service attack, is infected, etc.).

The IP addresses on the global restricted IP address list are populated by the service and may be added for numerous reasons. For example, IP addresses of email address harvesters; IP addresses that have been detected as belonging to comment or blog spammers; IP addresses that correspond with SQL injection attacks or other web software vulnerability attacks; and IP addresses that have been detected as participating in denial of service attacks may be added to the global restricted IP list. Similarly, IP addresses may be added to a local restricted IP address list of an origin server 130 after it determines, from a previous session, that the IP address has been recorded as a potential threat to that origin server 130 (e.g., email harvesting, comment or blog spamming, SQL injection attacks or other web software vulnerability attacks, denial of service attacks, etc.). The local restricted IP address list may also be populated with IP address classifications that are not allowed access to the corresponding origin server. As an example of an IP address classification, a domain owner 135 may restrict access to their origin server 130 to IP addresses of a certain location (e.g., country(ies)). In some embodiments, the global restricted IP address list and/or the local restricted IP address list indicates the reason that each IP address is included on the list (e.g., email address harvester; blog or comment spammer; SQL injection attacks or other web software vulnerability attacks; DoS attacks; etc.).

Cookies may be added to the global allow cookie list after it is determined that the visitor does not pose a threat. For example, the service may provide a mechanism for a user of a client device to verify that he or she is a human user and not a bot. For example, the service may direct the user to respond to a CAPTCHA and record their input in response to a graphical image, audio recording, math problem, or other challenge-response test. If successfully passing the CAPTCHA, the service may associate the cookie with a human user and add to the global allow cookie list. Similarly, a domain owner may cause cookies to be added to its local allow cookie list after determining, from a previous session, that the visitor associated with the cookie is not a potential threat to the origin server. A domain owner may cause cookies to be added to its local restricted cookie list after determining, from a previous session, that the cookie has been recorded as a potential threat to the origin server (e.g., email harvesting, comment or blog spamming, SQL injection attacks or other web software vulnerability attacks, denial of service attacks, etc.).

In some embodiments, the request analyzing operation 164 includes the proxy server 120 determining whether the cookie of the request 154 (if one is included in the request) or other header of the request 154 is malformed. Malformed cookies or headers serve as an indication that the request 154 is not from a human user and is a likely indication of suspicious activity. An example of a malformed header occurs if an HTTP GET request does not contain a URL and an HTTP version string, the header is longer than the prescribed buffer size, the header contains disallowed characters (e.g., non ASCII characters), the header contains signature(s) of known SQL injection attack(s), the header is too short or incomplete, the header does not accurately reflect the content (e.g., the content-length header may report a different length of content than is actually in the body), the header may exclude the referrer or include a disallowed referrer, etc. The system can stop requests depending on the content of the headers. For example, if the web administrator has chosen to block direct requests for images then the proxy server will not return image content if the referrer does not include the web administrator's website's domain.

In some embodiments, customers of the service can configure the service such that the proxy server 120 will block requests depending on the content of the headers. By way of example, if a customer has configured the service to block direct requests for images then the proxy server 120 will not return image content if the referrer does not include the protected domain (or alternatively an image is returned that indicates that the direct loading of images has been blocked).

In some embodiments, the proxy server 120 redirects a client device 110 directly to an origin server 130 based on the type of content requested and/or the size of the requested content. For example, if the type of the content is not supported (e.g., it is a video file) and/or if the size of the requested content is above a threshold, the proxy server 120 may redirect the requesting client device directly to the origin server so that the traffic passes directly between the client device and the origin server. Thus, in these embodiments, the request analyzing operation 164 includes the proxy server 120 determining the type and/or the size of the requested content.

Based on the results of the analyzing request operation 164, the proxy server 120 takes one or more appropriate request related actions. Examples of request related actions that may be performed by the proxy server 120 include the proxy server 120 responding to the request locally by transmitting a response 162 (e.g., an HTTP response) to the client device 110A, blocking the request 154 in addition to or in place of the response 162, reducing the speed at which content can be delivered to the client device 110A, and transmitting the request to the origin server 130A on behalf of the client device 110A at operation 156.

In cases where the proxy server 120 locally transmits the response 162 to the client device 110A (locally referring to transmitting the response 162 without the request being forwarded to the origin server 130A), the response 162 may be different depending on different results of the analyzing request operation 164. Additionally, the response 162 may be customized based on the characteristics of the requested website and/or the characteristics of the visitor.

As one example of the response 162, if the proxy server 120 determines that the visitor poses a likely Internet security threat by possibly being infected with a virus, worm, or other vulnerability and/or performs malicious activities (e.g., as indicated by being listed on a restricted list, having an out of date system (e.g., a browser version that is known to have vulnerabilities)), the response 162 may include an indication that the visitor poses a potential threat (e.g., is likely infected with a virus, worm, or other vulnerability, has an out of date system, etc.) and may include instructions for the user to remedy the vulnerability (e.g., run an anti-virus software program, download and run an anti-virus software program, download patches, download updated software version, etc.). In some embodiments, the proxy server 120 determines that a visitor poses a likely Internet security threat by querying the threat database 124 to determine if the IP address of the visitor is included on one or more of the global restricted IP address list and/or the local restricted IP address list for the origin server 130A, and/or to determine if the cookie of the visitor (if the request 154 includes a cookie) is included on the local restricted cookie list for the origin server 130A.

As another example, if the proxy server 120 determines that the visitor poses an Internet security threat because the visitor performs malicious activities and is likely an automated bot, the response 162 may include a block page indicating that the visitor has been blocked and may include a mechanism for the visitor to dismiss the block page by verifying that a human user is using the client device. For example, an image, audio, or other CAPTCHA may be included in the response 162 to allow a human user to verify that he or she is not an automated bot. Of course, it should be understood that in some embodiments the response 162 may not include such a mechanism for the visitor to dismiss the block page.

As another example, if the proxy server 120 determines that the request itself poses a security threat (e.g., it contains malicious code) or includes a malformed cookie or header, the response 162 may display an indication that the request cannot be completed and may indicate the reason (e.g., the request poses a security threat, the request includes a malformed cookie or header, etc.).

As another example of the response 162, if the proxy server 120 determines that the request 154 should be redirected directly to the origin server 130A (e.g., the type of the requested content is not supported to flow through the proxy server 120 and/or if the size of the requested content is above a threshold), the response 162 indicates a redirection that points to an IP address of the origin server 130A (e.g., an HTTP response status code 301, 302, 303, 305, 307, or other redirection status code that indicates a redirection to a subdomain whose IP address points directly to the origin server 130A, or a page with a meta redirect and/or a script instructing the client network application to load a page to the subdomain whose IP address points directly to the origin server 130A). After receiving a redirection response, the client device 110A makes the redirected request 170 directly requests to the origin server 130A. The origin server 130A directly responds to the request 170 with the direct response 172.

As another example of the response 162, if the proxy server 120 determines that the requested content is available in the cache 122 through the request and receive content operation 160, the response 162 may include the requested content. The cache 122 may include a general purpose cache and a separate special purpose cache. The general purpose cache is populated by human users and automated crawlers (e.g., search engines or other crawlers parsing and indexing the websites) using the service (e.g., requesting content from the origin servers 130A-L). In some embodiments, the data in the general purpose cache is static data (e.g., images, videos, etc.) and does not include dynamic data (e.g., HTML pages). In some embodiments, the proxy server 120 serves content from the general purpose cache to human visitors and bots when possible.

The special purpose cache is populated by trusted search engines/crawlers that request content through the service. A trusted search engine/crawler is one that only access publicly accessible content (and thus does not access private content that requires a username/password). In one embodiment, the service maintains a list of pairs of IP addresses and user agents of trusted search engines/crawlers. Unlike the general purpose cache, the special purpose cache can include dynamic data (e.g., HTML pages) and optionally static data. Since trusted search engines/crawlers only access publicly accessible content, the data that is cached in the special purpose cache will not include private information. By way of specific example, the trusted search engine/crawlers may access publicly accessible pages of a banking website but cannot access pages of user accounts at the banking website (which would require a logon). Accordingly, the special purpose cache will not include the pages of user accounts at the banking website. In some embodiments, the proxy server 120 serves content from the special purpose cache to human visitors only when the origin server is offline, and serves content from the special purpose cache to bot visitors (e.g., search engines, crawlers, etc.) when possible.

In some embodiments, the proxy server 120 does not cache certain files in the cache 122 that are not supported by the service or those files that have a size above a certain threshold. While in some embodiments the general purpose cache and the special purpose cache are separate and located in separate databases, in other embodiments they are part of the same database and/or located on the same computing device.

Prior to transmitting the content to the client device 110A, the proxy server 120 may analyze the content and modify the content. For example, in some embodiments, if the content is an HTML page that includes an embedded email address, the proxy server 120 obfuscates the email address such that it will be displayed on the rendered page but will not be readable from the page source, thus preventing the email address from being harvested by an email harvesting program. As another example, the domain owner 135A may define rules that certain elements of the content are to be excluded from the response 162 depending on one or more characteristics of the visitor. If the rule for an object is triggered, the proxy server 120 removes that content from the response 162.

In some embodiments, the proxy server 120 reduces the speed at which content can be delivered to a client device 110 responsive to determining that the visitor and/or the request 154 is a potential threat. For example, the proxy server 120 turns down the number of bytes per second that can be delivered through it for the connection.

Figure 2:
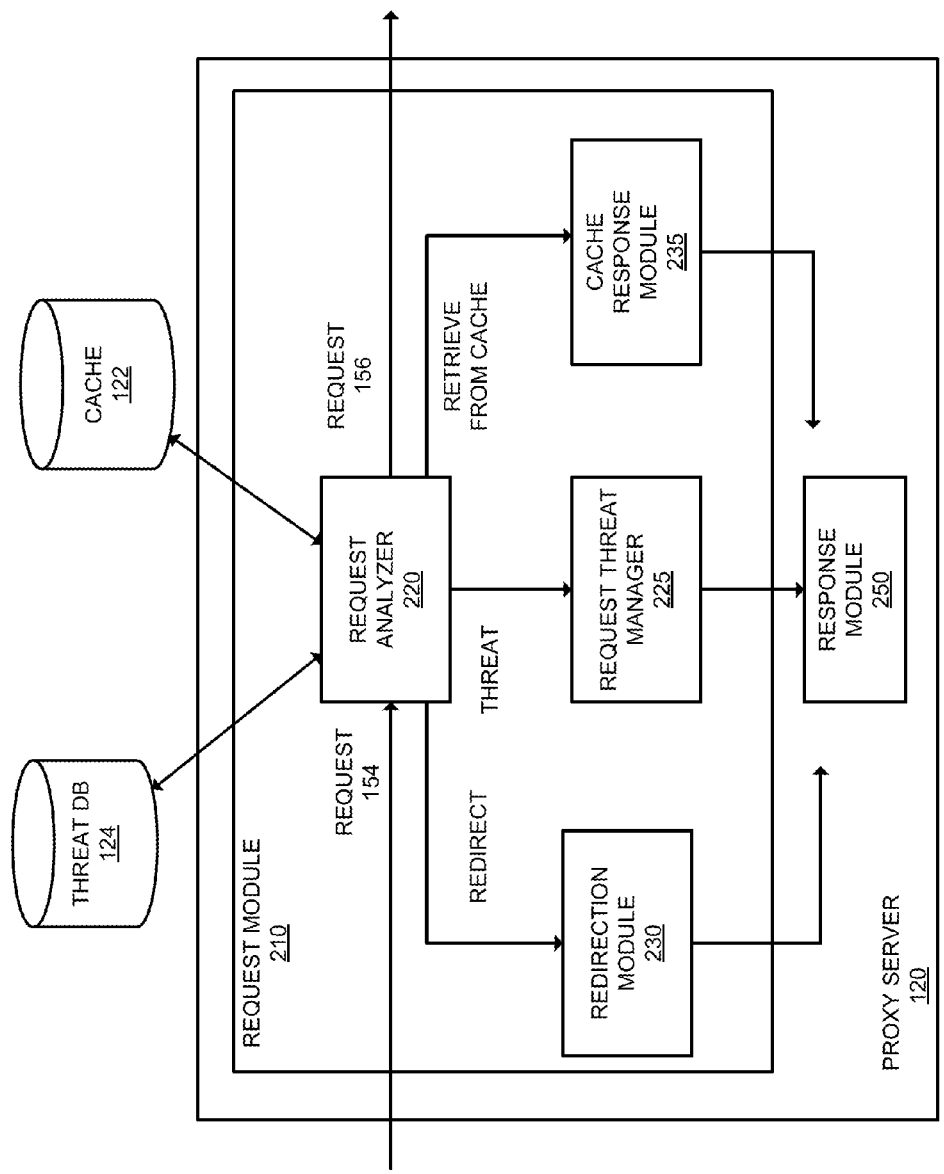
FIG. 2 is a block diagram illustrating an exemplary request module of a proxy server of the service that processes requests according to one embodiment of the invention.

FIG. 2 is a block diagram illustrating an exemplary request module of the proxy server 120 that processes requests according to one embodiment of the invention. The request module 210 includes the request analyzer 220, the request threat manager 225, the redirection module 230, and the cache response module 235. The request analyzer 220 receives and analyzes the request 154. The request analyzer parses the request 154 and performs one or more of the following: determines the destination of the request (by examining the header of the request); determines the requested content (by examining the header of the request); determines whether the visitor poses an Internet security threat; determines whether the request itself poses an Internet security threat; determines whether the request is malformed; determines the type and/or size of the requested content; determines whether the origin server is offline; and determines whether the requested content is available in cache and is appropriate to transmit to the visitor.

In one embodiment, the request analyzer 220 determines whether a visitor poses an Internet security threat by querying the threat database 124 to determine whether the visitor is on a restricted list (e.g., the global restricted IP address list, the local restricted IP address list, and/or the local restricted cookie list) and/or based on visitor characteristics (e.g., to determine whether the visitor is a human user or a bot). In one embodiment, the request analyzer 220 creates a visitor fingerprint based on a set of one or more visitor characteristics responsive to a visitor making a request 154. For example, the visitor fingerprint is created based on one or more of the following: whether the client network application loads images; whether the client network application executes JavaScript; the type of network application (e.g., browser name and version); the operating system running the client network application; the fonts installed on the client network application; the languages supported by the client network application; whether the client network application supports plugins; whether the client network application stores cookies; whether the client network application responds from the same IP address for various protocol requests, etc.

The request analyzer 220 can determine much of the information for the visitor fingerprint based on the information in the header of the request 154. For example, the IP address of the visitor, the particular plugins and extensions that the client network application supports (e.g., Flash, PDF, etc.), the fonts installed on the client network application, the User-Agent of the client network application, the screen size, the content types that are accepted, the character sets that are accepted, whether compressed content is accepted, the accepted languages, the time zone of the client network application, and whether the client network application has a cookie for the visited site, can be determined from the information in the header of the request 154.

The proxy server 120 can also generate data by injecting input into the response and/or analyzing the logs generated by the visit. For example, the proxy server 120 can insert a script into the HTML page returned to the visitor. The script, if executed, makes a call to a URL monitored by the proxy server 120 (or other device of the service). The service server 125 can monitor the event log database for requests to that URL from the IP address and/or cookie of the original visitor. The service server 125 can correlate the original request with the request made via the script. If the script call is not made, the service server 125 can infer that the client network application did not execute the script. In some embodiments, the service server 125 can use a specially constructed URL that corresponds to a particular HTML request in order to further associate the original request with the script-generated request down to a particular page.

In addition, the service server 125 can examine the loading of other resources on a page returned to a visitor in order to determine the characteristics of the client network application. For example, if a web page is made up of an HTML document and a number of images, the service server 125 can examine the event logs for the visitor in order to determine whether the images were loaded when the HTML page was loaded. If a particular visitor repeatedly does not load images across multiple web pages, the service server 125 can infer that the visitor has image loading blocked or turned off. In certain circumstances, this may be an indication that the visitor is a bot, and not a human.

In some embodiments, the request analyzer 220 uses the visitor fingerprint to make a likely determination of whether the visitor is a human user or is a bot. For example, there may be inconsistencies in the characteristics of a visitor that lead to the determination that the visitor is a bot. For example, if the request is from a browser that is known to use a certain font but that font as indicated by the characteristics is not installed, then it is likely that at least part of the request has been forged and it is likely not a human user with legitimate intentions. According to one embodiment, the more inconsistencies between characteristics the more likelihood that the visitor is not a human user with legitimate intentions and thus poses a threat.

The request analyzer 220 determines whether the request itself poses an Internet security threat by analyzing the content of the request. For example, if the cookie or header is malformed then the request may pose a threat (a malformed cookie or header is an indication that the request is not from a human user and is a likely indication of suspicious activity). The request analyzer 220 may determine whether the URL of the request is malformed and/or contains a known threat signature. If the request 154 is a POST request, the request analyzer 220 analyzes the contents that are attempted to be posted for potential threats (e.g., against known threat signatures).

In some embodiments, the request analyzer 220 determines whether the requested content is available in the cache 122 and is appropriate to transmit to the visitor (based on the visitor characteristics). For example, if the requested content is for relatively static data (e.g., images, videos, etc.) whose content is not likely to change often, and is available in the cache 122, then the cached version can be returned to the visitor. As another example, if the requested content is for relatively dynamic data (e.g., an HTML page) whose content is likely to change rather frequently, then the cached version may not be appropriate to be sent to human users (unless the server is determined to be offline).

If the request analyzer 220 determines that the visitor is a threat and/or that the request 154 is itself a threat, then it calls the request threat manager 225. If the request analyzer 220 determines that the file type of the requested content and/or the size of the requested content is not supported to be passed through the proxy server 120, the request analyzer 220 calls the redirection module 230 (in some embodiments, as a prerequisite for calling the request threat manager 225, the request analyzer 220 first determines that the visitor and/or the request is not a threat). If the request analyzer determines that the requested content is available in the cache 122 and is appropriate to transmit to the visitor, then the request analyzer 220 calls the cache response module 235 (in some embodiments, a prerequisite for calling the cache response module 235 is determining that the visitor and/or the request is not a threat). If the request analyzer determines that the visitor and/or the request is not a threat, the request analyzer may cause the request 156 to be transmitted to the appropriate origin server (in some embodiments, the request analyzer 220 also determines that the requested content is not available in the cache 122 (or is not appropriate to transmit to the visitor) and/or the request should not be redirected directly to the origin server).

The request threat manager 225 manages threats differently in different embodiments. For example, the request threat manager 225 may block the request 154 without a response 162 being transmitted to the visitor, block the request 154 and generate a block page for the response 162 that indicates that the request was blocked (the block page may include a mechanism for the visitor to dismiss the block page), cause a response to redirect the request to the validating domain server 180, and decreases the speed at which content can be delivered to the visitor. In one embodiment, the request threat manager 225 treats threats differently based on a relative threat level. For example, if a visitor is located on multiple restricted lists such as a restricted IP address list (the global and/or local restricted IP address list) and the local restricted cookie list, then the threat level is relatively high and the request threat manager 225 may block the request without providing a mechanism for the visitor to dismiss the block page. As another example, if the visitor is not located on a restricted list but whose characteristics suggest that the visitor is a bot, then the threat level is medium and the request threat manager 225 may block the request and provide a mechanism for the visitor to dismiss the block page by proving that they are a human user. In all cases, the request threat manager 225 logs the activities of visitors interacting with a block page, which may affect the treatment of the visitors for future request (e.g., a visitor successfully completing a CAPTCHA is less likely to be a threat and can be labeled as such compared with a visitor failing one or more CAPTCHAs which indicates the visitor is more likely to be a threat and can be labeled as such).

The redirection module 230 causes the response 162 to include a redirection status code to the origin server directly (e.g., an HTTP response status code 301, 302, 303, 305, 307, or other redirection status code that indicates a redirection to a subdomain whose IP address points directly to the correct origin server, or a page with a meta redirect and/or a script instructing the client network application to load a page of the domain whose IP address points directly to the correct origin server).

The request threat manager 225, redirection module 230, and the cache response module 235 each call the response module 250 to generate an appropriate response to the visitor.

In some embodiments, the request 156 (e.g., an HTTP GET request, an HTTP POST request, other HTTP request method, or other request for an action to be performed on an identified resource belonging to an origin server) is transmitted by the proxy server 120 to the origin server 130A on behalf of the client device 110A. In some embodiments, prior to transmitting the request 156, the proxy server 120 determines one or more of the following: the visitor is allowed access to the content of the origin server 130A; the visitor does not pose an Internet security threat; the request 154 does not pose an Internet security threat; the request 154 is not malformed; the requested content is of a type and/or size not supported by the cache 122; and the requested content is not in the cache 122.

The request 156 transmitted by the proxy server 120 to the origin server 130A on behalf of the client device 110A may be substantially similar to the original request 154 or it may be modified by the proxy server 120. For example, in some embodiments, the proxy server 120 removes content from the request if it determines that the content is a security threat to the origin server 120 while leaving the content that is not a security threat to be transmitted (e.g., if the request is an HTTP POST and the contents attempted to be posted contain a possible threat to the origin server). In other embodiments, the proxy server 120 modifies the content of the request to make the request less likely to harm to the origin server 120. For example, the proxy server 120 may escape dangerous characters. As an example, SQL injection attacks often include a quotation mark in an attempt to break out of the SQL on the proxy server 120. To prevent this type of attack, the proxy server 120 can add an escape character (e.g., a "\") before the quotation in the request.

The origin servers 130A-L respond to the request 156 as if the request was being transmitted from a client device directly. The response 158 (e.g., an HTTP response) may include the requested content, an error code indicating that the content cannot be found (e.g., an HTTP response status code 404 error), an error code indicating an problem with the origin server (e.g., an HTTP response status code 5XX error) or other response code.

After receiving the response 158, the proxy server 120 analyzes the response (at the analyzing response operation 166) and determines a set of one or more response related actions to perform based on the results of the analyzing response operation 166. The analyzing response operation 166 includes the proxy server 120 performing one or more of the following: determining the status of the response (e.g., whether it indicates an error code); determining whether the header of the response is malformed; determining whether the response poses an Internet security threat (e.g., whether the requested resource includes a virus, worm, or other vulnerability); determining whether the requested resource includes one or more elements that are to be excluded from being delivered to the visitor; determining whether to modify element(s) of the requested resource; determining whether to obfuscate elements of the requested resource (e.g., obfuscating an email address such that it will be displayed on the rendered page but obfuscated from the page source); determining whether to add content to the requested resource; and determining whether to cache the contents of the requested resource. Based on the results of the analyzing response operation 166, the proxy server 120 performs one or more appropriate response related actions.

In some situations, the response 158 may include elements that are to be excluded and/or obfuscated from the response 162 based on one or more characteristics of the visitor. For example, in some embodiments, the domain owners 135A-L may each define modification rules that defines how to modify elements of the content prior to transmitting the response 162, which are triggered by characteristics of the visitor. By way of example, a modification rule could be defined to modify elements within content for IP addresses of a certain location (e.g., a certain country). In some embodiments, the service server 125 provides a rule creation interface that allows the domain owners to establish modification rules. If a visitor triggers a modification rule to exclude an element from the response, the proxy server 120 removes that element from the response 162. If a visitor triggers a modification rule to obfuscate an element from the response, the proxy server 120 obfuscates that element by replacing the element with a script that, when executed (e.g., when the page loads on the client network application), generates the underlying data on the rendered page yet is unreadable in the source of the page.

In some embodiments, the proxy server 120 automatically modifies portions of the requested content prior to transmitting the response 162. For example, the proxy server 120 modifies known-sensitive content of the requested content (e.g., phone numbers, email addresses, instant messenger IDs, street addresses, links to other websites, birthdates, social security numbers, IP addresses, credit card numbers, account usernames, etc.) in such a way that it cannot be parsed or indexed automatically. For example, the proxy server 120 replaces the structured data with an obfuscation script, which when executed (e.g., upon the page loading in the client network application), generates the data such that it will be displayed on the rendered page but will not be readable by an automatic parser or indexer. By way of specific example, in some embodiments the proxy server 120 automatically obfuscates email addresses embedded in the response such that the email address will be displayed on the rendered page but will not be readable from the source of the page, thus preventing the email address from being harvested by an email harvesting program. For example, the proxy server 120 replaces the email address with an obfuscation script, which when executed (e.g., upon the page loading), generates the email address to be displayed on the rendered page. While in some embodiments the proxy server 120 obfuscates each email address detected in the requested content, in other embodiments the proxy server 120 scrambles the detected email addresses in the requested content only for certain visitors (e.g., known search engines and/or known crawlers). An exemplary mechanism of obfuscating an email address will be described with reference to FIG. 18.

In some embodiments, customers may customize which elements should be automatically obfuscated. For example, the service server 125 may provide an interface to allow the customers to select which elements (e.g., phone numbers, email addresses, instant messenger IDs, street addresses, links to other websites, birthdates, social security numbers, IP addresses, credit card numbers, account usernames, etc), if any, should be automatically obfuscated by the proxy server 120.

As another example of modifying the response, in some embodiments the proxy server 120 modifies resource unavailable errors (e.g., HTTP response status code 404 errors) with customized content. In some embodiments, the custom error page is customized based on one or more of the following: the location (e.g., country) of the visitor who triggered the error; the location of the origin server; the language of the visitor who triggered the error; any cached content on the website where the error occurred, including the page that may have been cached before the error occurred or other pages on the site that give an overall context to the site generally (e.g., the type of site (e.g., sports, news, weather, entertainment, etc.)); a list of links or terms provided by the customer; the list of the most accessed pages elsewhere on the website determined by other visitors; any terms that can be parsed from the request URL or POST; and any terms that can be parsed from the referrer URL. Based on one or more of these factors, the error page may include links to other pages on the website or on other websites that would be of interest to the visitor. In some embodiments, the links are sponsored to advertisers looking to target individuals requesting particular content.

In some embodiments, if the originally requested content has moved locations (e.g., it is now available at a different URL), the customized error page includes a link to a new location of the originally requested content or automatically redirects the visitor to the new location of the originally requested content. In some embodiments, the proxy server determines that requested content has moved locations by comparing a hash of the original content with hashes of other content from the same origin server when an error message occurs.

In some embodiments, the proxy server 120 adds content to the requested resource in the response 162. For example, in some embodiments the proxy server 120 adds a trap email address and/or a trap form to the response 162. A trap email address is an email address that is not used for any real email and is unique to a particular IP address and session (thus the email address will not be known or valid to different sessions and/or computing devices). A trap form is a form to submit comments or other information (using a POST method or a GET method with variables included in the URL) that is not used for any real comments. Similar to the trap email address, the trap form will be unique to a particular IP address and session. The trap email address(es) and/or trap form(s) that are added to the requested resource will not be displayed by the client devices 110A-I but are able to be harvested by an email harvesting program and used to submit data by an automated bot. Thus, the trap email address(es) and/or trap form(s) are used to determine whether visitors are human users or bots. The proxy server 120 (or other networking device of the service) monitors the email account that corresponds to the trap email address for emails. Since the trap email address is not published and is not known by other computing devices, receipt of email at the account corresponding to that trap email address is an indication that the IP address associated with the request 154 belongs to an email harvesting program. In such a case, that IP address may be added to the threat database 124 (e.g., in the global restricted IP address list). In addition, receipt of data through use of a trap form is an indication that the visitor associated with the request 154 is a bot.

As another example of adding content to a requested resource, in some embodiments the proxy server 120 adds and/or changes advertisements to the response 162. For example, in one embodiment of the invention, the proxy server 120 scans for advertisements in the content and replaces one or more of those advertisements with different advertisements. The proxy server 120 performs one or more of the following when replacing advertisements: determining the location, size, and position of advertisement(s) on a page; determining whether it is appropriate to replace the advertisement(s); and replacing the advertisement(s) either directly or through a reference to an external resource. The advertisements may be modified in such a way that advertising blockers (software or features of browsers that prevent advertisements from being displayed on web pages) are prevented from blocking the advertisements.

As another example of adding content to a requested resource, in some embodiments the proxy server 120 automatically adds scripts to pages (e.g., scripts that track users (e.g., the links they select, the duration of page visit, when they exit a page), scripts that track performance of a particular page (e.g., tracking page load times by including scripts in multiple places on the page), scripts that add or modify content on the page (e.g., add affiliate codes to existing links, add links dynamically to content for particular keywords, add content loaded from third party resources)). By way of specific example, a page loading statistical script can be used to measure page load times and can be inserted in one or more locations on the HTML page (e.g., immediately after the <body> tag, after every X number of bytes, and/or immediately before the </body> tag). The script may help customers measure page load time by causing the client network application to load an image at a certain time during the page loading process. It should be understood that by the proxy server 120 automatically adding these scripts to the pages avoids the customers from manually adding these types of scripts. For example, in some embodiments, the customers can select an option presented by service (e.g., through a customization portal on the service server 125) for the proxy servers to automatically add one or more of these scripts (e.g., page load times, etc.) to the pages that pass through the proxy or served from the cache.

In some embodiments, customers may choose (e.g., through a customization portal on the service server 125) to add statistics scripts to only a certain percentage of resources. By way of example, a customer may configure the service to include statistics scripts for only certain demographics (e.g., operating system type, client network application type, country of origin, time of day, number of times they have previously visited the site, etc.) and/or only for a certain percentage of visitors (the percentage being definable by the customer and/or the service).

In some embodiments, the proxy server 120 caches the content received in the response 158 to the cache database 122. In some embodiments, the proxy server 120 caches content that is supported and/or has a size that is below a threshold. The proxy server 120 stores an indication (e.g., a flag) if the size of the content is above the threshold such that the next request for that content will be redirected directly to the origin server. In embodiments where the response 158 is modified, in some embodiments the modified response is cached while in other embodiments the unmodified original response is cached.

Figure 3:
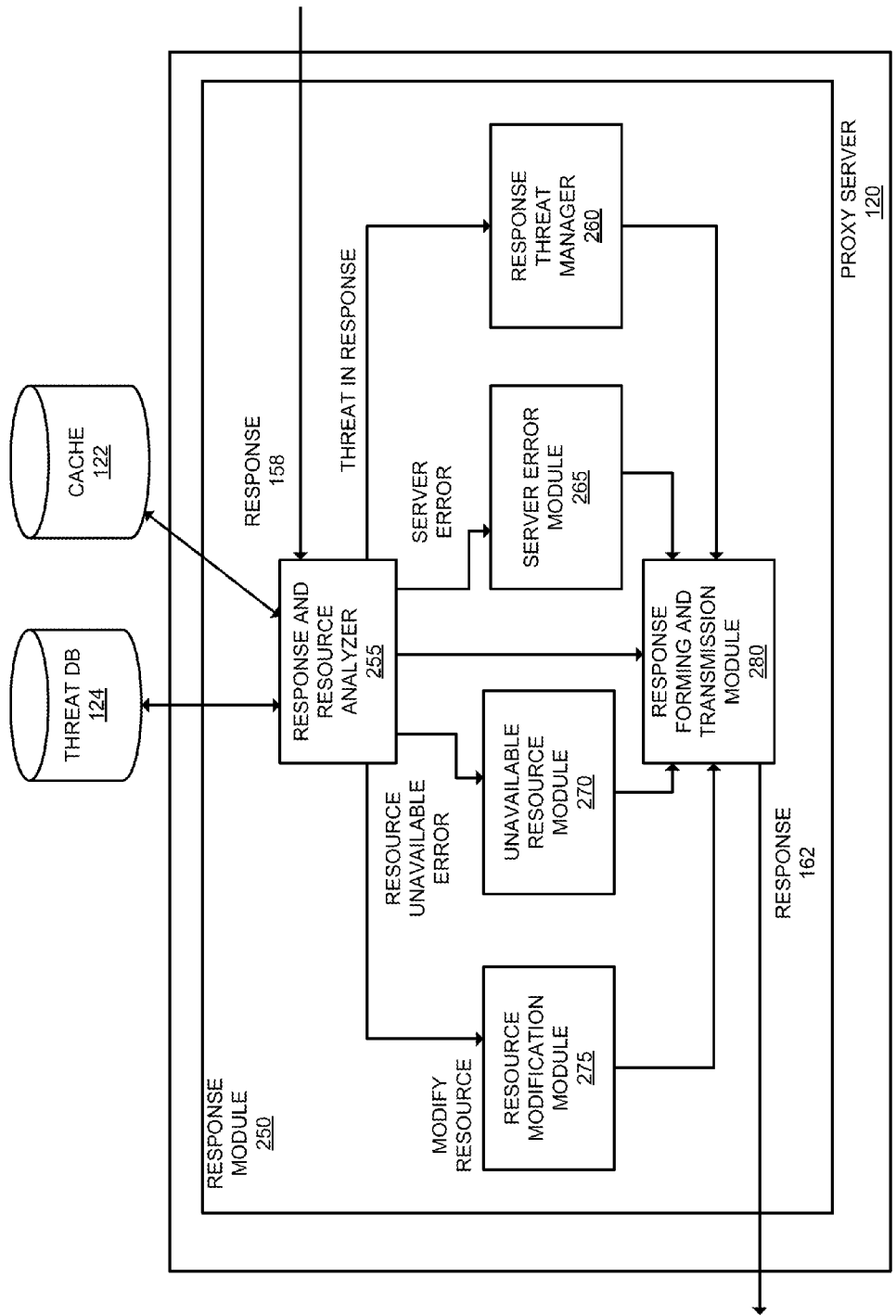
FIG. 3 is a block diagram illustrating an exemplary response module of the proxy server that processes responses according to one embodiment of the invention.

FIG. 3 is a block diagram illustrating an exemplary response module 250 according to one embodiment. The response module 250 includes the response and resource analyzer 255, the response threat manager 260, the server error module 265, the unavailable resource module 270, the resource modification module 275, and the response forming and transmission module 280. The response threat manager 260, the server error module 265, the unavailable resource module 270, and the resource modification module 275 each call the response forming and transmission module 280 to form and transmit responses 162 to the client devices.

The response and resource analyzer 255 receives and analyzes responses 158 from origin servers and analyzes the content included in responses 158 from origin servers or included from the cache 122. In some embodiments, when a response 158 is received, the response and resource analyzer 255 analyzes the response as described in the analyzing response operation 166. In some embodiments, the response and resource analyzer 255 also analyzes requested resources obtained from the cache 122 to determine one or more of the following; whether the requested resource includes one or more elements that are to be excluded from being delivered to the visitor; whether to modify element(s) of the requested resource; whether to obfuscate elements of the requested resource (e.g., obfuscating an email address); and whether to add resource to the requested resource. If the response and resource analyzer 255 determines that the response 158 includes resources to be cached, the cached version of the file will be cached in the cache 122.

If the response and resource analyzer 255 determines that there is a threat in the response or the response is malformed, the response and resource analyzer 255 calls the response threat manager 260. It should be understood that the response may include a threat to the visitor and/or a threat to the proxy server 120. The response threat manager 260 may remove the threat (e.g., remove the threatening content before returning the requested resource) or block the response (and/or alert the visitor and/or customer that the response has been blocked).

If the response and resource analyzer 255 determines that the response includes a server error (e.g., the HTTP status code is a 4XX error, a 5XX error, a timeout, a failure of DNS resolution, or content returns that indicate that the server is offline (e.g., database error or other known error pages)), then the server error module 265 is called. The server error module 265 causes the response 162 to include a cached copy of the requested resource (if available). If a cached copy is not available, the server error module 265 includes in the response 162 the error message. In some embodiments, the server error module 265 adds a script to the cached content (e.g., if the content is an HTML page) that automatically requests the proxy server 120 to ping the origin server periodically to determine whether the origin server is online. The server error module 265 may also set an offline browsing cookie for the visitor such that if a subsequent request is received from the visitor with the offline browsing cookie, the cached version of the requested content will be served instead of querying the origin server.

If the response and resource analyzer 255 determines that the response includes a resource unavailable error (e.g., an HTTP status code 404 error), then the unavailable resource module 270 is called. In one embodiment, the unavailable resource module 270 modifies the error with customized content based on the requested content. For example, based on the URL of the requested content, the response and resource analyzer 255 modifies the response with suggestions of alternate pages.

If the response and resource analyzer 255 determines that the requested resource includes elements that are to be modified (e.g., excluded, obfuscated, and/or added), then the resource modification module 275 is called. In some embodiments, the response and resource analyzer 255 reads modification rules (which may be defined by domain owners) that define how to modify elements of the requested and identifies those elements that should be modified (the visitors characteristics trigger the rules). The resource modification module 275 modifies the resource appropriately (e.g., removes the element or obfuscates the element). In some embodiments, the resource modification module 275 adds content to the requested resource. For example, the resource modification module 275 may add trap email address(es) and/or trap form(s) to the requested resource. As another example, the resource modification module 275 may add (or replace) advertisement(s) to the requested resource.

Registering for Service

Figure 4A:
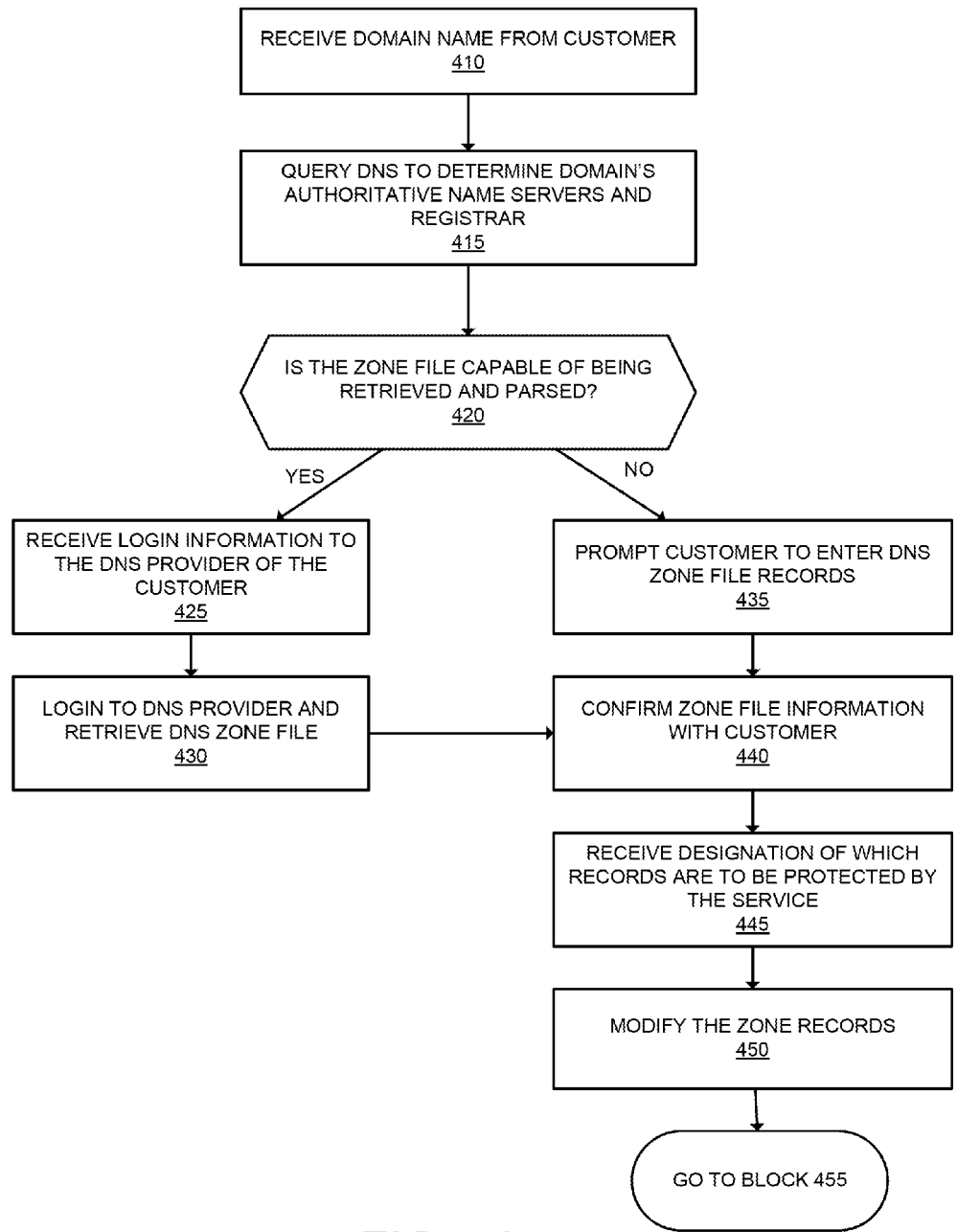
FIGS. 4A-B are flow diagrams illustrating exemplary operations for a customer to use the service server to register for service according to one embodiment.
Figure 4B:
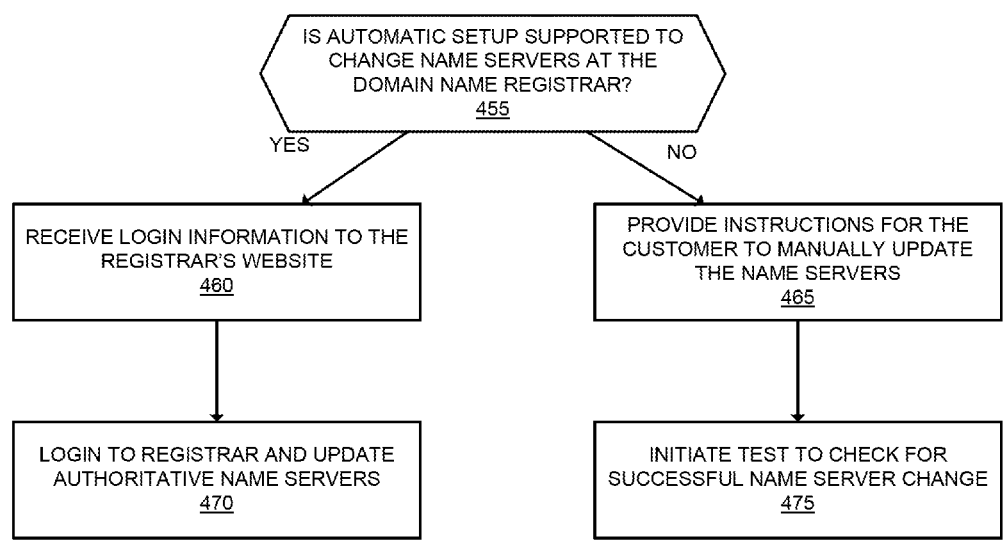

FIGS. 4A-B are flow diagrams illustrating exemplary operations for a customer to use the service server 125 to register for service according to one embodiment. The operations of FIGS. 4A-B will be described with reference to the service server 125; however it should be understood that the operations of FIGS. 4A-B can be performed by embodiments other than those discussed with reference to the service server 125 and the service server 125 can perform operations different than those discussed with reference to the operations of FIGS. 4A-B. In addition, the operations of FIGS. 4A-B will be described with reference to the domain owner 135A, which owns the domain example.com and is hosted by the origin server 130A.

Figure 7A:
FIGS. 7A-C illustrate exemplary interfaces for customers to input domain related information according to one embodiment of the invention.

At block 410, the service server 125 receives the name of the domain (e.g., example.com) from the domain owner 135A. For example, with reference to FIG. 7A, the service server 125 provides the domain input form 710 to allow the domain owner 135A to input their domain (e.g., example.com) into the domain field 715. The domain owner 135A submits the domain information by selecting the submit button. Flow moves from block 410 to block 415.

At block 415, the service server 125 queries the global DNS system to determine the authoritative name servers and domain name registrar for the domain (e.g., example.com).

Flow then moves to block 420, where the service server 420 determines whether the current information in the DNS zone file for the domain is capable of being retrieved by the service server 420 in order to avoid the domain owner 135A from inputting the information. For example, some DNS providers may provide an API (Application Programming Interface) that can be used by the service server 420 to query for the information in the DNS zone file for the domain. The list of DNS providers that provide such an API and information of how to use the API is stored by the service server 420. As another example, the service server 420 may simulate a human user logging into the DNS provider's website to determine the information in the DNS zone file. In such a case, the service server 420 accesses a map of the DNS provider's website that has been pre-recorded by an operator of the service and stored by the service server 420. The map includes the web page on which the user login information is entered, the particular fields into which the login information is entered, the page or pages on which the zone information is displayed, the structure of those pages, and any links or URLs to request additional pieces of the zone file from the DNS provider. If the DNS zone file is capable of being retrieved, then flow moves to block 425, otherwise flow moves to block 435.

Figure 7B:
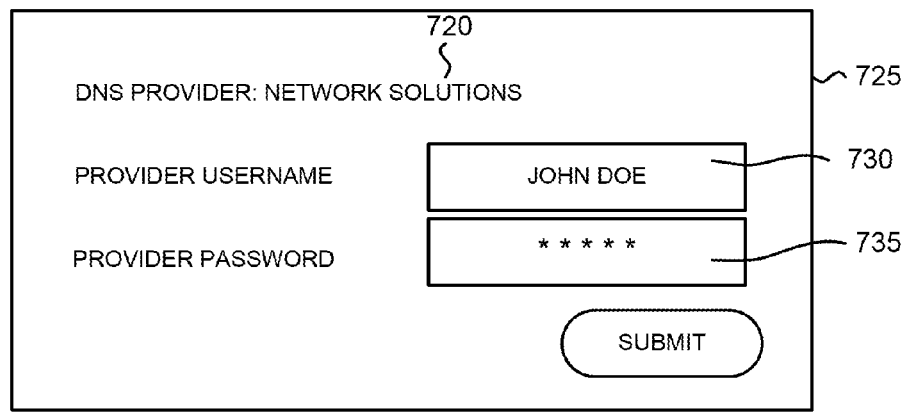

At block 425, the service server 125 receives login information (e.g., username and password) to the DNS provider's website from the domain owner 135A. For example, with reference to FIG. 7B, the service server 125 provides the DNS provider login information input form 710 to allow the domain owner 135A to input their username and password for the DNS provider 715 into the username field 720 and password field 725 respectively. The domain owner 135A submits the login information to the service server 125 by selecting the submit button. Flow moves from block 425 to block 430.

At block 430, the service server 125 logs into the DNS provider website using the login information and retrieves the information from the DNS zone file record for the domain. For example, if the DNS provider provides an API for querying the information in the DNS zone file for the domain, the service server 125 uses that API to query for the zone file information. If there is not such an API, the registrations server 125 queries the DNS provider via a service server-controlled agent (e.g., using HTTP or HTTPS protocols). For example, the service server 125 may request the login page, enter any required login information, submit the login page, request one or more pages where the zone file is displayed, store the response from those pages, scan the pages based on the predefined map to retrieve the zone information, and logout of the DNS provider. Flow moves from block 430 to block 440.

Figure 5:
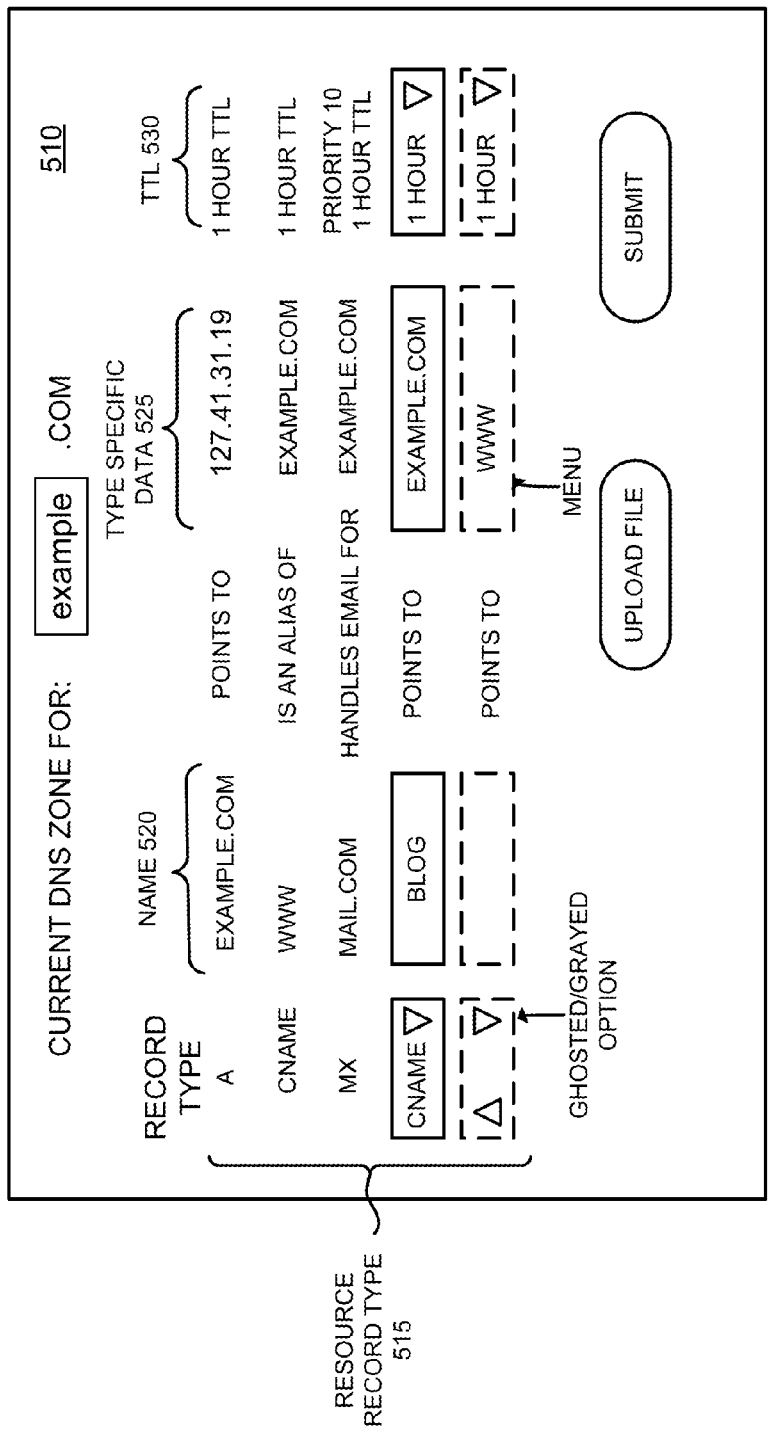
FIG. 5 illustrates an exemplary interface provided by the service server to allow domain owners to enter the information for the DNS zone file records according to one embodiment of the invention.

Referring back to block 435 (the information in the zone file is not capable of being retrieved by the service server 125), the service server 125 prompts the domain owner 135A to enter the information for the DNS zone file record for the domain. For example, FIG. 5 illustrates an exemplary interface provided by the service server 125 to allow domain owners to enter the information for the DNS zone file records. As illustrated in FIG. 5, the interface 510 allows domain owners to indicate for each record a resource record type 515 (e.g., A, CNAME, NS, MX, LOC, etc.), a name 520, resource record type specific data 525, and a time-to-live (TTL) value 530. Flow moves from block 435 to block 440. The service server 125 may also provide a tool to assist the domain owner 135A in manually entering in the information to prevent mistakes.

Figure 6:
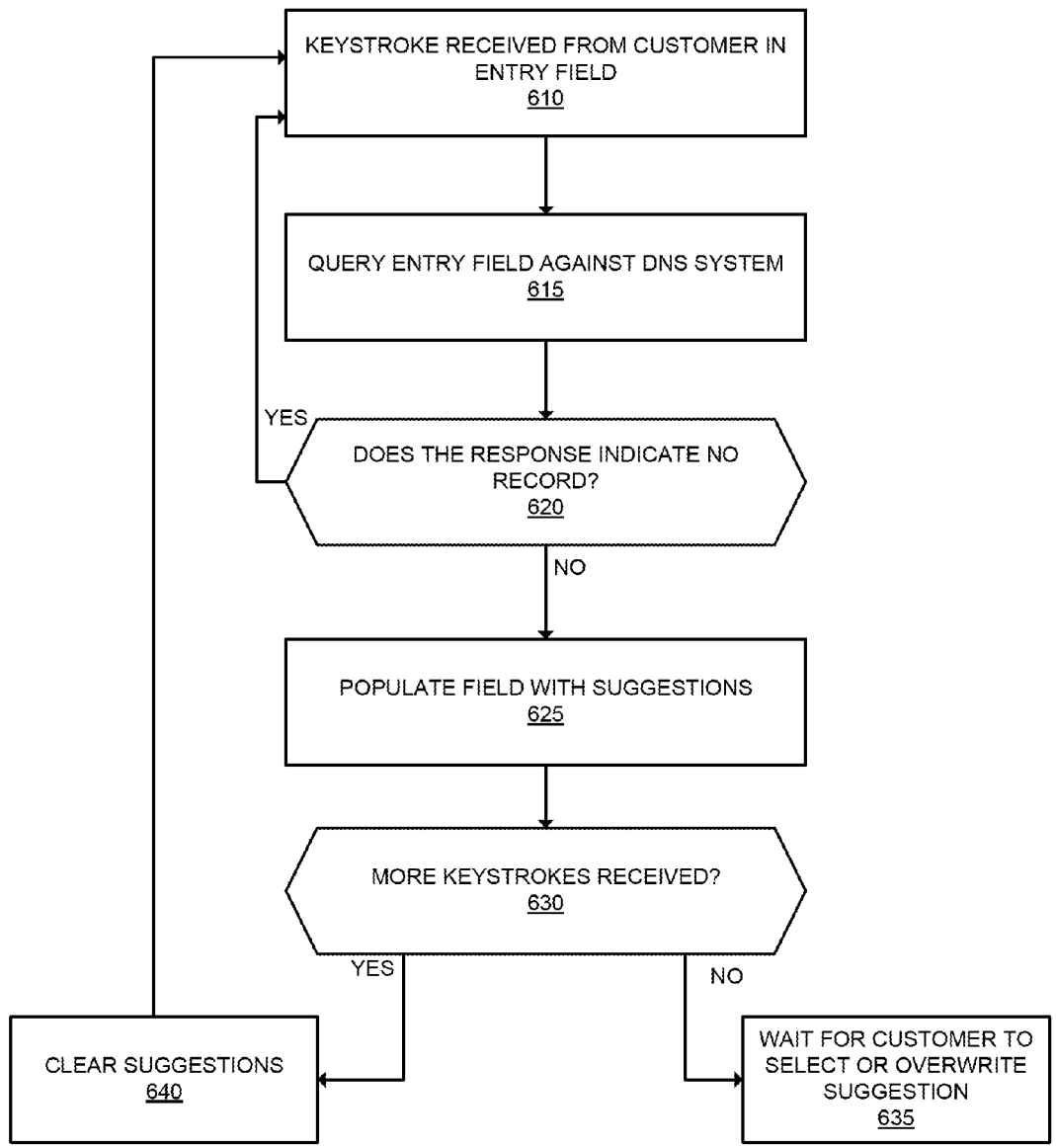
FIG. 6 is a flow diagram illustrating exemplary operations performed by the service server to assist domain owners in manually entering DNS zone file information according to one embodiment of the invention.

FIG. 6 is a flow diagram illustrating exemplary operations performed by the service server 125 to assist domain owners in manually entering DNS zone file information according to one embodiment. At block 610, the service server 125 receives a keystroke input from the domain owner 135A for one of the resource record type fields. For example, with reference to FIG. 5, the domain owner 135A enters at least one keystroke in one of the fields 515, 520 and 525. Next, at block 615, the service server 125 queries the global DNS system for the keystroke input to determine if there is a matching record. Flow then moves to block 620, where the service server 125 determines whether the global DNS system indicates that there is no record for the queried entry. If there is no record, flow then moves back to block 610 where the domain owner 135A may enter more keystroke input. If there is at least one matching record, then flow moves to block 625 where the service server populates the field with one or more suggestions. Flow then moves to block 630, where if the service server 125 receives another keystroke from the domain owner 135A, then flow moves to block 635 where the suggestion(s) are cleared and flow moves back to 610. If more keystrokes are not entered by the domain owner 135A, then flow moves to block 635 where the service server 125 waits for the domain owner 135A to select one of the suggests or add more keystrokes.

Referring back to FIG. 4A, at block 440, the service server 125 displays the zone file information to the domain owner 135A to allow the domain owner 135A to confirm its accuracy. The domain owner 135A may also edit the information if it is not accurate. Flow then moves to block 445 where the service server 125 receives from the domain owner 135A designation of which records in the zone file are to be protected by the service. For example, the domain owner 135A indicates at least that the address record (e.g., record type A or AAAA) of the domain (e.g., example.com) is protected by the service. Flow moves from block 445 to block 450.

At block 450, the service server 125 modifies the DNS zone record(s) designated by the domain owner 135A and the DNS authoritative name servers for the domain to that of the service. For example, the address pointing to the resource record type A (or AAAA) of the domain (e.g., example.com) is changed to an IP address of a proxy server such as the proxy server 120, and the authoritative name servers are changed to authoritative name servers of the service (e.g., including the authoritative name server 142). The proxy server 120 may be one of multiple proxy servers in the service. The service server 125 may choose one of the proxy servers in a number of ways (e.g., based on current and/or expected load, based on location, round robin, etc.). Flow moves from block 450 to block 455.

At block 455, the service server 125 determines whether it supports an automatic setup procedure to change the authoritative name servers at the domain name registrar for the domain. For example, some domain name registrars may provide an API that can be used by the service server to change the authoritative name servers for the domain. The list of domain name registrars that provide such an API and information of how to use the API is stored by the service server 420. As another example, the service server 420 may simulate a human user logging into the domain name registrar's website to change the authoritative name servers for the domain. In such a case, the service server 420 accesses a map of the domain name registrar's website that has been pre-recorded by an operator of the service and stored by the service server 420. The map includes the login page, any fields where the login information is entered, the path to the page on which the authoritative name servers are changed, the fields that must be updated for those authoritative name servers to be changed, and any interface provided to delete name servers. If the service server supports automatic changing of the authoritative name servers at the domain name registrar for the domain, the flow moves to block 460; otherwise flow moves to block 465.

Figure 7C:
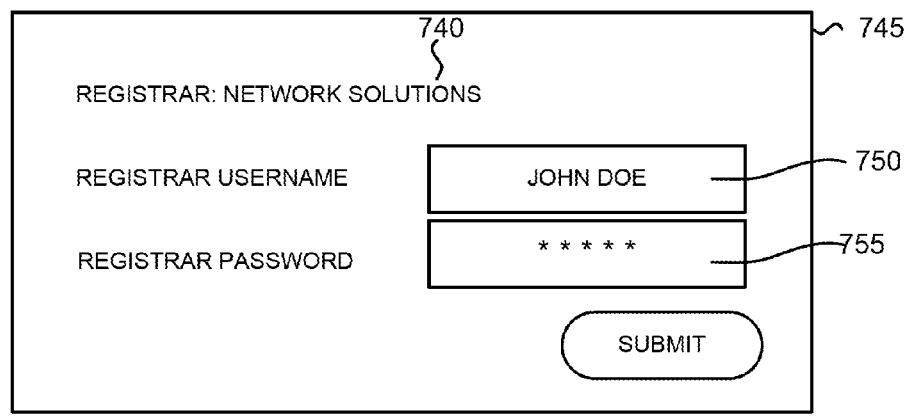

At block 460, the service server 125 receives login information (e.g., username and password) to the domain name registrar's website from the domain owner 135A. For example, with reference to FIG. 7C, the service server 125 provides the domain name registrar login information input form 710 to allow the domain owner 135A to input their username and password for the domain name registrar 715 into the username field 720 and password field 725 respectively. The domain owner 135A submits the login information to the service server 125 by selecting the submit button. Flow moves from block 425 to block 430.

At block 430, the service server 125 logs into the registrar's website and updates the authoritative name servers to that of the service. Flow then moves to block 475 where the service server 125 initiates a test to check to determine whether the authoritative name servers have been successfully changed. For example, the service server queries the global DNS system (e.g., with a dig operation, whois operation, etc.) for the domain to confirm that the authoritative name servers have been successfully changed. It should be understood that it may take some amount of time for the change of the authoritative name server to propagate throughout the global DNS system.

Request Related Actions

Figure 8:
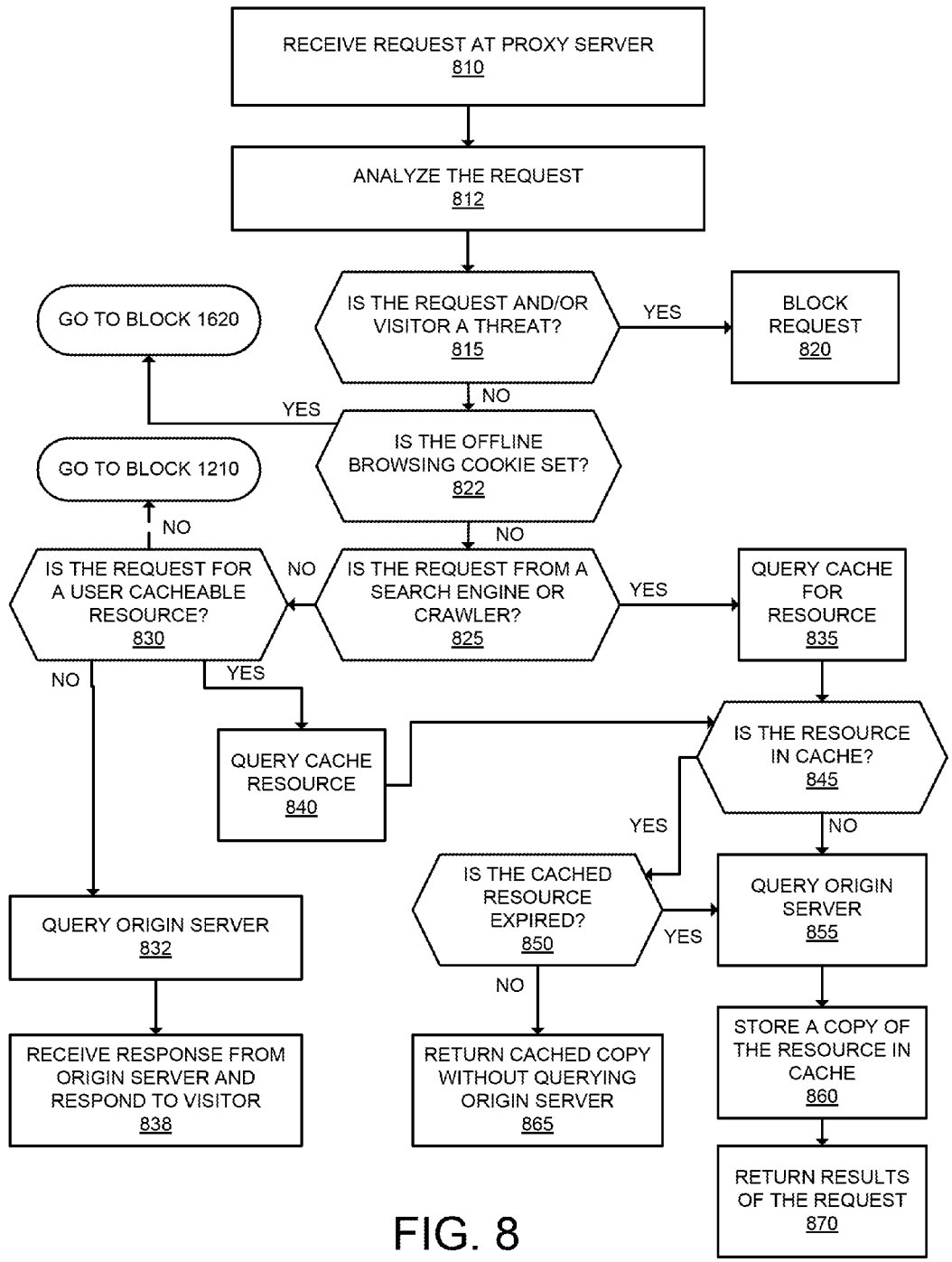
FIG. 8 is a flow diagram illustrating exemplary operations performed by a proxy server according to one embodiment of the invention.

FIG. 8 is a flow diagram illustrating exemplary operations performed by a proxy server according to one embodiment. The operations of FIG. 8 will be described with reference to the client device 110A and the origin server 130A, which corresponds with the domain example.com. At block 810, the proxy server 120 receives the request 154 from the client device 110A for content at the domain example.com. Flow moves from block 810 to block 812 where the proxy server 120 analyzes the request (e.g., similar to the analyzing request operation 164). Flow moves from block 812 to block 815, where the proxy server 120 determines whether the request and/or visitor is a threat.

Figure 9:
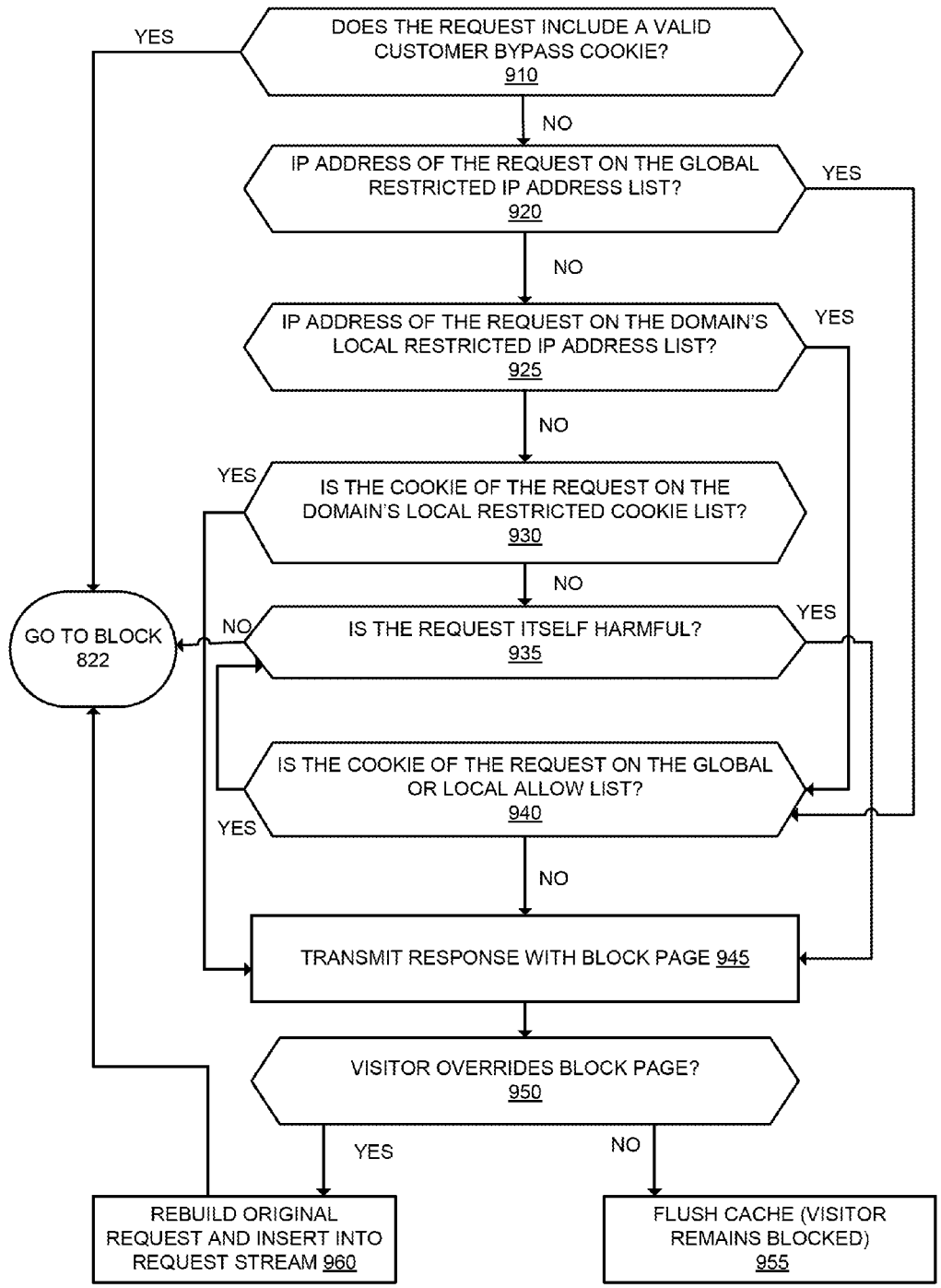
FIG. 9 is a flow diagram illustrating exemplary operations to determine whether a request and/or a visitor is an Internet security threat according to one embodiment of the invention.

FIG. 9 is a flow diagram illustrating exemplary operations to determine whether a request and/or a visitor is an Internet security threat according to one embodiment. The operations of FIG. 9 will be described with reference to the exemplary embodiment of FIG. 2. However, it should be understood that the operations of FIG. 9 can be performed by embodiments of the invention other than those discussed with reference to FIG. 2, and the embodiments discussed with reference to FIG. 2 can perform operations different than those discussed with reference to FIG. 9.

At block 910, the proxy server 120 determines whether the request 154 includes a valid customer bypass cookie. A customer bypass cookie allows customers to bypass any threat checking performed by the proxy server 120. In one embodiment, responsive to a customer logging into the service (e.g., through the service server 125), the service server 125 opens an iFrame or other object (e.g., IMG tag, CSS (Cascading Style Sheets), etc.) that makes a request to the customer's origin server. The proxy server 120 receives this request and returns a result with the customer bypass cookie set, which includes a unique code that identifies the client network application as belonging to the customer. The customer bypass cookie can be stored in a database (or other data structure) and associated with the domain, or it could be a hash of the domain and a salt value. In the former case, if a customer bypass cookie is present in the request, the proxy server 120 accesses the database to determine if the customer bypass cookie matches the correct value. If so, the customer bypass cookie is valid. In the latter case, if a customer bypass cookie is included in the request, the proxy server 120 hashes the requested domain plus the secret salt and compares it to the value of the customer bypass cookie. If they match, the customer bypass cookie is valid. If the request includes a valid customer bypass cookie, then flow moves to block 822 of FIG. 8 and the threat checking is effectively bypassed. If the request does not include a valid customer bypass cookie, then flow moves to block 920.

At block 920, the proxy server 120 determines whether the IP address of the request 154 is on a global restricted IP address list. For example, the proxy server 120 queries the threat database 124 with the IP address of the request 154 to determine whether it is on the global restricted IP address list. If the IP address is on the global restricted IP address list, then flow moves to block 940; otherwise flow moves to block 925.

At block 925, the proxy server 120 determines whether the IP address of the request is on the local restricted IP address list for the requested domain. For example, the proxy server 120 queries the threat database 124 with the IP address of the request 154 to determine whether it is on the local restricted IP address list. If the IP address of the request 154 is on the local restricted IP address list, then flow moves to block 940; otherwise flow moves to block 930.

At block 940, the proxy server 120 queries the threat database 124 to determine whether the cookie (if one is included in the request 154) is included on the global allow cookie list or the local allow cookie list for the requested domain. If the cookie included in the request is one or both of those lists, then flow moves to block 935, otherwise flow moves to block 945.

At block 930, the proxy server 120 queries the threat database 124 to determine whether the cookie included in the request (if one is included) is included on the local restricted cookie list for the requested domain. If the cookie is not on the list, then flow moves to block 935; otherwise flow moves to block 945.

At block 935, the proxy server 120 determines whether the request 154 itself includes harmful material (e.g., virus, worm, or other vulnerability, malformed header, malformed cookie, etc.). If the request includes harmful material, then flow moves to block 945. If the request does not include harmful material, then flow moves to block 822 of FIG. 8.

Figure 11:
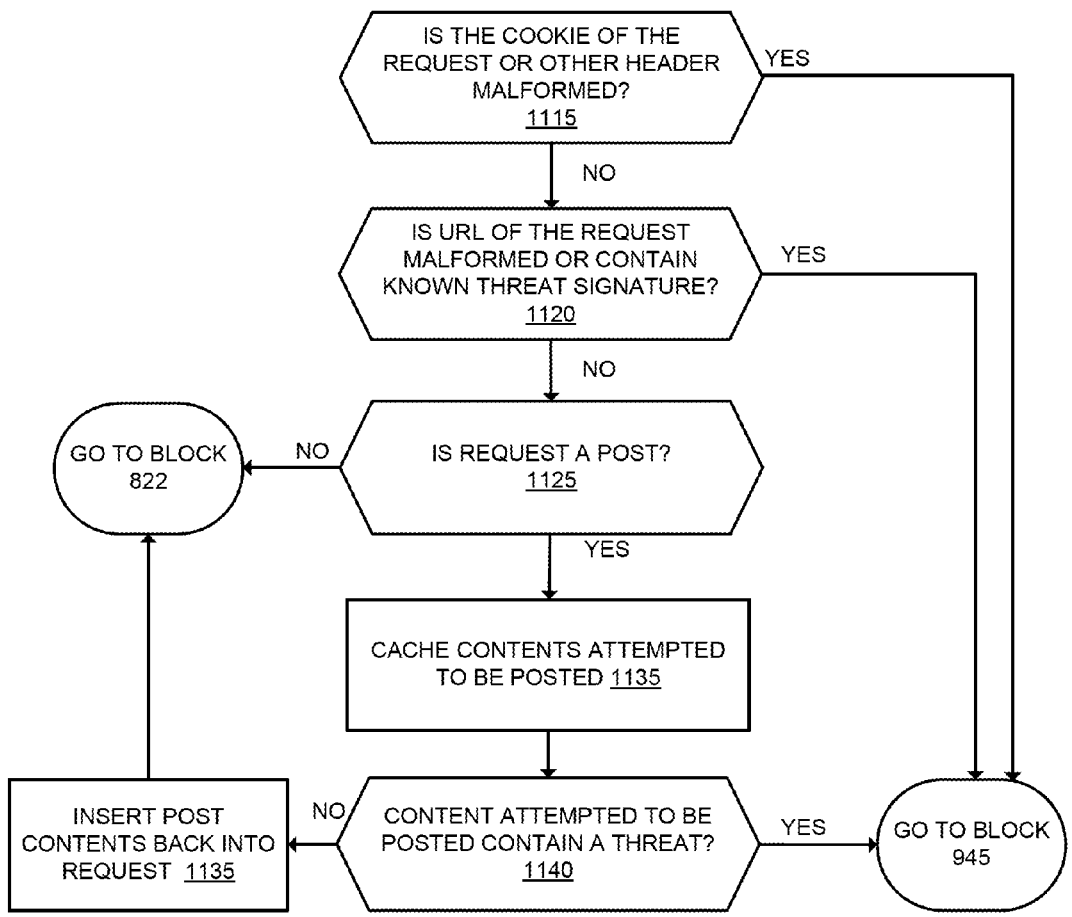
FIG. 11 is a flow diagram illustrating exemplary operations for determining whether the request includes harmful material according to one embodiment of the invention.

FIG. 11 is a flow diagram illustrating exemplary operations for determining whether the request includes harmful material according to one embodiment. At block 1115, the proxy server 120 determines whether the cookie of the request (if one is included) or other header is malformed. Malformed cookies or headers serve as an indication that the request 154 is not from a human user and is a likely indication of suspicious activity. An example of a malformed header occurs if an HTTP GET request does not contain a URL and an HTTP version string. If the request includes a malformed cookie or header, then flow moves to block 945 of FIG. 9; otherwise flow moves to block 1115.

At block 1115, the proxy server 120 determines whether the URL of the request is malformed or contains a known threat signature. To determine if the request includes a known threat signature, the proxy server 120 accesses known threat signatures in the threat database 124 to determine whether the URL matches a threat signature. If the URL is malformed or matches a known threat signature, then flow moves to block 945 of FIG. 9; otherwise flow moves to block 1125.

At block 1125, the proxy server 120 determines whether the request 154 is a POST request. If the request 154 is not a POST request, then flow moves to block 822 of FIG. 8. If the request is a POST, the proxy server 120 analyzes the material attempted to be POSTED to determine whether it contains a threat. Thus, if the request 154 is a POST request, then flow moves to block 1135 where the proxy server 120 caches the content attempted to be POSTed. Flow then moves to block 1140, where the proxy server 120 determines whether the contents attempted to be POSTed contains a threat. For example, the proxy server 120 accesses the threat signatures in the threat database 124 to determine whether the contents attempted to be POSTed match a known threat signature. If the contents attempted to be POSTed match a known threat signature, then flow moves to block 945 of FIG. 9; otherwise flow moves to block 1145 where the proxy server 120 inserts the POST contents back into the request stream and flow moves to block 822 of FIG. 8.

Referring back to FIG. 9, at block 945 the proxy server 120 forms a request having a block page that alerts the user of the client device 110A that access to the requested content has been blocked. The block page is made of various elements that are customized based on the characteristics of the website and/or characteristics of the visitor. In some embodiments, the block page includes the logo of the website the visitor was attempting to visit, a thumbnail screenshot of the website the visitor was attempting to visit, or a full-sized screenshot of the website the visitor was attempting to visit. In some embodiments, the block page appears as a floating HTML element directly over the website the visitor was trying to visit. In some embodiments, the block page appears as a frame or HTML element immediately adjacent to the website the visitor was trying to visit. In embodiments where a website's logo or screenshots of the website are used, the logo or screenshots may be cached and stored in the cache database 122 or they may be calculated in real time as the visitor requests access to the website.

In some embodiments, the information on the block page is customized with information about the requested website. For example, the text on the block page may include the name of the requested website from which the visitor is being blocked (e.g., "The owner of www.example.com has chosen to block potentially dangerous visitors."). The name of the website may be entered by the owner of the site in advance and stored, or it may be calculated from the URL or other header information in the request 154. Other information about the requested website may also be determined including custom instructions, color choices, font choices, layout or design of the block page, and positioning of the block page relative to the website (e.g., covering the whole page, as a bar at the top of the page, as a bar on the side of the page, etc.). In some embodiments the block page settings are specified by the domain owner of the website or set by an administrator of the service.

In some embodiments, in addition to or in place of the characteristics of the website, the block page is customized based on a set of one or more characteristics of the particular visitor being blocked. These characteristics may include one or more of the following: the IP address of the request 154, the referring URL, the user-agent of the request, the visitor's operating system, the visitor's connection speed, the preferred language of the visitor, any cookies on the visitor's browsers, the reason the visitor was blocked, and other characteristics of the visitor (e.g., the fonts installed on the browser, the languages supported by the browser, whether the browser executes JavaScript, etc.). From these initial characteristics, additional characteristics can be determined. For example, the IP address of the request can be referenced to a database to determine the country of origin the request is from. The country of origin of the visitor can then be referenced against a geolocation database in order to lookup languages predominately spoken in that country. This, combined with the preferred language characteristic, may be used by the proxy server 120 in order to deliver text of the block page written in one or more languages likely to be spoken by the visitor. Different translations of the text of the block page may be stored by the proxy server 120 (or other central server) or the translation may be done through language processing software by the proxy server 120 in real time.

Beyond adjusting the language of the text of the block page, the location of the visitor may be used to deliver links to products to help eliminate the underlying problem that caused the visitor to be blocked. For example, if the visitor is from France and is being blocked because of an underlying virus infection, the block page may include links to anti-virus products that are targeted to those solutions that have products designed for a French audience. As another example, the block page may also include a telephone number specific to the country of the visitor that they can call to get help solving the problem that caused them to be blocked. Similarly, the block page may include links or suggestions for anti-virus products specific to the operating system of the visitor.

In addition to the location of the visitor, other information may be used to customize both the links to solutions that are provided as well as the text displayed on the block page. For example, if the reason that the visitor was blocked was because of a virus infection, the system may change the text to provide information about the virus infection (e.g., "You were blocked because it appears you have a virus running on your machine that is sending out spam email," or "You were blocked because it appears you have a the MyDoom virus running on your computer."). The links to solution providers may also be targeted based on the underlying problem that caused the visitor to be blocked. For example, if one anti-virus company is particular adept at removing a particular type of virus, links to that company's products may be more likely to be displayed, or may be displayed more prominently (e.g., in bold, with a highlight, or at the top of a list of multiple other solution providers).

The text and links to solution providers may also be customized based on characteristics of the IP address of the request. For example, the proxy server 120 can look up the reverse DNS and whois entry for the IP address. This information can be used in order to attempt to determine the owner of the IP address. This owner information can be used in order to determine additional characteristics of the visitor. For example, if a reverse DNS entry displays that the reverse DNS for an IP address is node1.example.net, the proxy server 120 can compare this entry against other known reverse DNS entries and can determine the type of connection (e.g., Internet provider, corporate, commercial, etc.). In this case, the system could drop the subdomains of the reverse DNS entry one by one and check if the remainder of the entry is similar to anything stored in the system. In this example, the proxy server 120 may learn that example.net is an internet service provider. The proxy server 120 can characterize connections into various categories based on the reverse DNS and whois information. These categories may include, but are not limited to, residential Internet connections, business Internet connections, government Internet connections, school Internet connections, etc.

In some embodiments, the text and/or solution suggestions are customized based on both the organization identified as the owner of the visitor's IP address in the reverse DNS and whois records as well as meta-information about the organization. For example, a visitor from a residential Internet provider may receive links to personal computer anti-virus. As another example, a visitor from a corporate network may receive information (e.g., a link to a white paper or other document) that includes a description of the underlying problem and instructions to forward it to the corporate network provider. The information may be customized with details of the reason for the visitor having been blocked as well as information or advertisements for solution providers that can protect users of the network in the future, as well as statistics regarding the underlying problem (e.g., the number of users that have been known to experience the same underlying problem, the number of threats detected in their network, comparison with other similar networks, etc.).

Vulnerability solution providers may request to target only certain kinds of visitors. For example, an anti-virus company may request that links for its products may only show up for visitors with a certain set of characteristics (e.g., display an ad for solution 1 from provider A if the visitor is from the Korea, Japan, or China, is running the Windows operating system, is blocked between 12:00 and 1:00 on Mar. 1, 2010, and is blocked because of a MyDoom virus infection). In some embodiments the block page includes all the solutions that match the characteristics requested, while in other embodiments the block page includes only a limited set of providers that match the requested characteristics. In the latter case, the different solution providers may be ranked by how closely the visitor matches the characteristics they described and/or by how much the solution provider has offered to pay for the solution provider's link to be displayed. Links to solution providers may be text links, logos of the solution providers, some other kind of picture, a telephone number, or a combination of the above. The block page may also include a description of the products or service offered by the solution provider.

In some embodiments, in addition or in place of the description and/or links to solution providers, the block page may also include a mechanism for the visitor to dismiss the block page and continue on to the requested content. This is sometimes referred herein as a "dismiss mechanism." The dismiss mechanism may be a link to close the block page; an image, audio, or other form of CAPTCHA; a ping back from anti-virus software after it has scanned or cleaned the visitor's machine, an override code or password provided to customers, or some other dismiss mechanism. In the case of the link, if it is clicked then the block page would be dismissed and the visitor would be allowed on to the actual site. It should be understood in some embodiments, the block page does not include a dismiss mechanism for the visitor to dismiss it.

In the case of the dismissal of the block page requiring a CAPTCHA, the proxy server 120 records the input of the user in response to a graphical image, audio recording, math problem, or something else. If the visitor responds correctly without too many mistakes, the proxy server 120 will dismiss the block page and allow the visitor to retrieve the requested content. In some embodiments, customers are provided an override code or password that can be entered by the customer upon encountering a block page. If successfully entered, the blocking of even malicious requests would be allowed.

In the case of the dismissal of the block page requiring a ping back from anti-virus software after it has scanned or cleaned the visitor's client device, the visitor may be prompted by the block page to scan their client device with anti-virus software or download an anti-virus software program. If the anti-virus software is run and no infections are found, the anti-virus software may send a request to the proxy server 120 (or other computing device of the service) with a unique system clean code, the IP address of the visitor, the cookie of the visitor, and other characteristics to identify the visitor's client device (e.g., the fonts installed, the operating system running, installed plugins, installed browsers, MAC address(es) of network card(s), email address of the visitor, etc.). This indicates to the proxy server 120 that the client device is free from viruses or other software vulnerabilities and is a candidate to be removed from the global restricted IP address list if that IP address is on that list. As another example, after completing a system scan, the anti-virus software may provide the visitor with a unique code that the visitor can enter on the block page in order to dismiss it. Alternatively, if the anti-virus software finds a problem or virus infection, the anti-virus software may offer the visitor options to remove the problem. The anti-virus software does not ping back to the proxy server 120 or provide a code to dismiss the block page until after the visitor's client device has been confirmed as clean.

The system clean code is a unique identifier (e.g., a string of characters) that is supplied by a trusted third party (e.g., anti-virus software company) certifying that the underlying problem has been remedied. The system clean code could be from a list of codes stored by the trusted third party or application (e.g., an anti-virus application) and issued one at a time until they are exhausted. At that time, the anti-virus company could request more codes from the application. Alternatively, the code could be from a list stored by the application and retrieved through an API interface by the trusted third party or application (e.g., anti-virus application). Codes could be requested via the API after the visitor's client device is certified clean. Alternatively, the code is a hash of unique attributes of the client device that has been cleaned by the trusted third party or application (e.g., anti-virus application). In this case, the code could be a standard hash (e.g., MD5, SHA1, SHA256, etc.) of some combination of attributes such as the disinfected client device's browser cookie, IP address, or other attributes transmitted during a connection. These attributes may be combined with a secret salt value in order to make them secure. In this case, the anti-virus application may generate the code itself, or may transmit the attributes to the system for the code to be generated centrally. In any case, once the code is entered the record of the visitor infected can be cleared and the visitor would no longer be blocked. The block may be reinstituted if there is evidence the visitor has become reinfected.

In some embodiments the domain owners select whether a dismiss mechanism is included in the block page and how that dismiss mechanism operates, while in other embodiments the service selects whether a dismiss mechanism is included in the block page and how that dismiss mechanism operates. In some embodiments, the proxy server 120 uses the visitor's characteristics to determine whether to include a dismiss mechanism in the block page. For example, a visitor may be blocked because of a virus infection on the visitor's machine. The proxy server 120 may look up the threat score the particular visitor represents. Threat scores may be represented on an ordered scale. The proxy server 120 can then look to see the preferences of the particular website. For example, the domain owner may specify that visitors with a threat score of 5 or less get a simple link to dismiss the block page; visitors with threat scores from 6-10 must pass a CAPTCHA before they may dismiss the block page; visitors with a threat score from 11-20 may not dismiss the block page unless they use anti-virus software to scan their machine and remove the underlying infection; and visitors with a threat score over 20 may not dismiss the block page at all.

In some embodiments, in addition to or in place of a CAPTCHA, visitors are required to provide an email address, phone number, or other communication address, and must respond to an email, phone call, text message, etc. For example, the visitor may be prompted to click on a link in an email, enter a code through the telephone, send a code through a text message, etc. Only after the identifying prompt has been completed will the block page be dismissed.

In some embodiments, if a visitor dismisses a block page, the proxy server 120 records the event in the visitor statistics. In some cases, the proxy server 120 removes the visitor from the global restricted IP address list subsequent requests for the same content will not trigger another block page. In some embodiments, a cookie with a unique identifier is stored on the visitor's browser after dismissing a block page. When the visitor makes subsequent requests, the proxy server 120 reads the cookie and allows the visitor access without triggering the block page. The cookie may include an expiration time in its value or it may be set to automatically expire. The expiration time may be determined by the system default, based on the characteristics of the particular threat (e.g., what is the threat score of the visitor). When the cookie expires, the visitor will once again be blocked unless the restricted listing has been removed.

Figure 10A:
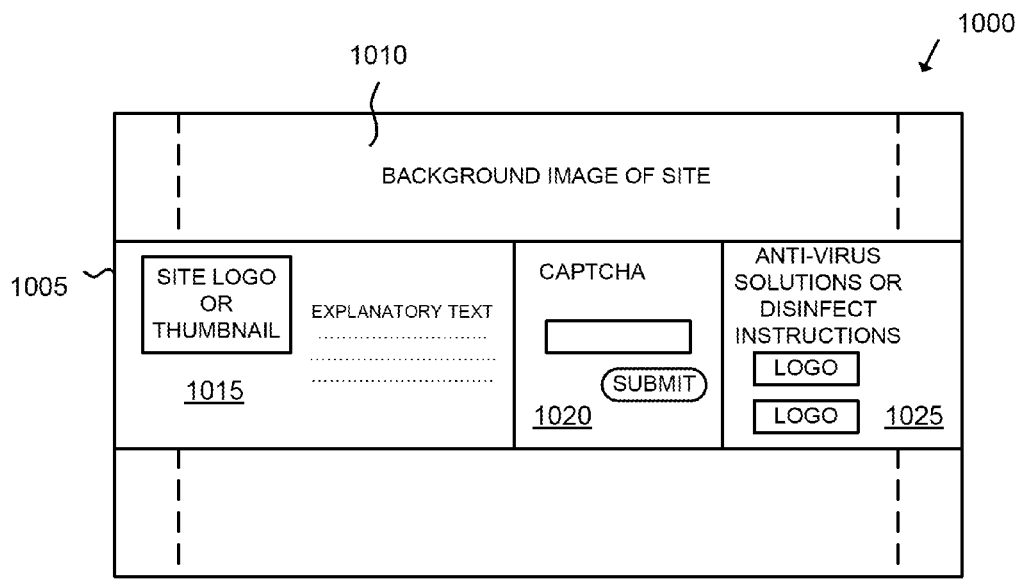
FIGS. 10A-B are exemplary block pages according to one embodiment of the invention.
Figure 10B:
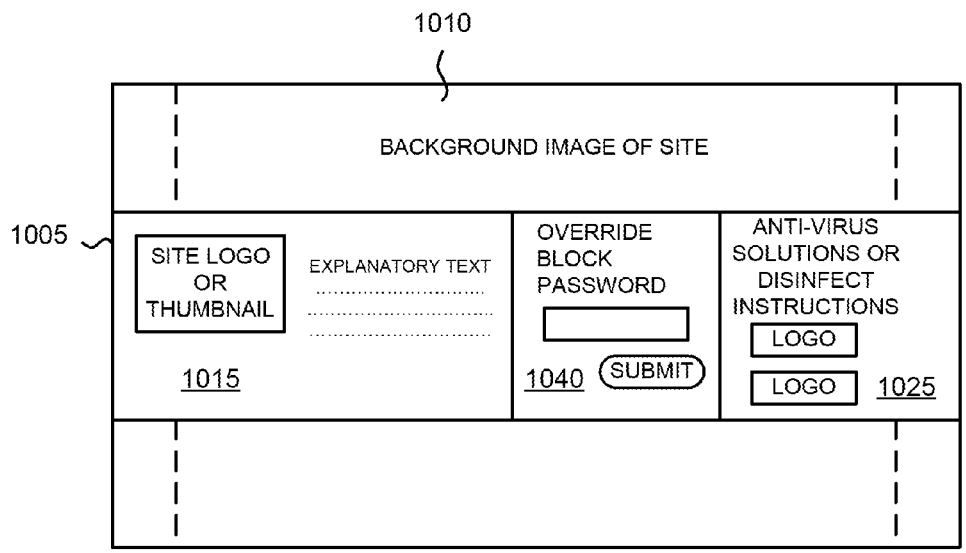

FIGS. 10A-B are exemplary block pages according to one embodiment. As illustrated in FIG. 10A, the block page 1000 includes the block page ribbon 1005 which is overlaid on the background image or content 1010 of the requested content's website. For example, the background image or content 1010 may be a logo of the requested website, a thumbnail screenshot of the requested website, or a full-sized screenshot of the requested website. The background image or content 1010 may be semi-transparent as compared with the block page ribbon 1005. The block page ribbon 1005 includes the explanatory text 1015 which explains why the visitor has been blocked from the website. The dismiss mechanism 1020 is a form of a CAPTCHA where a user needs to enter in a word that has been scrambled such that it is difficult for a non-human visitor to read and subsequently enter. The anti-virus solutions or disinfect instructions 1025 may include instructions to fix the underlying problem that caused the visitor to be blocked and/or links for the visitor to download anti-virus software to clean their client device. FIG. 10B is another example of a block page that is similar to FIG. 10A with the exception of the dismiss mechanism. As illustrated in FIG. 10B, the dismiss mechanism 1040 includes a field for the visitor to enter in a code that is provided by an anti-virus software program after completing a scan and fixing any errors found by the anti-virus software program.

Referring back to FIG. 9, flow moves from block 945 to block 950 where the proxy server 120 determines whether the visitor has successfully overridden the block page. For example, with reference to FIG. 10A, whether the correct CAPTCHA input was entered in the dismiss mechanism 1020; and with reference to FIG. 10B, whether a valid override block password was entered in the dismiss mechanism 1040. If the visitor has not successfully overridden the block page, then flow moves to block 955 the proxy server 120 flushes its cache and the visitor will remain blocked. However, if the visitor successfully overrides the block page, then flow moves to block 960 where the proxy server 120 rebuilds the original request and inserts it into the request stream. For example, with reference to claim 1, the proxy server 120 rebuilds the request 154. Flow moves from block 960 to block 822 of FIG. 8.

With reference back to FIG. 8, after determining that the request and/or the visitor is not a threat at block 815, flow moves to block 822 where the proxy server 120 determines whether the request 154 includes an offline browsing cookie that is set. An offline browsing cookie is a cookie set by the proxy server 120, or other proxy servers of the service, when the origin server returns a server offline error (e.g., an HTTP status code 500 error). Customers can also set offline browsing cookies if they want to place their origin servers as operating in offline browsing mode. An offline browsing cookie may be a domain-wide cookie (e.g., example.com) or specific to a particular subdomain (e.g., news.example.com). If an offline browsing cookie is included in the request, then flow moves to block 1620 of FIG. 16, which will be described in greater detail later herein. If an offline browsing cookie is not included in the request, then flow moves to block 825.

At block 825, the proxy server 120 determines whether the request 154 is from a search engine or a web crawler (e.g., a crawler used to index pages to provide faster search results). For example, the proxy server 120 searches a file or database with IP addresses of known search engines and known crawlers for the IP address of the request 154 (the file or database may reside locally on the proxy server 120 or may be located at a remote server). In some embodiment, the proxy server 120 also checks whether the user-agent of the request matches the user-agent of the known search engine/crawler. If the request is from a search engine or crawler and flow moves to block 835. If the request is not known to be a search engine or crawler, then flow moves to block 830.

At block 830, the proxy server 120 determines whether the request is for a static cacheable resource. A static cacheable resource is a resource that is eligible for being cached in the general purpose cache of the cache 122. Typically static cacheable resources are static files (e.g., images, videos, etc.) and do not include dynamic content (e.g., HTML files). If the request is for a static cacheable resource, then flow moves to block 840; otherwise flow moves to block 832. At block 832, the proxy server 120 queries the origin server for the requested content. For example, with reference to FIG. 1, the proxy server 120 transmits the request 156. Flow moves from block 832 to block 838 where the proxy server 120 receives the response from the origin server and returns the results to the requesting client device. For example, with reference to FIG. 1, the proxy server 120 receives the response 158 from the origin server 130 and transmits the response 162 to the client device 110. It should be understood that since the request was not for a human static cacheable resource, the proxy server 120 does not cache the received content in the cache 122. In some embodiments, instead of directly querying the origin server as described in reference to block 832, the proxy server 120 determines whether to redirect the request directly to the origin server instead of passing the request and response through the proxy server 120. In such embodiments, flow moves from block 830 to block 1210 of FIG. 12.

Returning back to block 840, the proxy server 120 queries the cache 122 (e.g., the general purpose cache) for the requested resource and flow moves to block 845. Returning back to block 835 (the request is from a search engine or crawler), the proxy server 120 queries the cache 122 (e.g., the special purpose cache and/or the general purpose cache) for the requested resource and flow moves to block 845. If the requested resource is not available in the cache 122, then flow moves to bock 855. If the requested resource is available in the cache 122, then flow moves to block 850 where the proxy server 120 determines whether the cached content has expired. If it has not expired, then flow moves to block 865 where the proxy server 120 returns the cached copy without querying the origin server. For example, with reference to FIG. 1, the proxy server 120 accesses the cache 122 in the request and receive content operation 160 and transmits the response 162 to the client device.

At block 855 (the requested resource is not in the cache 122), the proxy server 120 queries the origin server for the requested content. For example, with reference to FIG. 1, the proxy server 120 transmits the request 156 to the appropriate origin server. Flow then moves to block 860. The proxy server 120 receives the response 158 from the origin server and stores a copy of the content in the cache 122 (e.g., in the general purpose cache and/or the special purpose cache). In some embodiments, the proxy server 120 also assigns an expiration value for the cached content, which may depend on the type of content cached (e.g., static content may have a longer expiration period than dynamic content). After caching a copy of the content, the proxy server 122 may locally respond to future requests from search engines or known crawlers for that content. Flow moves from block 860 to block 870 where the proxy server 120 returns the requested content to the client device. For example, with reference to FIG. 1, the proxy server 120 transmits the response 162 to the client device.

In some embodiments, instead of directly querying the origin server as described in reference to block 855, the proxy server 120 determines whether to redirect the request directly to the origin server instead of passing the request and response through the proxy server 120. In such embodiments, flow moves from block 845 to block 1210 of FIG. 12 when the requested resource is not in the cache 122.

Figure 12:
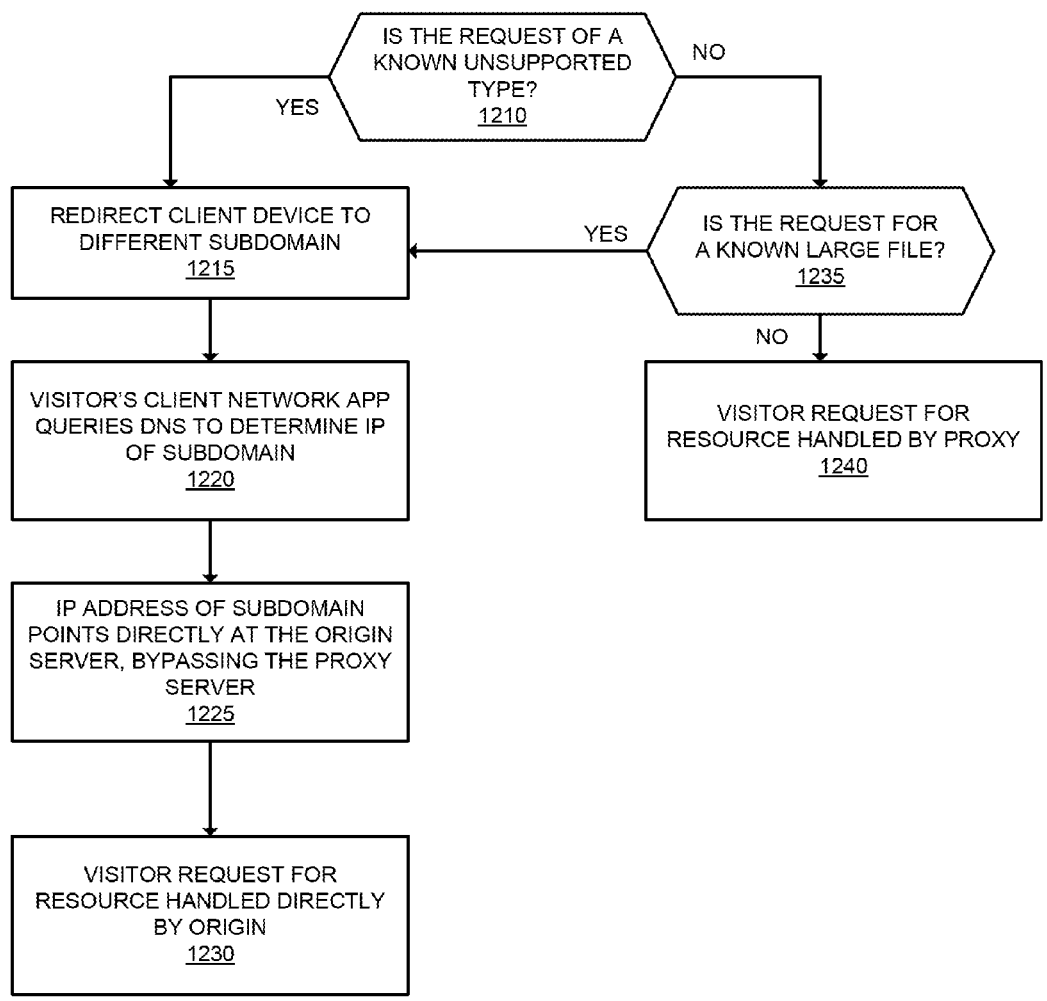
FIG. 12 is a flow diagram illustrating exemplary operations for redirecting requests directly to origin servers according to one embodiment of the invention.

FIG. 12 is a flow diagram illustrating exemplary operations for redirecting requests directly to origin servers according to one embodiment. At block 1210, the proxy server 120 determines whether the request 154 is requesting content that is known to be unsupported by the service (those that will not pass through the proxy server 120). For example, video files may be unsupported by the service. In some embodiments, the service supports different content types for different origin servers (e.g., domain owners may subscribe to different levels of service where an increasing level of service corresponds with an increasing number of content types supported by the service). If the request is for content that is known to be unsupported by the service, then flow moves to block 1215; otherwise flow moves to block 1235.

At block 1235, the proxy server 120 determines whether the request is for content that is known to be for a large file (i.e., greater than a threshold). In some embodiments, the proxy server 120 analyzes the header of the file which gives the content length of the file, which can be compared against the threshold. In some embodiments, the proxy server 120 maintains a large content list for each of the origin servers 130A-L that indicate files that are above a certain threshold. In some embodiments, different thresholds apply to different origin servers (e.g., domain owners may subscribe to different levels of service where an increasing level of service corresponds with an increasing threshold). If the request is not for a known large file type, then flow moves to block 1215; otherwise flow moves to block 1240 where the request is handled by the proxy server 120 as previously described.

At 1215, the proxy server 120 transmits a redirection to the client device 110 that redirects the client device to a subdomain of the domain of the request. For example, the proxy server 120 transmits the response 162 to the requesting client device 110 that includes an HTTP response status code 301, 302, 303, 305, 307, or other redirection status code that indicates that the client device should be redirected to a different subdomain, or a page with a meta redirect and/or a script instructing the client network application to reload the page in another subdomain. The zone file entry for the subdomain will point directly to the origin server and not the proxy server 120. By way of example, assuming the request was for content of the domain example.com, the proxy server 120 transmits a redirection to a subdomain of example.com (e.g., redirect.example.com). Flow moves from block 1215 to block 1220.

At block 1220, the browser of the client device queries the DNS system 140 to determine the IP address of the subdomain. Next, the client device receives the IP address of the subdomain from the DNS system. The IP address will point directly to the origin server and not the proxy server 120. Flow then moves to block 1230, where the client device transmits the redirected request 170 to the origin server and the origin server 130 responds accordingly (e.g., issuing the direct response 172 to the requesting client device).

Validating Visitor Threat

Since IP addresses may not be assigned statically (e.g., they may be assigned dynamically through DHCP), may change who they are assigned to over time, and are subject to being hijacked or spoofed, it is possible for an IP address of a request to be listed on a restricted list (e.g., the global restricted IP address list) even though the client device that is currently associated with that IP address was not responsible for that IP address being added to the restricted list. For example, a client device that receives a dynamic IP address in a public place (e.g., a coffee shop, a library, or other Wi-Fi spot) may receive an IP address that has been listed on a restricted list due to actions performed by a previous client device assigned that IP address. In other words, since a particular IP address is not necessarily tied to a particular client device, there is a possibility that false positives of threats may occur when checking the IP address restricted lists.

In some embodiments, to determine whether the client device is responsible for the IP address being listed on a restricted list, a hierarchical threat checking mechanism is used such that the client device is redirected to a validating domain server for a validating domain designed to create and read cookies for the validating domain responsive to detecting that the IP address of the request is included on a restricted list (e.g., the global restricted IP address list or the local restricted IP address list). Each cookie includes an indication whether the corresponding client network application has previously been determined to be participating in suspicious activities or has been proven to be a human user and not a bot.

With reference to FIG. 1, after determining that the request 154 is a threat due to its IP address being listed on a restricted list (e.g., the global restricted IP address list of the threat database 124), the proxy server 120 redirects the requesting client device to the validating domain, which is served by the validating domain server 180. The client device makes the request 186 to the validating domain server 180 with a cookie for the validating domain (if one exists on the client device). The validating domain server 180 determines, through reading a cookie of the request 186 (if one is included), whether the cookie overrides the listing of the IP address on the restricted list. While in some embodiments, if the cookie overrides the listing of the IP address being included on the restricted list, the response 188 will redirect the visitor to the origin server; in other embodiments the response 188 will redirect the client device to issue the request 154 to the proxy server 120 which will not treat the request as being a threat (at least due to its IP address being included on a restricted list). If the cookie does not override the listing of the IP address, in some embodiments the response 188 includes a block page indicating that the visitor has been blocked and may include a dismiss mechanism.

Figure 13:
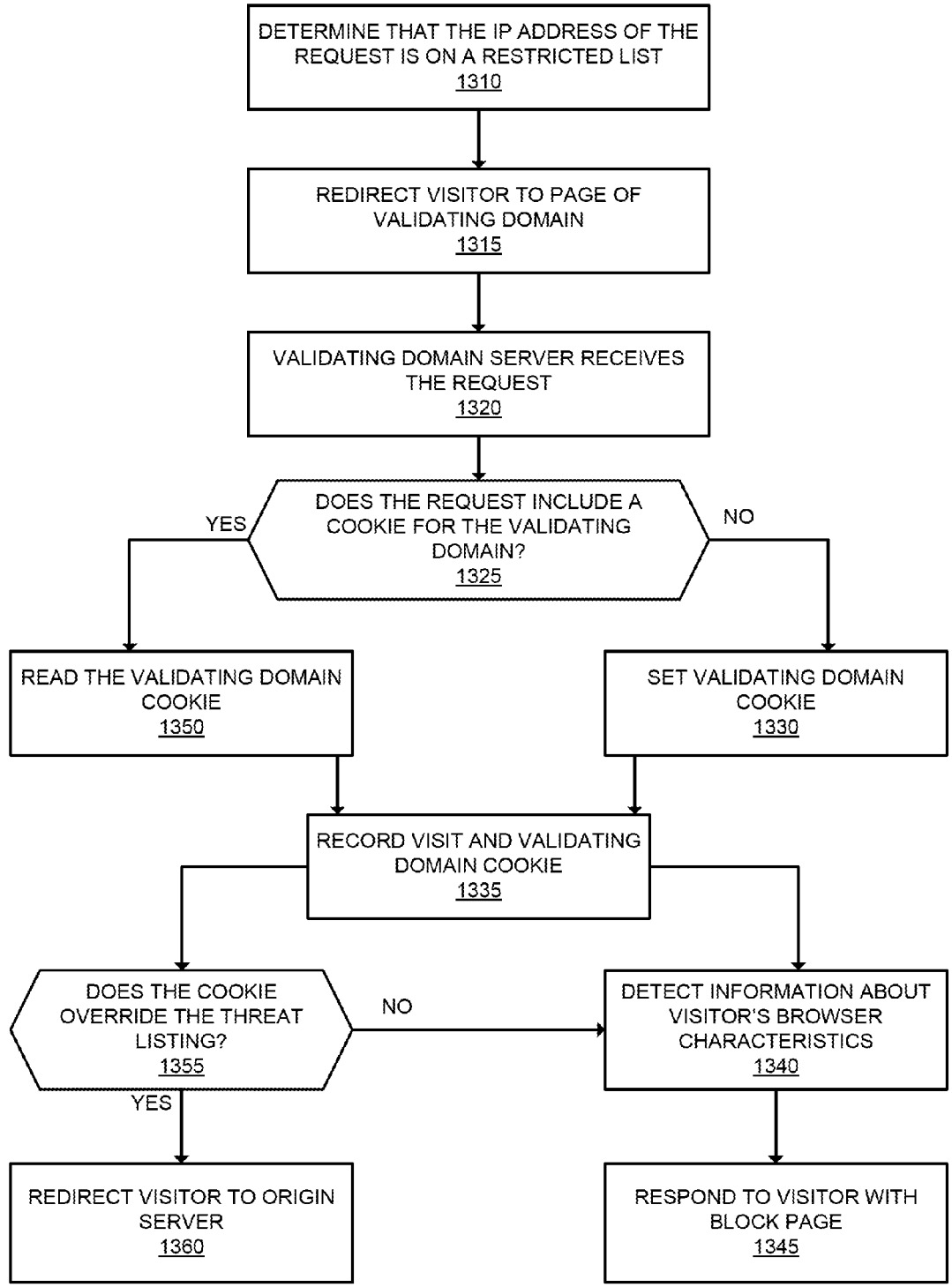
FIG. 13 is a flow diagram illustrating exemplary operations for validating whether a request should be subject to restriction after determining that its IP address is listed on a restricted list according to one embodiment of the invention.

FIG. 13 is a flow diagram illustrating exemplary operations for validating whether a request should be subject to restriction after determining that its IP address is listed on a restricted list according to one embodiment. In some embodiments, the operations described in reference to FIG. 13 are not performed when a request includes a valid customer bypass cookie as previously described with reference to block 910 of FIG. 9.

At block 1310, the proxy server 120 has determined that the IP address of the request 154 is on a restricted list (e.g., the global restricted IP address list). Flow then moves to block 1315 and the proxy server 120 redirects the requesting client device to a page within the validating domain. For example, the response 162 includes an HTTP response status code 301, 302, 303, 305, 307, or other redirection status code that indicates a redirection to the validating domain, or a page with a meta redirect and/or a script instructing the browser to load a page in the validating domain. Flow moves from block 1315 to 1320.

At block 1320, the validating domain server 180 receives the request 186 from the requesting client device. Flow then moves to block 1325 where the validating domain server 180 determines whether the request 186 includes a cookie for the validating domain. If it does not include a cookie, then flow moves to block 1330 where the validating domain server 180 creates a cookie for the requesting client device. After recording the request and the validating domain cookie to the global cookie database 185 in block 1335, flow then moves to block 1340 where the validating domain server 180 detects characteristics about the client network application of the requesting client device. For example, the validating domain server 180 creates a client network application fingerprint based on one or more of the following: whether the client network application loads images; whether the client network application executes JavaScript; the type of network application (e.g., browser name and version); the operating system running the client network application; the fonts installed on the client network application; the languages supported by the client network application; whether the client network application supports plugins (e.g., flash plugins); whether the client network application stores cookies; and whether the client network application responds from the same IP address for various protocol requests.

Flow moves from block 1340 to block 1345, where the validating domain server 180 returns a block page to the requesting client device. For example, the response 188 includes a block page indicating that the visitor has been blocked and may include a dismiss mechanism as described in reference to FIGS. 9, 10, and abb.

If the request 186 includes a cookie, then flow moves from block 1325 to block 1350 where the validating domain server 180 reads the cookie. The validating domain server 180 then records the request and the cookie in the global cookie database 185 and flow moves to block 1355.

The validating domain server 180 determines whether the cookie in the request overrides the listing of the IP address on the restricted list at block 1355. For example, a cookie may include information, or indicate with a code or unique token which is associated with a record of the visitor, that the visitor's client device is clean of viruses (as verified by an anti-virus application), that one or more customers have white-listed the visitor and/or marked the visitor as not a threat, that the behavior of the visitor is consistent with a human user and not a bot, etc. For example, the cookie may indicate that the user of the requesting client device has previously proved that he or she is a human user and is not a bot (e.g., by dismissing a block page using a dismiss mechanism). If the cookie overrides the listing of the IP address on the restricted list, then flow moves to block 1360, otherwise flow moves to block 1340. At block 1360, the validating domain server 180 redirects the requesting client device to the origin server such that the origin server responds to the request. In other embodiments, instead of directing the requesting client device to the origin server, the validating domain server 180 causes the IP address to be removed from the restricted list and redirects the requesting client device back to the proxy server 120.

Tarpitting Visitors That are Threats

In some embodiments, responsive to the proxy server 120 determining that a visitor requesting content has been identified as a threat (e.g., the IP address of the request is included on the global restricted IP address list and/or the local restricted IP address list) and optionally has been verified as a threat, the proxy server 120 tarpits the visitor including reducing the speed at which it processes the requests and responses for the session such that the connection remains open and/or creates a set of one or more false links in the response in order to occupy bots causing them to waste time and resources in following links that do not exist.

Figure 14:
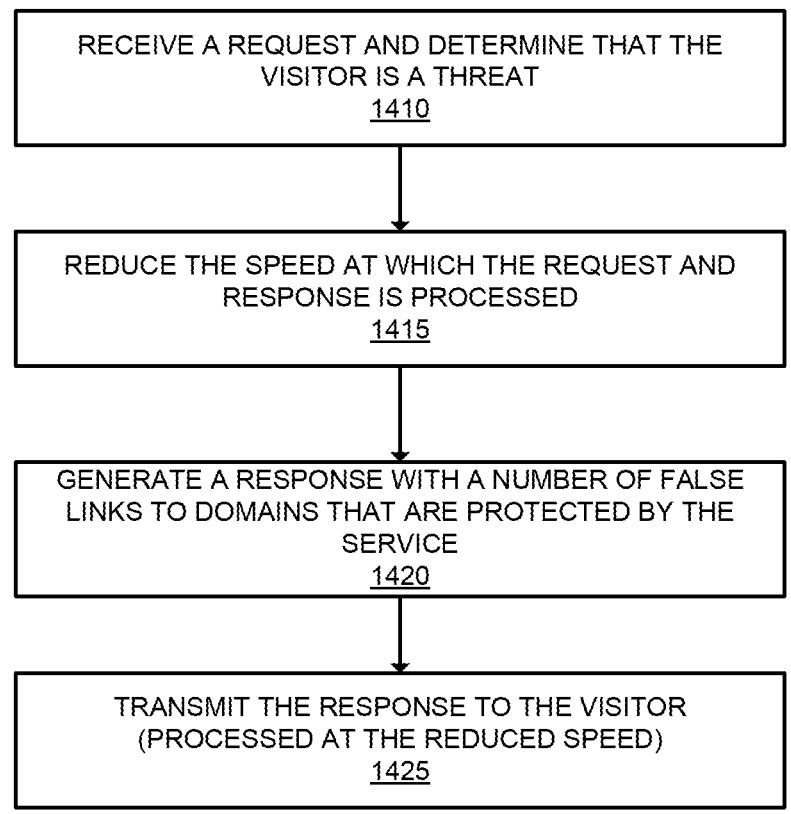
FIG. 14 is a flow diagram illustrating exemplary operations for tarpitting a visitor according to one embodiment of the invention.

FIG. 14 is a flow diagram illustrating exemplary operations for tarpitting a visitor according to one embodiment. At block 1410, the proxy server 120 receives a request and determines that the visitor is a threat (e.g., the IP address of the request is included on a restricted IP address list). Flow then moves to block 1415, where the proxy server 120 reduces the speed at which the request and any response will be processed, while keeping the connection open (thus preventing the connection from timing out). For example, the proxy server 120 turns down the number of bytes per second that it delivers for this connection. Flow moves from block 1415 to block 1420. Since each client network application has a limited number of connections it can make to the Internet, slowing down a connection that is known to be performing suspicious activities both prevents that client network application from participating in suspicious activities to that website as well as limiting the total number of suspicious activities that can simultaneously be performed by that client network application. In other words, the amount of time waiting for the throttled connection reduces the amount of time that a different connection to a different website could be opened by the client network application to perform suspicious activity on that different website.

At block 1420, the proxy server 120 generates a response with a number of false links to domains that are protected by the service. Flow then moves to block 1425, where the proxy server 120 transmits the page to the visitor with the false links (which is processed at the reduced speed). The false links are included in the response such that bot visitors will be occupied by following the false links, which will be subject to the reduced processing restriction as the original request. The false links correspond with false pages that can either be randomly generated, generated based on cached content (e.g., the false links may point to content stored in the cache), and/or reproduced from other pages, which may or may not be pages protected by the service. It should be understood that the links of the page are replaced with false links that point to false content and so on such that the process of generating false links continues indefinitely for each new request and are self referential (thus there is no path out of the labyrinth). Thus, a labyrinth of links that are protected by the service (e.g., requests will be directed to the proxy server) is created into which malicious bots (e.g., email harvesters, etc.) can be effectively trapped. It should be understood that the amount of time the bot spends in following the false links and the amount of time waiting for each request and response to be processed reduces the ability of the bot to perform suspicious activity on different Internet sites, which may or may not be protected by the service. Bots which fall into this tarpit have a difficult time escaping because new false links and false pages are indefinitely generated.

In some embodiments, instead of blocking access to requested content by delivering a false page, the connection speed is reduced yet the requested content is still delivered. This has the benefit of eliminating false positives since, although the connection speed is reduced for a given connection, a legitimate user may still receive the requested content. In some embodiments, the proxy server 120 adds one or more false links that are hidden from human users but capable of being read and followed by bots.

Content can be hidden from human users in a number of ways. For example, CSS can be used to mark a particular portion of code as having display=none or display=hidden. Alternatively, CSS can be used to move the link off the page (<a href="http://www.example.com/" style="position: absolute; left: −250px; top: −250px;">Some Hidden Link</a>). A tag can be included with no contents (e.g., <a href="http://www.example.com"></a>). Content can be included in a comment (e.g., <!--<a href="www.example.com">Some Hidden Link</a><//--!>). A script can be used to hide a link after it has been rendered. A link can be wrapped around a single-pixel, or extremely small, image. It should be understood that these are exemplary techniques and other techniques may be used to include links in a page that is visible to bots but hidden from humans.

In addition to the requested content, the proxy server 120 may also add a mechanism for the user at the requesting client device to prove their legitimacy and thereby increase their connection speed (i.e., to break out of the tarpit). For example, similar to the dismiss mechanism of the block page, the proxy server 120 may add a mechanism to the response (or as a separate response) such as a CAPTCHA challenge for the user of the requested client device to answer, which if performed successfully, may remove the throttling of the connection speed.

In other embodiments, in addition to slowing down the connection for suspicious users, the proxy server 120 responds with false information. For example, instead of responding with the requested content at simply a reduced speed, the proxy server 120 responds with false information of no value to the requesting client device. Thus in addition to slowing down the connection for suspicious users, the content that they receive is of no value. In such embodiments, the proxy server 120 responds locally and does not transmit a request to the origin server. In addition to or in place of the false information, the proxy server 120 may respond with a mechanism for the user at the requesting client device to prove their legitimacy and thereby increase their connection speed. For example, similar to the dismiss mechanism of the block page, the proxy server 120 may add a mechanism to the response (or as a separate response) such as a CAPTCHA challenge for the user of the requested client device to answer, which if performed successfully, may remove the throttling of the connection speed.

The bandwidth allocated to visitors can also be throttled based on server load such that in periods of relatively high load on the proxy server, the visitors with relatively higher threat scores and/or requesting false content (e.g., they are tarpitted) have their bandwidth throttled while the bandwidth allocated to visitors with relatively lower threat scores and/or not requesting false content is maintained.

In some embodiments, in addition to trapping malicious bots, the proxy server 120 can record recent queries to the labyrinth and report the number of malicious crawlers it currently occupies as well as the bandwidth and time it has caused them to waste. In addition, the proxy server 120 can leverage that a visitor is caught in the tarpit as evidence to support the conclusion that it is malicious.

Response Related Actions

With reference to FIG. 1, after receiving the response 158 from an origin server 130, the proxy server analyzes the response (at the analyzing response operation 166) and performs a set of one or more response related actions to perform based on the results of the analyzing.

Figure 15:
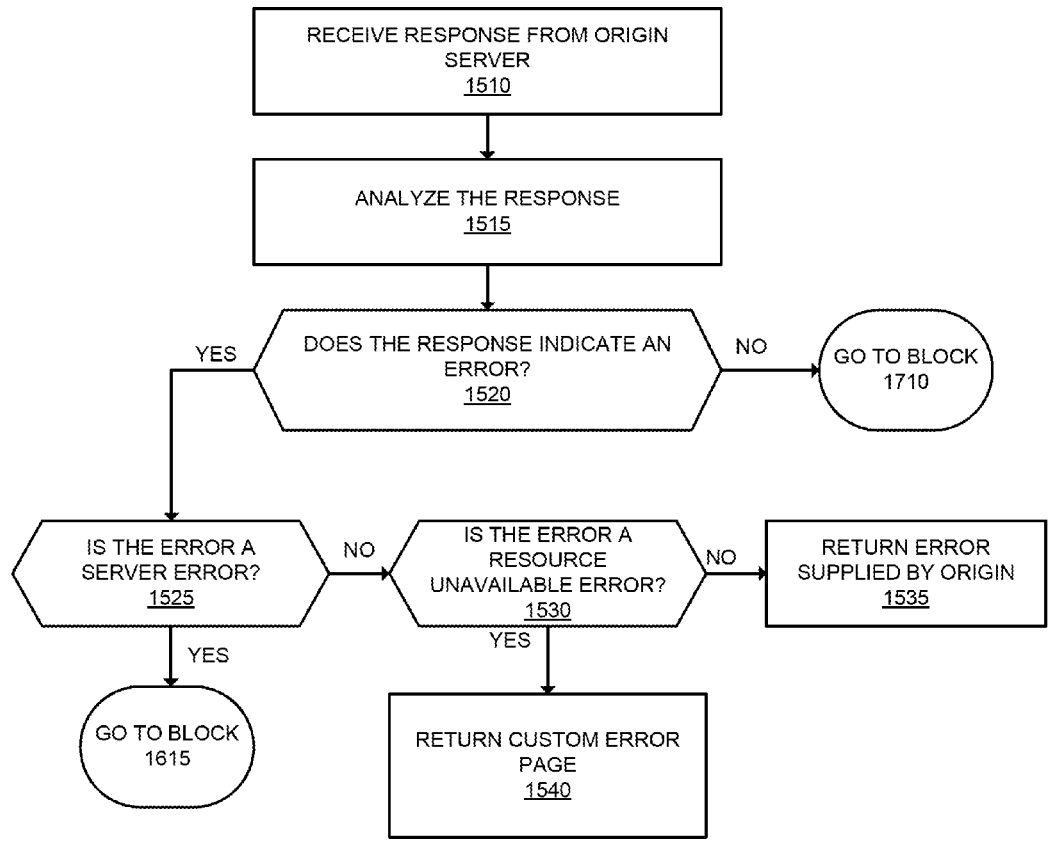
FIG. 15 is a flow diagram illustrating exemplary operations for performing response related actions according to one embodiment of the invention.

FIG. 15 is a flow diagram illustrating exemplary operations for performing response related actions according to one embodiment. At block 1510, the proxy server 120 receives the response 158 from an origin server 130. Flow then moves to block 1515 where the proxy server 120 analyzes the response 158 (as indicated by the analyze response operation 166 of FIG. 1). Control moves from block 1515 to block 1520.

At block 1520, the proxy server 120 determines whether the response 158 includes an error (e.g., an HTTP status code 4XX client error or 5XX server error). If the response 158 includes an error, then flow moves to block 1525. If the response 158 does not include an error, then flow moves to block 1710 of FIG. 17. At block 1525, the proxy server 120 determines whether the error is an indication that the origin server is offline (e.g., the error is an HTTP status code 500 error). If yes, then flow moves to block 1615, which will be described in greater detail with respect to FIG. 16. If no, then flow moves to block 1530.

At block 1530, the proxy server 120 determines whether the error is an indication that the resource is unavailable (e.g., the error is an HTTP status code 404 error) If it is not, then flow moves to block 1535 where the proxy server 120 transmits the response 162 to the requesting client device with the error supplied by the origin server. If the error is a resource unavailable error, then flow moves to block 1540 where the proxy server 120 transmits the response 162 to the requesting client device with a custom error page. For example, in some embodiments, the proxy server 120 creates a custom error page based on one or more of the following: the location (e.g., country) of the visitor who triggered the error; the location of the origin server; the language of the visitor who triggered the error; any cached content on the website where the error occurred, including the page that may have been cached before the error occurred or other pages on the site that give an overall context to the site generally (e.g., the type of site (e.g., sports, news, weather, entertainment, etc.)); a list of links or terms provided by the customer; the list of the most accessed pages elsewhere on the website determined by other visitors; any terms that can be parsed from the request URL or POST; and any terms that can be parsed from the referrer URL. Based on one or more of these factors, the error page may include links to other pages on the website or on other websites that would be of interest to the visitor. In some embodiments, the links are sponsored to advertisers looking to target individuals requesting particular content. In some embodiments, if the originally requested content has moved locations (e.g., it is now available at a different URL), the custom error page includes a link to a new location of the originally requested content or automatically redirects the visitor to the new location of the originally requested content. In some embodiments, the proxy server determines that requested content has moved locations by comparing a hash of the original content with hashes of other content from the same origin server when an error message occurs.

Origin Server Offline Handling

In some embodiments, the proxy server 120 serves cached content (when available) to requesting client devices when the origin server is offline. In addition, if the requested content is HTML content or other content that can be modified, the proxy server 120 adds an automatic server query script to the cached content to cause the client network application of the visitor to automatically and periodically determine whether the origin server is online (e.g., by pinging the origin server). In some embodiments, to reduce the load on the origin server, the automatic server query script queries the proxy server 120 periodically and the proxy server 120 periodically queries the origin server. In addition, the proxy server 120 does not immediately ping the origin server upon receipt of each query request it receives from executing automatic server query scripts. Rather, the proxy server 120 maintains an independent origin server ping timer to determine when to ping the origin server such that the number of times the origin server is pinged is reduced. In some embodiments, the origin server ping timer is specific to the entire domain represented by the origin server (e.g., example.com) and is not limited to a specific resource of the domain (e.g., example.com/example.html), while in other embodiments there is a separate origin server ping timer for each resource.

In other embodiments, the automatic server query script, when executed, directly queries the origin server to determine whether it is online. For example, the automatic server query script may check to determine whether the origin server is online by pinging it.

Figure 16:
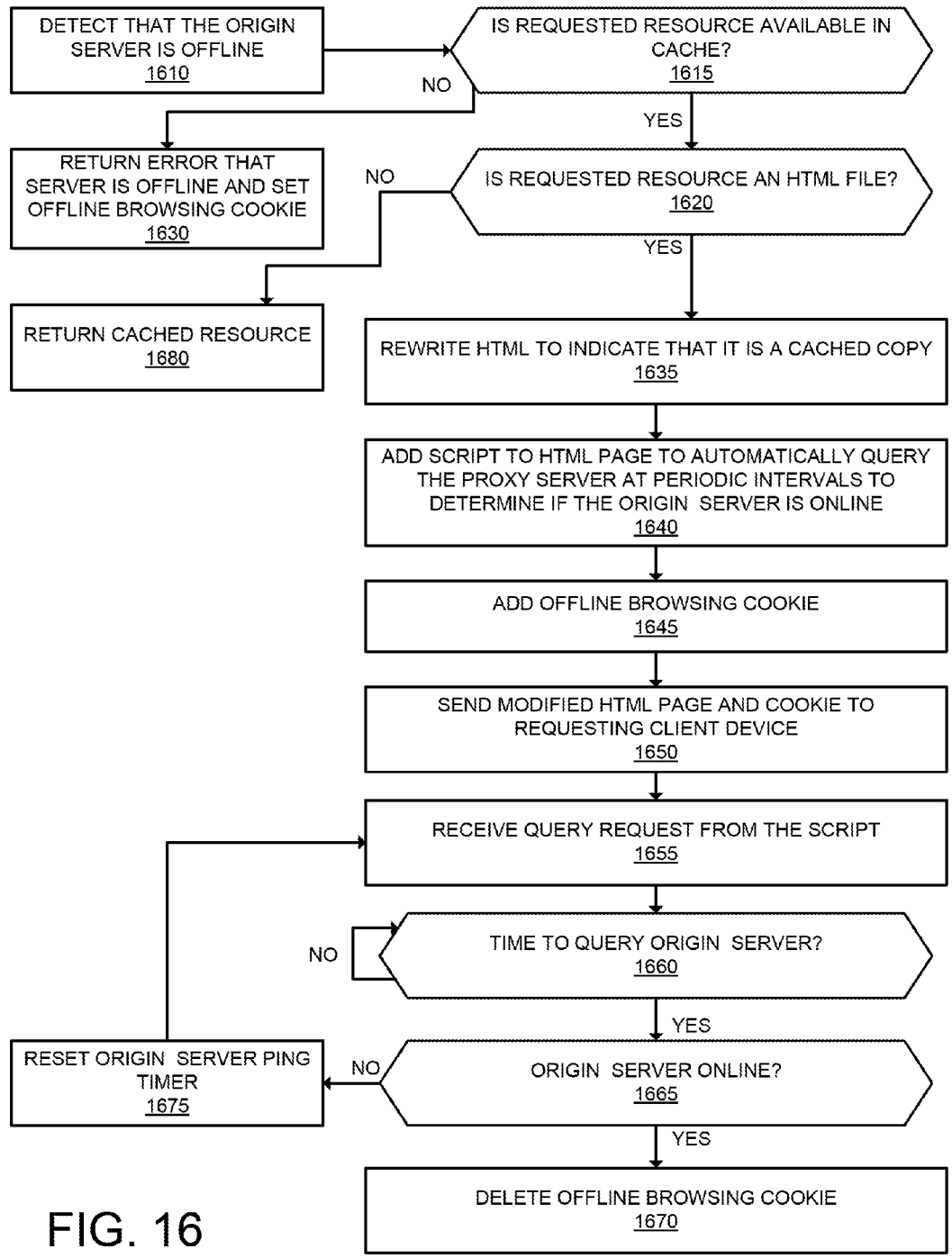
FIG. 16 is a flow diagram illustrating exemplary operations performed by the proxy server when responding to server offline errors according to one embodiment of the invention.

FIG. 16 is a flow diagram illustrating exemplary operations performed by the proxy server 120 when responding to server offline errors according to one embodiment. At block 1610, the proxy server 120 detects that the origin server is offline. For example, the proxy server 120 receives the response 158 which includes an error code that indicates that the origin server is offline. Flow then moves to block 1615, where the proxy server 120 determines whether the requested resource is available in cache. For example, the proxy server 120 queries the cache 122 for the resource. If it is not available, then flow moves to block 1630 where the proxy server 1630 returns an error to the requesting client device that indicates that the origin server is offline and includes an offline browsing cookie for the requested domain. If the resource is available in cache, then flow moves to block 1620.

At block 1620, the proxy server 120 determines whether the requested resource is an HTML file (e.g., the proxy server 120 examines the header of the request to determine whether it is an HTML file). If the requested resource is an HTML file, then flow moves to block 1635, otherwise flow moves to block 1680 where the proxy server 120 returns the cached resource to the requesting client device in the response 162. The cached resource is associated with a TTL (time-to-live) value set by the proxy server 120.

At block 1635, the proxy server 120 rewrites the HTML page to indicate to the user that it is viewing a cached copy of the page. This may include the time and date at which the cached version was created. Flow then moves to block 1640, where the proxy server 120 adds an automatic server query script to the HTML page that automatically pings the proxy server 120 at periodic intervals to query the origin server to determine whether it is online. The script will execute as long as the page is open on the client device.

Flow then moves to block 1645, where the proxy server 120 adds an offline browsing cookie. Next, flow moves to block 1650 and the response with the modified HTML page and the offline browsing cookie is sent to the requesting client device.

Flow moves from 1650 to 1655 where the proxy server 120 receives a query request from the script added to the HTML page of the cached content. Responsive to receiving the query request, the proxy server 120 determines whether to query the origin server to determine whether it is online at block 1660. For example, in some embodiments, the cached resource is associated with a TTL (time-to-live) value set by the proxy server 120 which serves as an origin server ping timer. When the TTL value has expired, flow moves to block 1665 where the proxy server 120 queries the origin server to determine whether it is online (e.g., by pinging the origin server). If the TTL value has not expired (thus it is not time for the proxy server 120 to query the origin server), flow remains at block 1660.

At block 1665, the proxy server 120 determines whether the origin server is online (e.g., whether the proxy server 120 receives a response from the origin server). If the origin server is online, then flow moves to block 1670 where the proxy server 120 deletes the offline browsing cookie. The proxy server 120 may also transmit an offline browsing cookie to the requesting client device that has a past expiration date such that the next time a user makes a request for a page within the domain corresponding to the cookie, the client network application will determine that the offline browsing cookie has expired and will remove it. If the origin server is offline (e.g., it did not respond to the ping), then flow moves to block 1675 where the proxy server 120 resets the origin server ping timer. Flow moves from block 1675 back to block 1655.

Modifying the Content of the Response

In some embodiments, the proxy server 120 modifies the content of the response 162 before delivering it to a client device 110. The content to be modified may originate from the origin servers and/or be located in the cache 122. Different types of content may be modified different in embodiments. For example, content that poses a threat to a client device may be removed from the resource. As another example, email addresses included in the content may be scrambled such that they will be displayed on the screen of the client device but will not be readable from the source of the page, thus preventing the email address from being harvested by an email harvesting program. As another example, domain owners may define rules that indicate that certain objects included in content are to be modified (e.g., excluded from the content in the response, obfuscated such that it will be displayed and understood by a human user but will not be readable from the source of page, etc.) for certain visitors based on one or more characteristics of the visitor ("modified rules").

In some embodiments, the proxy server does not modify responses based on certain visitor characteristics. For example, if the request includes a valid customer bypass cookie, the proxy server 120 will not modify the response.

Figure 17A:
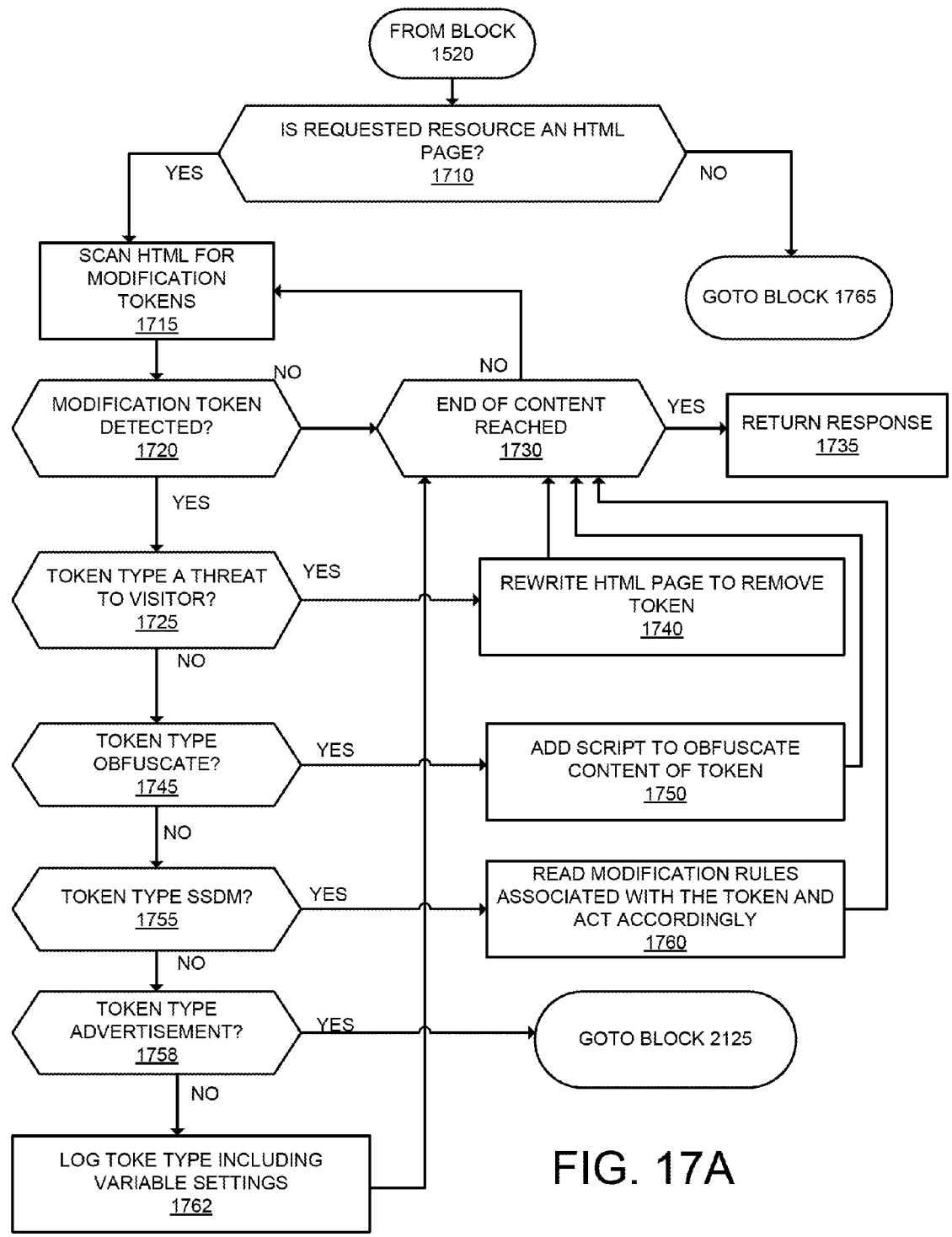
FIGS. 17A-B are flow diagrams illustrating exemplary operations performed by the proxy server for determining whether and how to modify the content of a response according to one embodiment of the invention.
Figure 17B:
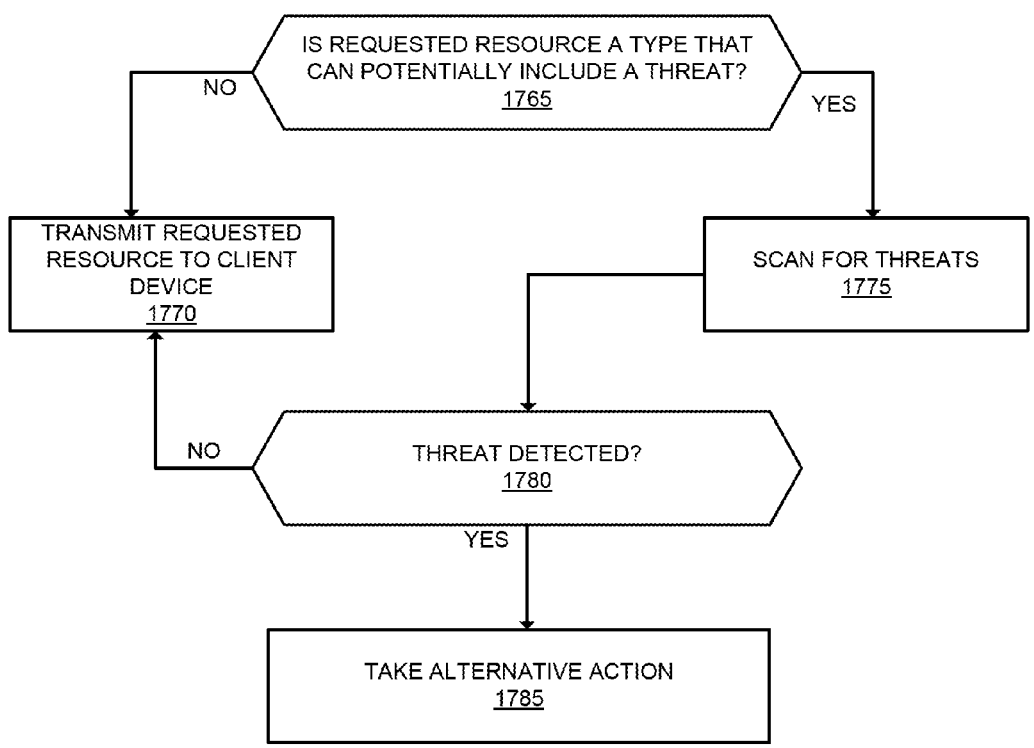

FIGS. 17A-B are flow diagrams illustrating exemplary operations performed by the proxy server for determining whether and how to modify the content of a response according to one embodiment. In one embodiment, the operations described in FIGS. 17A-B start from block 1520 of FIG. 15 (e.g., the response does not indicate an error message such as a resource unavailable error or server offline error).

At block 1710, the proxy server 120 determines whether the requested resource is an HTML page (e.g., the proxy server 120 analyzes the header of the request to determine the type of resource). If the requested resource is not an HTML page, then flow moves to block 1765. If the requested resource is an HTML page, then flow moves to block 1715.

At block 1715, the proxy server 120 scans the HTML page for modification tokens. A modification token is an identifier that indicates that the content represented by that modification token is to be modified or removed from the HTML page. There are different types of modifications tokens. Exemplary types of modification tokens include potential threat to a visitor, obfuscation, SSDM (server side defined modification), and advertisement tokens. By way of specific example, if email addresses are automatically obfuscated, a modification token of a type obfuscation is an email address that meets the following pattern: [at least one character]@[at least one character].[at least two characters]. Other modification tokens may be described with tags. For example, an SSDM modification token may identified with an opening tag and ending tag (e.g., <!--SSDM--> and <!--/SSDM-->). Other modification tokens can identify phone numbers, instant messenger IDs, street addresses, links to other websites, birthdates, social security numbers, IP addresses, credit card numbers, account usernames, etc. In one embodiment, modification token definitions, which define how tokens are identified and their type, are stored in a database or other data structure available to the proxy server 120. Flow then moves to block 1720 where the proxy server 120 determines whether the HTML includes a modification token. If it does, then flow moves to block 1725, otherwise flow moves to block 1730. At 1730, the proxy server 120 determines whether the end of the content has been reached. If it has, then flow moves to 1735 where the response is transmitted to the client device. If it has not, then flow moves back to block 1715 where the proxy server 120 continues to scan the HTML page for tokens.

At block 1725, the proxy server 120 determines whether the modification token is a type that is a threat to a visitor. For example, a modification token that may be a threat to the visitor is an element on the page that could harm the visitor such as a virus, worm, malware, adware, etc. If the modification token is of a type that is a threat to a visitor, then flow moves to block 1740 where the proxy server 120 modifies the HTML page to remove the content corresponding to that token. Flow moves from block 1740 back to block 1730.

If the modification token is not a type that is a threat to a visitor, then flow moves to block 1745 where the proxy server 120 determines whether the modification token is an obfuscation type (e.g., an email address that is to be obfuscated). If the modification token is an obfuscation type, then flow moves to block 1750 where the content corresponding to the modification token is obfuscated by replacing it with an obfuscation script, which when executed (e.g., upon the page loading in the client network application), generates the data such that it will be displayed on the rendered page but will not be readable by a bot (e.g., the content is not included in the page source). By way of specific example regarding email addresses, an email address is replaced with an obfuscation script that, when executed, hides that email address from automated bots (the email address will not appear in the page source) but generates the email address to be displayed to the user in the rendered page. In some embodiments, the obfuscation script also encodes the email address as displayed to the user with a mailto attribute such that when clicked by the visitor, their email program will launch (if it is not already launched) and a new email message window will be created that is addressed to that email address.

Figure 18:
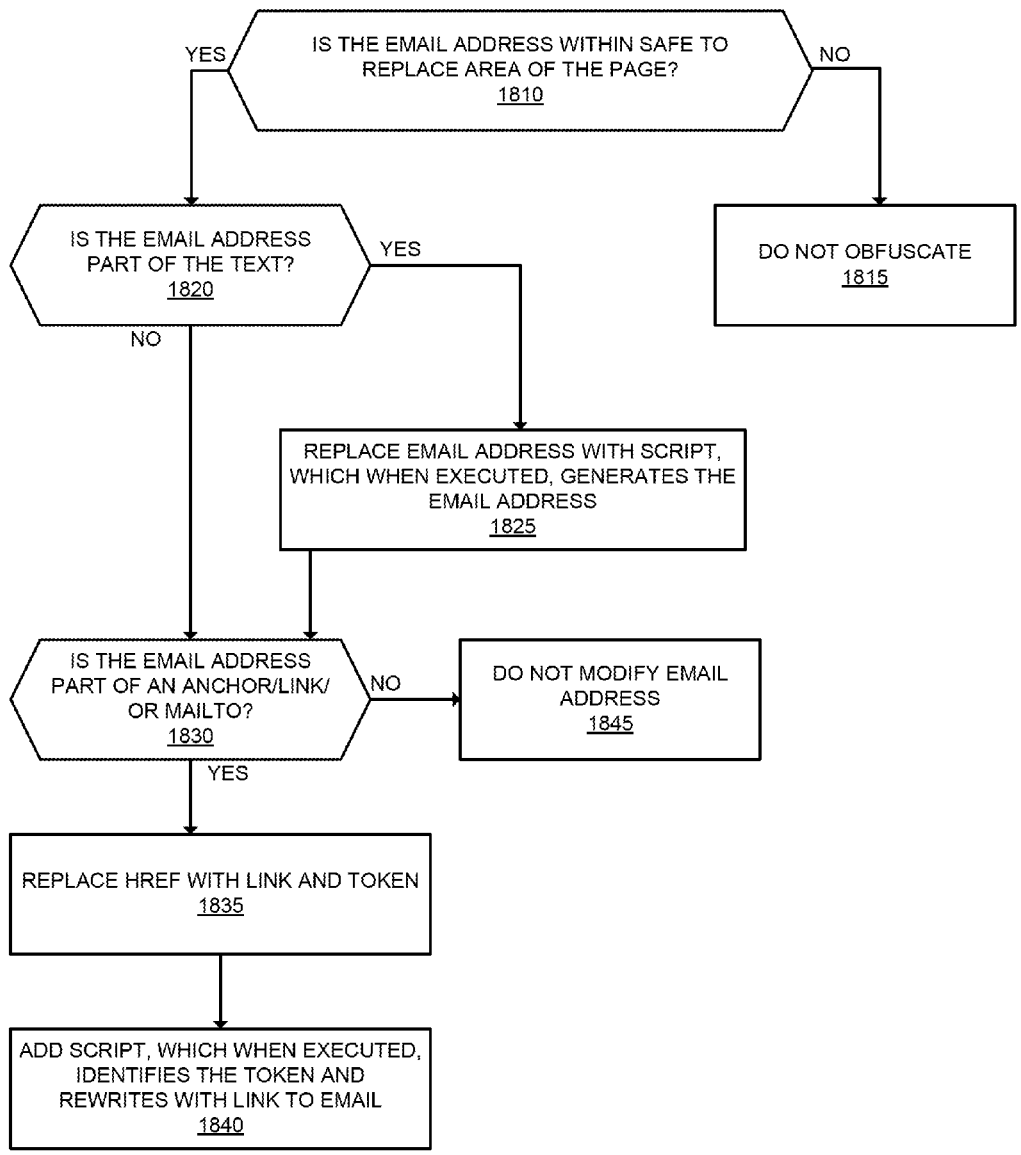
FIG. 18 is a flow diagram illustrating exemplary operations for obfuscating an email address according to one embodiment of the invention.

FIG. 18 is a flow diagram illustrating exemplary operations for obfuscating an email address according to one embodiment. While FIG. 18 is specific to obfuscating an email address, it should be understood that similar operations apply to obfuscate other elements that may be included in the requested resource (e.g., phone numbers, email addresses, instant messenger IDs, street addresses, links to other websites, birthdates, social security numbers, IP addresses, credit card numbers, account usernames, etc.).

At block 1810, the proxy server 120 determines whether the email address is within an area of the HTML page that is safe to modify. Generally, an area that is safe to modify is an area of the HTML page in which the obfuscation script can execute. Examples of areas in which the obfuscation script cannot execute (and are thus not safe areas to modify) include the header of the page, a comment, or another script. In one embodiment, the resource modification module 275 tracks the current state of the HTML page to determine whether it is safe to modify the HTML page. HTML is made up of states that create text and markup. Markup is the content that either is not displayed to the user directly, or provides the formatting for the content that is displayed to the user. For example, in an HTML page the contents of the <HEAD> section is markup. Any content in that section is not rendered on the page to the user. Similarly, any content within the less-than and greater-than characters forms a tag. These tags then form markup which formats the page to the user. Finally, certain other tags generate markup which is not displayed. For example, the <script> <pre> <code> and <!--(comment)--> tags all create areas between their beginning and ending (e.g., </script> </pre> </code> and <//--!>) that are not directly displayed. Email addresses in areas of the page that are directly displayed may be replaced with the obfuscation script that will, programmatically, generate the replaced email address. If the email address is in markup or some other area of the page that prevents the rendering of script, then the email address will not be replaced with the obfuscation script. Thus, if the email address is within the header of a page, a comment, another script, or somewhere else where a script cannot execute, then flow moves to block 1815 where the email address is not scrambled. If the email address is within an area of the HTML page that is safe to modify, then flow moves to block 1820.

With reference to block 1815, in some embodiments, even if the email address is not replaced with an obfuscation script, the email address can still be obfuscated in such a way that the email address cannot easily be harvested. For example, the resource modification module 275 can replace the email address by spelling the [@] symbol and the [.] symbol (e.g., modifying <user@example.com> with <user[at]example[dot]com>). Other ways of obfuscating the email address may also be used (e.g., replacing the ASCII characters with their digital equivalent, creating an image of the email address and replacing the email address with that image, etc.).

At block 1820, the proxy server 120 determines whether the email address is part of the text of the HTML page that is displayed to the visitor. If the email address is not part of the text, then flow moves to block 1830. If email address is part of the text, then flow moves to block 1825 and the proxy server 120 replaces the email address with an obfuscation script which, when executed by the client device, generates the email address to be displayed to the visitor. Thus, when viewing the source of the HTML page, which is typically what automated email address harvesting programs use to harvest email addresses, the email address is replaced with the script, which cannot be typically interpreted by an automated email address harvesting program. Thus, the email address will be protected from being harvested thus reducing the amount of unsolicited email to that email address. Flow moves from block 1825 to block 1830.

At block 1830, the proxy server 120 determines whether the email address is part of an anchor, link, or mailto element. If it is not, then flow moves to block 1845 and the email address is not modified. However, if the email address is part of an anchor, link, or mailto element, then flow moves to block 1835 and the proxy server 120 replaces the hypertext reference (href) with a link and a unique token (e.g., a unique string of characters). Next, flow moves to block 1840 where the proxy server 120 appends a script that, when executed by the client network application, scans for the unique token and rewrites the token with the link (e.g., mailto attribute) such that when clicked by the visitor, their email program will launch (if it is not already launched) and a new email message window will be created that is addressed to that email address. Thus, when viewing the source of the HTML page, which is typically what automated email address harvesting programs use when harvesting email addresses, the email address that is part of the anchor, link, or mailto element will be replaced with the script, which cannot be interpreted by most automated email address harvesting programs. Thus, the email address will be protected from being harvested thereby reducing the amount of unsolicited email to that email address.

Referring back to FIG. 17, if at block 1745 it is determined that the token is not a scramble type, then flow moves to block 1755. At block 1755, the proxy server 120 determines whether the token is a server side defined modification (SSDM) token, defined by a web administrator of the requested domain. If it is, then flow moves to block 1760 where the proxy server 120 reads the modification rules associated with the token and acts accordingly. Flow moves from block 1760 back to block 1730.

While FIG. 17 was described with reference to replacing structured data (an email address) with an obfuscation script, some client network applications are incapable of executing the script or have disabled scripts from being executed. In one embodiment, if the obfuscation script cannot execute, the email address simply will not be displayed on the rendered page. There are multiple ways of determining whether a client network application is incapable of executing scripts or has disabled scripts from being executed (e.g., if a script was known to be added to a page and was not called, if content wrapped in a <noscript> tag was called, a user-agent is of a type that does not have scripting enabled, etc.). By way of example, in some embodiments, the resource modification module 275 modifies the page to include a <noscript> tag (if one does not exist in the original page) that is used to provide an alternative mechanism for handling structured data for those visitors that have disabled scripts from executing in their client network application or are using a client network application that does not support scripts. The content included in the <noscript> tag for handling structured data may be different in different embodiments. For example, the content within the <noscript> tag can include an obfuscation mechanism (e.g., spelling the symbols of the email address, replacing the ASCII characters with their digital equivalent, replacing the email of the email address with an image of the email address, etc.). As another example, the content within the <noscript> tag can include information that the email address has been removed, a link to another page may (selecting the link may redirect the visitor to pass an additional test such as a CAPTCHA before displaying the email address to the visitor), or a contact form whose contents are relayed to the email address which may also require a successful CAPTCHA before relaying the data input into the contact form.

Figure 19:
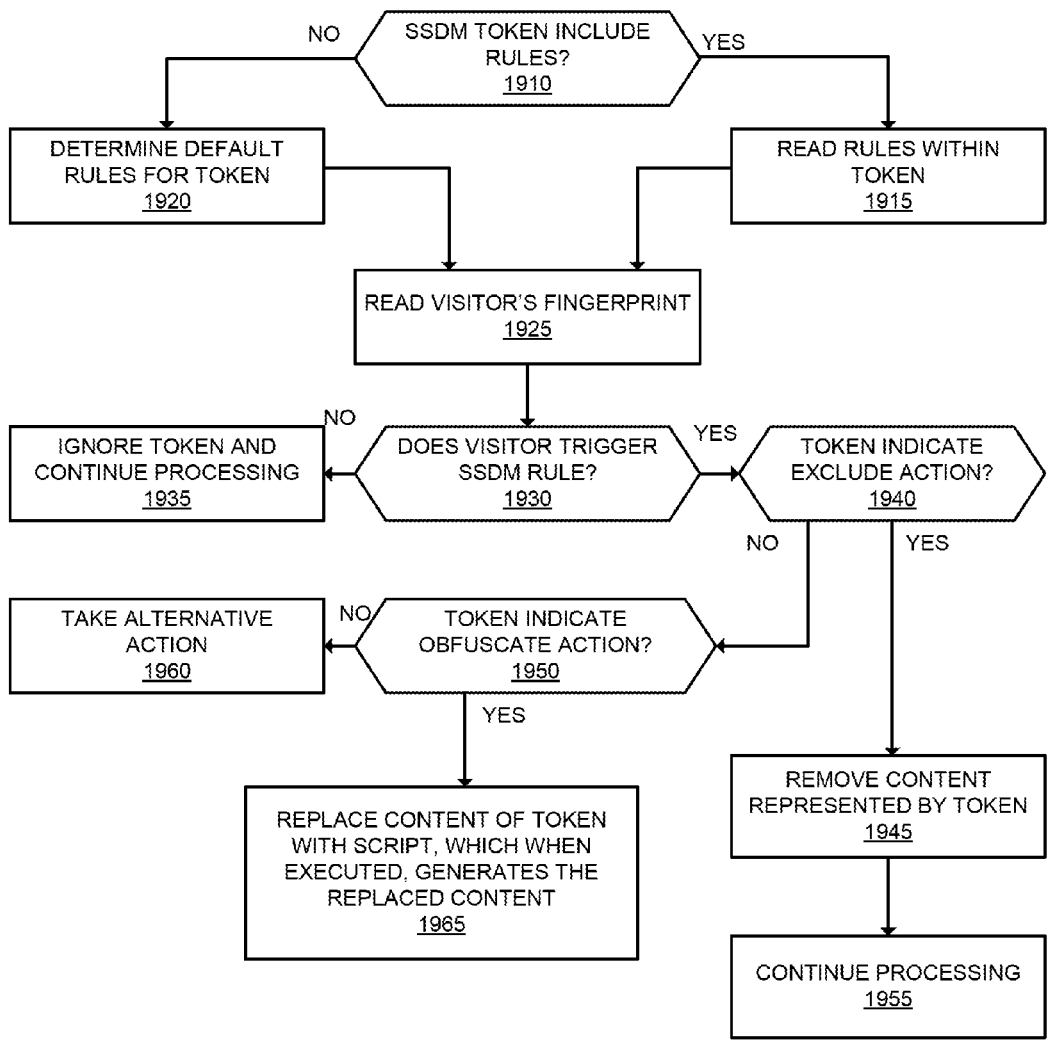
FIG. 19 is a flow diagram illustrating exemplary operations for processing server side defined modification tokens according to one embodiment of the invention.

FIG. 19 is a flow diagram illustrating exemplary operations for processing server side defined modification tokens according to one embodiment. In some embodiments, each server side defined modification token is defined with a set of one or more default modification rules set by the customers. For example, each customer may set default modification rules through the system server 125 that specify the conditions on which a visitor will be subject to the rule and how to modify the content represented by the token if the rule is triggered. These default rules may be different for different domains and/or files of the domain. These default rules may also be overridden by including rules within a SSDM token. Examples of modification rules include the following:

modify the content for certain visitor IP addresses (e.g., IP addresses of search engines or other crawlers, modify the content for IP addresses of certain location(s) (e.g., countries)), modify the content for visits at a particular time of day; modify the content for IP addresses of a particular range; modify the content when a threat score of the visitor is above a defined threshold, and modify the content for identified operating systems of visitors. Customers may define modification rules that override the default rules, and may include them within the SSDM token. Thus, at block 1910, the proxy server 120 determines whether the SSDM token itself includes one or more modification rules. If the SSDM token includes a modification rule, then flow moves to block 1915; otherwise flow moves to block 1920. At 1915, the rules are read from within the token and override the default rules. At 1920, the default modification rules are determined for the particular SSDM token. Flow moves from both 1915 and 1920 to 1925.

At block 1925, the proxy server 120 reads the fingerprint of the visitor's client network application. Flow then moves to block 1930 where the proxy server 120 determines whether, based on the visitor characteristics, whether the visitor triggers application of one or more of the modification rules for the SSDM token. If the visitor does not trigger application of a rule, then flow moves to block 1935 where the token is ignored and processing continues (e.g., flow moves back to block 1730 of FIG. 17). If the visitor does trigger application of one or more rules, then flow moves to block 1940.

According to one embodiment, each SSDM token indicates an action to take, where the action may be specified in the corresponding modification rule. An exclude action will exclude the content represented by the token from the response to the visitor. An obfuscate action will replace the content represented by the token with a script, which when executed, generates the replaced content to prevent automated bots from easily being able to read that content. At block 1940, the proxy server 120 determines whether the token indicates an exclude action. If it is, then flow moves to block 1945; otherwise flow moves to block 1950.

At block 1945, the proxy server 120 removes the content represented by the SSDM token. For example, the HTML between the opening and closing tag of the token is removed. Flow then moves to block 1955 where processing continues (e.g., flow moves back to block 1730 of FIG. 17).

At block 1950, the proxy server 120 determines whether the SSDM token indicates an obfuscate action. If it does not, then flow moves to block 1960 where alternative action is taken (e.g., no action is performed on the content represented by the token and processing continues, or a visitor defined action is performed on the content). If the token indicates an obfuscate action, then flow moves to block 1965 where the proxy server 120 replaces the content represented by the token with a script which, when executed, generates the content that was replaced. The script operates such that human users will be able to read the content when the script is executed, yet it is difficult for automated bots to read that content. Thus, defining portions of the content as wrapped in a SSDM token with an obfuscate action effectively hides that content for those visitors that trigger the modification rule. Flow then moves to block 1955 where processing continues.

Referring back to FIG. 17, if the token is not a SSDM token, then flow moves to block 1758 where the proxy server 120 determines whether the token is an advertisement token. In one embodiment, to determine whether the HTML includes advertisement tokens, the proxy server 120 examines the HTML using a regular expression or other standard search technique in order to find keywords that indicate the presence of advertising. An advertising keyword is a string of characters for an advertising network, which may be specific to an advertising network, that indicates the existence of an advertisement. In some embodiments, advertising keywords for one or more advertising networks are stored at the proxy server 120 (e.g., in an advertisement data structure) or available to the proxy server 120 from a remote database or other device. Sometime after an advertisement keyword is found, the proxy server 120 correlates the keyword with the advertising network in order to determine the size and shape of the advertisement. For example, the advertisement may include location keywords such as "height" and "width" followed by their values. When possible, the proxy server 120 may also determine other attributes of the existing advertising (e.g., color, border, type, etc.).

If a particular advertising network does not provide information about the advertisement within the HTML, the proxy server 120 uses an alternative technique in order to determine the size and shape of the advertisement. For example, in one embodiment, the proxy server 120 loads the URL of the advertisement in a client network application of the proxy server, which can be done either dynamically as the page is returned to a visitor or sometime after the page is returned to a visitor, with the result stored and associated with the particular page and location of the advertisement. If the loaded element is an image, flash object, video object, or other type of displayed object, the client network application of the proxy server 120 calculates the object's height and width based on the metadata within the loaded object. The height and width of the object would then be stored in a data structure (e.g., an advertisement database, which may be specific to the proxy server 120 or common to a group of proxy servers of the service) and associated with the page where the advertisement appears. If the page is loaded again in the future, the proxy server 120 can access the advertisement data structure to determine the height and width of the advertisement displayed on the page. The proxy server 120 may periodically resample the underlying advertising image in order to ensure that the size has remained the same.

In other embodiments, instead of searching for advertising keywords defined by advertising networks, the proxy server 120 searches the HTML page for advertising keyword tags defined by the service. For example, a service defined keyword tag instructs the proxy server 120 to include an advertisement of a particular size and shape on the page at a particular position of the page. Thus, rather than replacing an existing advertisement, the proxy server would simply insert an advertisement at a defined position in the page. For example, the tag <!--INSERT_AD_HERE:728×90//--> indicates to the proxy server 120 to insert an advertisement at the location of the tag of the defined size.

Figure 21:
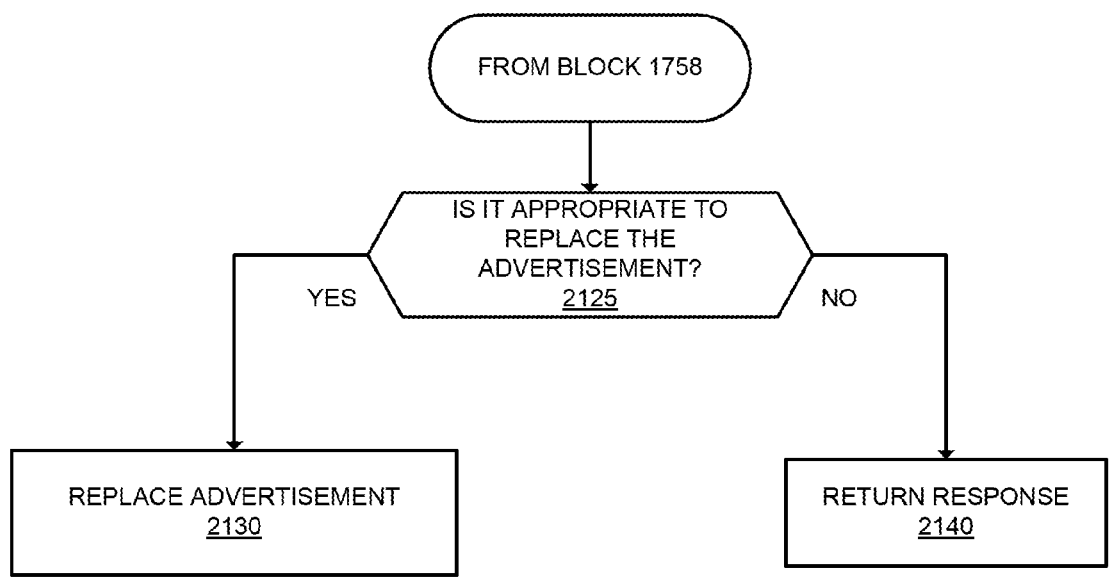
FIG. 21 is a flow diagram illustrating exemplary operations for adding or changing advertisements to requested resources according to one embodiment of the invention.

If an advertisement has been detected, then flow moves to block 2125 of FIG. 21, otherwise flow moves to block 1762 and the proxy server logs the token type (which may be unknown) including any variables or rules that have been included in that token. Flow then moves back to block 1730.

Referring back to block 1710, if the requested resource is not an HTML page, then flow moves to block 1765 where the proxy server determines whether the requested resource is a type that can potentially be harmful to the client device (e.g., capable of containing malicious code (e.g., virus, worm, malware, etc.)). For example, executable files are potentially harmful to the client device. If the requested resource is not potentially harmful, then flow moves to block 1770 where the requested response is transmitted to the client device. However, if the requested resource is potentially harmful, then flow moves to block 1775.

At block 1775, the proxy server 120 scans the requested resource for threats (e.g., viruses, worms, malware, etc.) and flow moves to block 1780. If a threat is not detected, then flow moves to block 1770 and the requested resource is transmitted to the client device. If a threat is detected, however, then flow moves to block 1785 where alternative action is taken (e.g., the response is blocked and the visitor and/or domain owner may be notified).

Adding Content to the Response

In some embodiments, the proxy server 120 adds content to the response 162 before delivering it to a client device 110. By way of example, a customer may configure the service to add content for only certain demographics (e.g., operating system type, client network application type, country of origin, time of day, number of times they have previously visited the site, etc.) and/or only for a certain percentage of visitors (the percentage being definable by the customer and/or the service).

In some embodiments the proxy server 120 adds a trap email address and/or a trap form to the response 162. A trap email address is an email address that is not used for any real email and is unique to a particular IP address and session (thus the email address will not be known or valid to different sessions and/or visitors).

Figure 20:
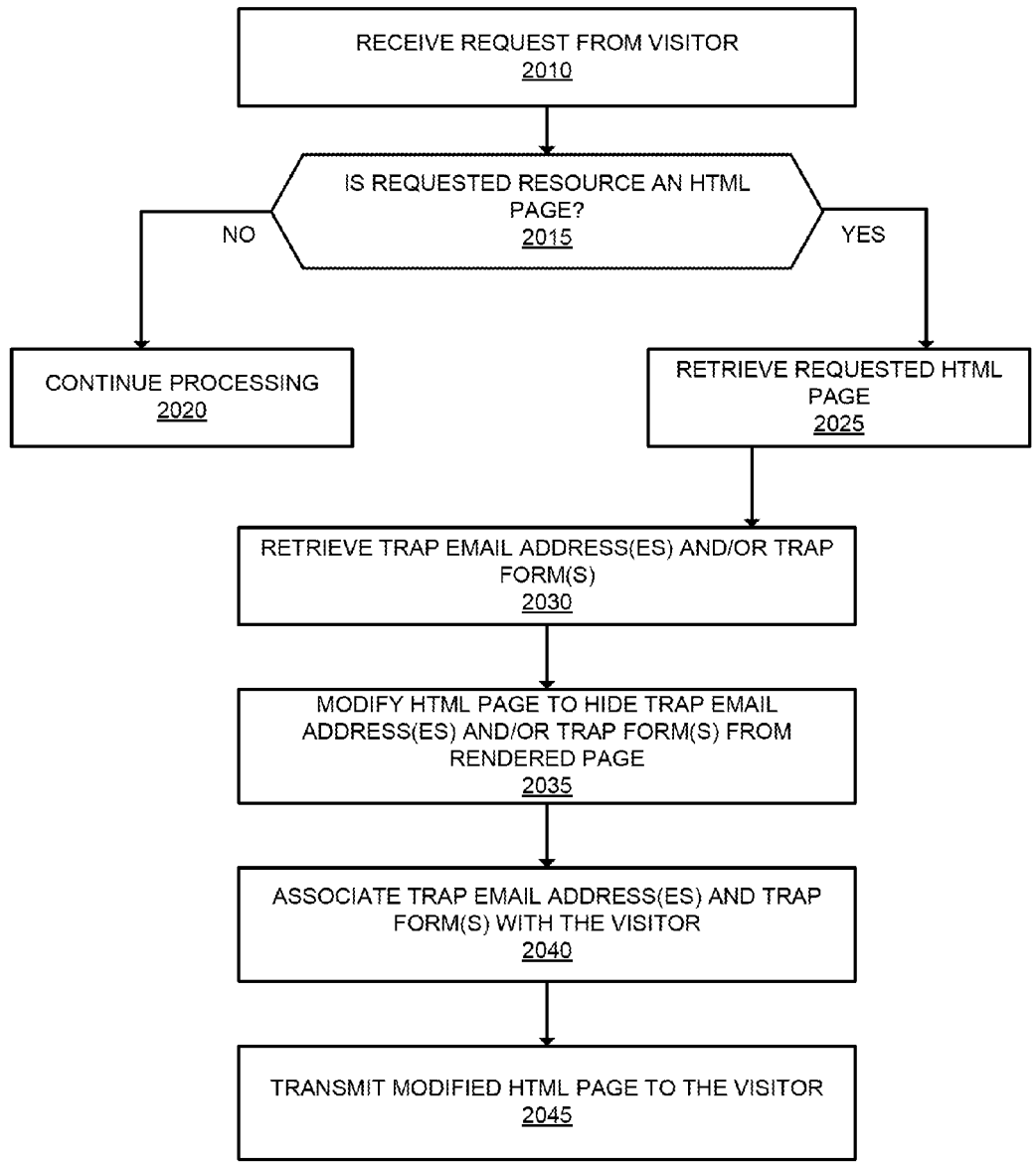
FIG. 20 is a flow diagram illustrating exemplary operations for adding trap email address(es) and/or trap form(s) to the content of a response according to one embodiment of the invention.

FIG. 20 is a flow diagram illustrating exemplary operations for adding trap email address(es) and/or trap form(s) to the content of a response according to one embodiment. At block 2010, the proxy server receives a request for content. Flow then moves to block 2015, where the proxy server 120 determines whether the requested resource is an HTML page. If it is not, then flow moves to block 2020 where content will not be added and processing continues as normal (e.g., the requested resource will be transmitted to the client device). If the requested resource is an HTML page, then flow moves to block 2025 where the proxy server retrieves the requested HTML page. The retrieval of the HTML page may be from either the cache 122 or from the appropriate origin server. Flow moves from block 2025 to block 2030.

At block 2030, the proxy server 120 retrieves one or more trap email addresses and/or one or more trap forms to add to the HTML page. In one embodiment, the available trap email addresses and trap forms are stored in a trap database. Flow then moves from block 2030 to block 2035 where the HTML page is modified to include the trap email address(es) and/or trap form(s) in such a way that they are hidden from human users when viewing the rendered page but are capable of being read, captured, and/or used when scanning/viewing the source page.

The trap email address(es) and/or trap form(s) can be hidden from human users in a number of ways. For example, CSS can be used to mark a particular portion of code as having display=none or display=hidden. Alternatively, CSS can be used to move the link off the page (<a href="http://www.example.com/" style="position: absolute; left: -250px; top: -250px;">Some Hidden Link</a>). A tag can be included with no contents (e.g., <a href="http://www.example.com"></a>). Content can be included in a comment (e.g., <!--<a href="www.example.com">Some Hidden Link</a><//--!>). A script can be used to hide a link after it has been rendered. A link can be wrapped around a single-pixel, or extremely small, image. It should be understood that these are exemplary techniques and other techniques may be used to include links in a page that is visible to bots but hidden from humans.

Thus, unless a human user views the source of the HTML page, the user will not notice or know that the trap email address(es) and/or trap form(s) have been added to the content. However, bots, which scan the source of the HTML page when operating, will be able to harvest the email address(es) in the source and attempt to POST data through the trap form(s) in the source.

Flow moves from block 2035 to block 2040 where the proxy server 120 associates the added trap email address(es) and/or trap form(s) with the visitor and the visit. For example, the proxy server 120 records characteristics of the visitor (e.g., IP address, session information, etc.) and associates them with the trap email address(es) and/or trap form(s) that were added to the HTML page. Thus, the added trap email address(es) and/or trap form(s) are unique to the visitor. Accordingly, if an email is received at an account corresponding to a trap email address added to the content, there is a strong likelihood that the visitor was responsible for sending that email. Similarly, if data has been input using a trap form that was added to the content, there is a strong likelihood that the visitor was responsible for that input. Flow then moves to block 2045 where the modified HTML page is transmitted to the visitor.

In some embodiments, the proxy server 120 adds and/or changes advertisements to the response 162. FIG. 21 is a flow diagram illustrating exemplary operations for adding or changing advertisements to requested resources according to one embodiment. In some embodiments, the customers choose whether pages from their domain are capable having their advertisements changed and/or changing other content on the page such as adding links around keywords (e.g., search keywords of high value) and/or replacing token links to add affiliate marketing program codes. In one embodiment, the operations described in FIG. 21 start from block 1758 of FIG. 17 (e.g., an advertisement token has been detected in the HTML content).

At block 2125 (an advertisement has been detected), the proxy server 120 determines whether it is appropriate to replace the advertisement. If it is appropriate, then flow moves to block 2130, otherwise flow moves to block 2135. In one embodiment, the proxy server 120 determines this based on whether it has access to an alternative advertisement of the same size and whether the replacement advertisement would generate more revenue (e.g., to the service and/or the customer) than the original advertisement. For example, the proxy server 120 accesses an advertisement data structure to determine whether there are any other advertisements available (e.g., as stored in the advertisement data structure) that match the height and width of the existing advertisement. If there are existing advertisements available that match, the system then checks the price that the advertisement would generate. This price may be determined based on a number of factors including the characteristics of the particular visitor to the page (e.g., the geographic location, any information about the demographic profile of the visitor (e.g., operating systems that cost more than others may indicate that the visitor has a relatively high income), etc.), the date and time of the visit, as well as the particular website or webpage being visited.

In one embodiment, the proxy server 120 replaces an existing advertisement only if the revenue that would generated for displaying the replacement advertisement is more than the revenue that would be generated for displaying the existing advertisement. In another embodiment, the proxy server 120 replaces an existing advertisement at anytime the revenue that would be generated by displaying the replacement advertisement was more than a threshold amount, which may be set by the service or by the customer.

At block 2130 (it is appropriate to replace the advertisement), the proxy server 120 replaces the advertisement. In one embodiment, the proxy server 120 modifies the HTML by deleting the reference to the original advertisement including any links to the original advertisement. In another embodiment, the proxy server 120 does not remove the HTML but instead comments it out by adding an opening HTML comment tag before the advertisement object reference and link and after the object reference and link. In another embodiment of the invention, the proxy server 120 rewrites the HTML to add style tags (e.g., style="display: none;") to the HTML elements in order to hide them from being displayed.

After the existing advertising object and link have been removed or hidden, the proxy server 120 replaces the advertising object and link. For example, the proxy server may, in one embodiment, insert a reference to an HTML script object. The HTML script object may refer to a resource that is stored separately from the web page. Once loaded, the referenced script object would call a command to modify the HTML to draw an advertising object and link. In an alternative embodiment, the proxy server 120 does not use a script object tag but, instead, directly references an image, flash object, video, or some other object stored in a location separate from the web page. The proxy server would include this object reference in the HTML and wrap an anchor tag around it in order to create a link to the advertisement. For example, the proxy server may insert:

```
<a href="http://www.example.com/1234567890"><img
src="http://www.example.com/images/ad1.jpg" height="90px"
width="728px"></a>
```

In either of the embodiments, when the HTML of the web page is loaded, the visitor's client network application automatically loads the references to the object references and displays the advertisement on the page.

In an alternative embodiment of the invention, the data to create the image, flash object, video, or other object may be embedded on the page itself. This may be done to prevent ad blocking software running on a visitor's client device from excluding external advertisement references from loading. In such embodiments, the data to make up the image is inserted directly into the HTML of the page, and the visitor's client network application loads the raw byte data of an image or other object without querying an external site or other reference. The data would then be converted into a base form that could be displayed through HTML (e.g., base-64, base-16, base-10, etc.). A tag would be generated including both the encoded byte data and the base it was encoded in. An anchor tag would then be wrapped around the HTML object in order to create a link. The following is an example:

```
<a href="http://www.example.com/1234567890"><img
src="data:image/gif;base64,R0lGODlhEAAOALMAAOazToeHh0tLS/7LZv/0jvb2
9t/f3//Ub//ge8WSLf/rhf/3kdbW1mxsbP//mf///yH5BAAAAAAALAAAAAAQAA4
AAARe8L1Ekyky67QZ1hLnjM5UUde0ECwLJoExKcppV0aCcGCmTIHEIUEqjg
aORCMxIC6e0CcguWw6aFjsVMkkIr7g77ZKPJjPZqIyd7sJAgVGoEGv2xsBxqNg
YPj/gAwXEQA7"></a>
```

Using this method, the advertisement image, flash object, video, or other object would be displayed without referencing a remote system. This avoids the possibility of the remote reference being blocked by an advertising blocker on the visitor's client network application and ensures that the advertisement is displayed.

Assigning Threat Scores for Visitors

The threat database 124 contains information that indicates whether a visitor poses a threat. The information may come from a variety of sources including from customers of the service (e.g., web administrators of the origin servers 130A-L), third party sources, and from the use of the service itself (e.g., from the proxy server 120). In some embodiments, third party information may be used in setting threat scores for visitors. In such embodiments, third party scores for particular IP addresses may be added to customer based scores for those IP addresses to create an overall threat score.

In some embodiments, the service provides functionality for customers of the service to report suspicious activity. For example, the service server 125 provides an interface for the customers of the service to view visitor statistics for their website and report suspicious visitors.

FIG. 23 is a block diagram illustrating an exemplary threat reporting interface 2310 according to one embodiment of the invention. The threat reporting interface 2310 shows visitor characteristics 2315 for recent visitors (e.g., IP address, User-Agent, country of the visitor, previous visits, pages visited, information posted) as reported by the proxy server(s). The threat reporting interface 2310 includes the threat button 2325, which when selected, reports the corresponding visitor as a threat. The threat reporting interface 2310 also includes the not threat button 2330, which when selected, reports the corresponding visitor has not a threat. In some embodiments, the type of threat may also be provided. For example, FIG. 24 illustrates an exemplary threat type form 2410 which allows the type of threat (e.g., attack POST, excessive bandwidth, vulnerability, or other threat) to be selected and submitted through the submit button 2415.

Figure 22:
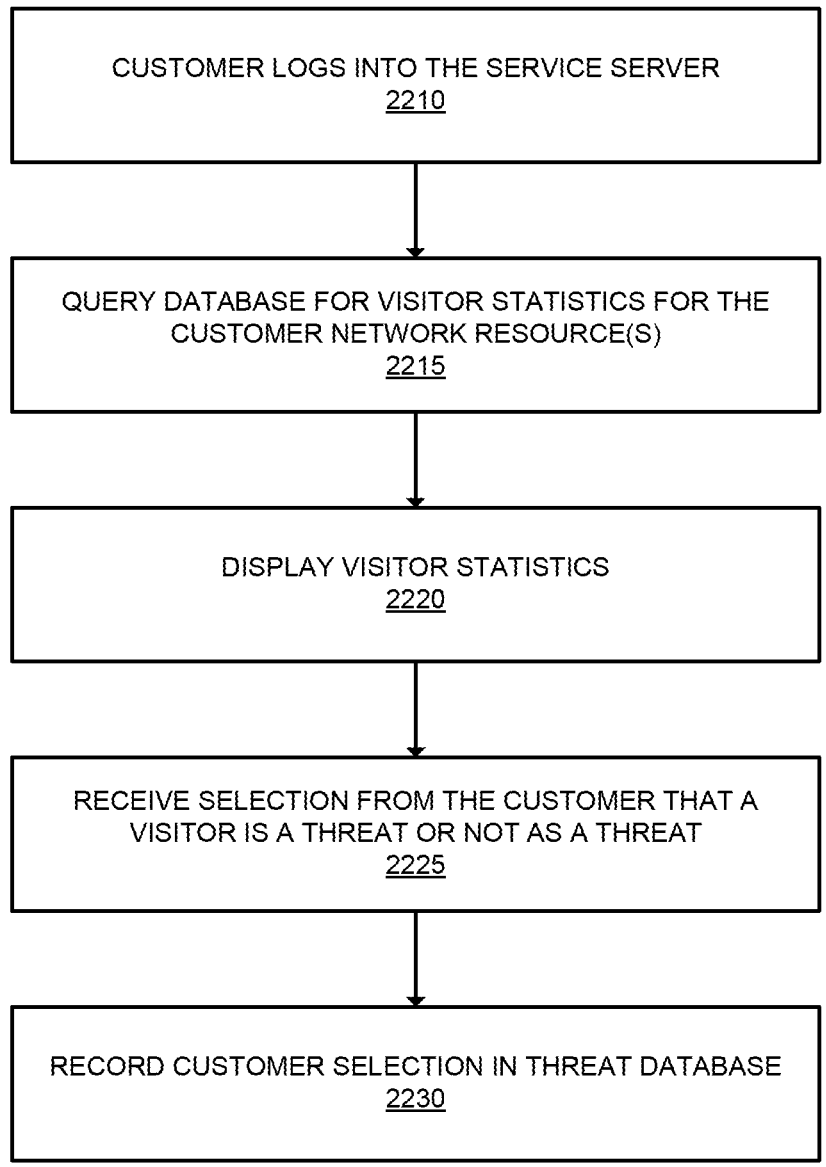
FIG. 22 is a flow diagram illustrating exemplary operations for a customer of the service to input threat information about one or more visitors according to one embodiment of the invention.

FIG. 22 is a flow diagram illustrating exemplary operations for a customer of the service to input threat information about one or more visitors according to one embodiment. At block 2210, a customer logs into the service server 125 (e.g., by providing their username and password). Flow then moves to block 2215, where the service server 125 queries for the visitor statistics for the network resources of the customer. For example, the service server 125 queries the event log database 126 for the visitor statistics of the customer. Flow then moves to block 2220, where the visitor statistics are displayed to the customer (e.g., displayed in an interface similar to the exemplary interface of FIG. 23). The displayed statistics may be sorted by customer preferences or a default value (e.g., most recent visitors, biggest threat, etc.). Flow then moves to block 2225, where the service server 125 receives a selection from the customer that a visitor is a threat or is not a threat. Flow then moves to block 2230 where the service server 125 records the customer selection in the threat database 124. For example, if the customer indicated that a visitor is a threat, the service server 125 may populate the IP address of the visitor to one or more restricted lists (e.g., the global restricted IP address list and/or the local restricted IP address list).

Figure 25:
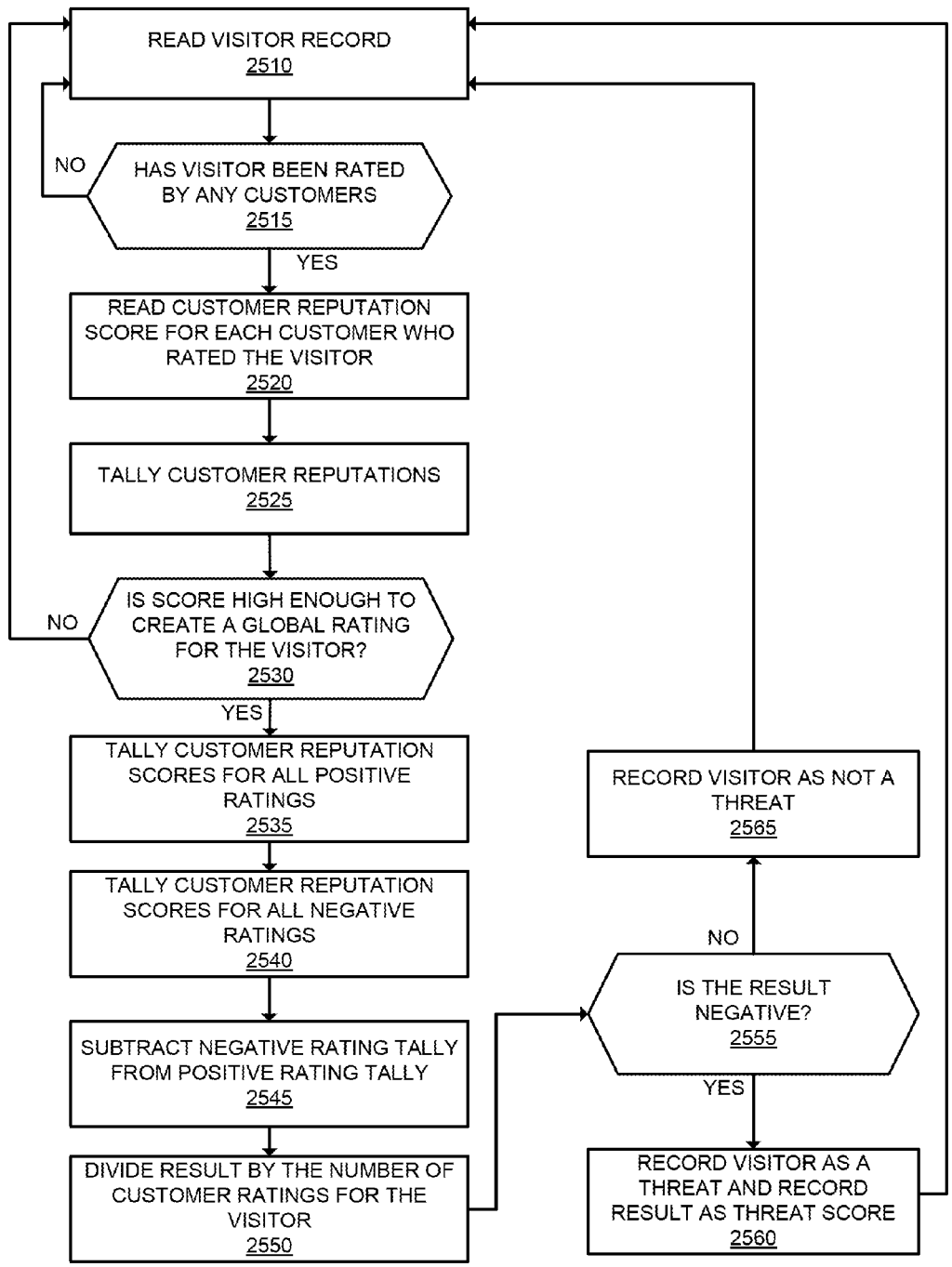
FIG. 25 is a flow diagram illustrating exemplary operations for using customer defined threat information to assign threat scores to visitors according to one embodiment of the invention.

In some embodiments, the visitors are assigned a threat score, which is used to determine whether a visitor should be included on a restricted list. The threat score may depend on ratings from the customers of the service. FIG. 25 is a flow diagram illustrating exemplary operations for using customer defined threat information to assign threat scores to visitors. According to one embodiment, the service server 125 periodically performs the operations illustrated in FIG. 25. While the operations of FIG. 25 are described with reference to the service server 125, in other embodiments of the invention the proxy servers of the service can perform the operations.

At block 2510, the service server 125 reads a visitor record from the event log database 126 for an IP address and/or the global cookie, which may include rating(s) from customer(s) (e.g., threat or not a threat). Flow moves to block 2515 where the service server 125 determines whether the visitor has been rated by any customers. If no, then flow moves back to block 2510 where another visitor record is read (if appropriate). If yes, then flow moves to block 2520 where the service server 125 reads the customer reputation score for each customer who rated the visitor. A customer reputation score indicates the relative trustworthiness of a customer that is submitting visitor ratings. A higher customer reputation score indicates more trustworthiness (and thus more weight to the visitor rating) than a lower customer reputation score. An exemplary way of calculating a customer reputation score is described in FIG. 26. Flow next moves to block 2525 where the service server 125 adds the customer reputations together. Flow moves from block 2525 to block 2530.

At block 2530, the service server 125 determines whether the sum of the customer reputations is enough to create a global rating for the visitor (e.g., whether it the sum is above a customer reputations threshold). It should be understood that a relatively small value of the customer reputations sum may not be sufficient to create a valuable global rating (i.e., there may not be sufficient data to make a global judgment on the visitor). The specific value of the customer reputations threshold may be based on empirical evidence. If the sum of the customer ratings is enough to create a global rating, then flow moves to block 2535, otherwise flow moves back to block 2510 where another visitor record is read.

At block 2535, the customer reputation scores are tallied for all positive ratings of the visitor. It should be understood that it is possible that the visitor does not have a positive rating and thus no customer reputation scores to tally in block 2535. Next, flow moves to block 2540 where the customer reputation scores are tallied for all negative ratings of the visitor. It should be understood that it is possible for the visitor to not have a negative rating, and thus no customer reputation scores to tally in block 2540. Flow then moves to block 2545 where the negative rating tally is subtracted from the positive rating tally to produce a result. Flow then moves to block 2550 where the result is divided by the number of customer ratings for the visitor. Flow then moves to block 2555.

At block 2555, the service server 125 determines whether the result is negative. If it is, then flow moves to block 2560 where the visitor is recorded as a threat (e.g., the IP address is placed on the global restricted IP address list) and the result (which may be normalized) is the threat score for the visitor The threat score may also be modified based on other factors. If the result is not negative, then flow moves to block 2565 where the visitor is recorded as not a threat (e.g., if included, the IP address is removed from the global restricted IP address list). Flow moves from block 2560 and 2565 back to block 2510.

Figure 26:
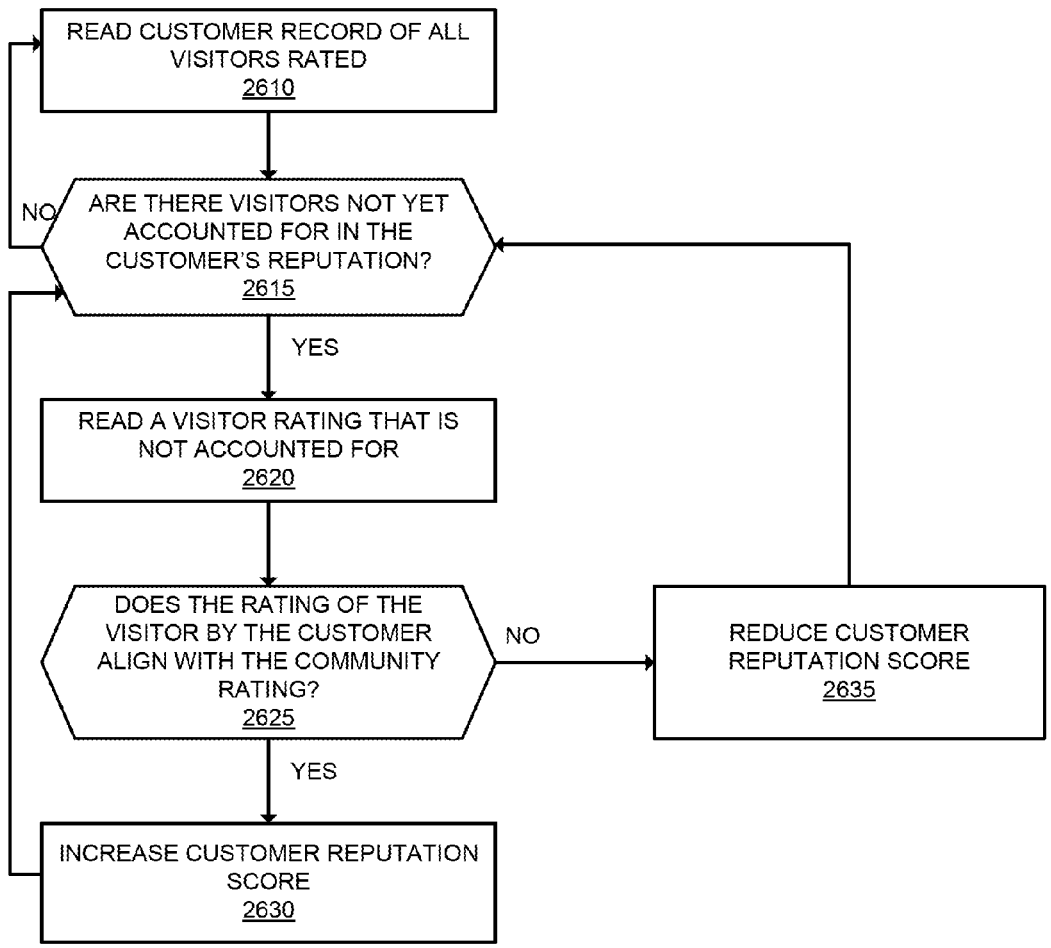
FIG. 26 is a flow diagram illustrating exemplary operations for calculating a customer reputation score according to one embodiment of the invention.

FIG. 26 is a flow diagram illustrating exemplary operations for calculating a customer reputation score according to one embodiment. FIG. 26 will be described in reference to the service server 125; however in other embodiments the operations described in reference to FIG. 26 can be performed by the proxy servers of the service. At block 2610, the service server 125 reads a customer record for all the visitors that the customer has rated. Flow then moves to block 2615 where the service server 125 determines whether there are visitors that have been rated that have not yet been accounted for in the customers reputation. In one embodiment, a bit or flag is set for each visitor regarding whether it has been accounted for in the customers reputation, which may expire after a certain amount of time. If there are rated visitors that have not yet been accounted for, flow moves to block 2620, otherwise flow moves back to block 2610 and another customer record is read (if appropriate).

At block 2620, the service server 125 reads a visitor rating that is not accounted for in the customers reputation score. Flow then moves to block 2625 where the service server 125 determines whether the rating of the visitor (e.g., threat or no threat) aligns with the community rating (e.g., determined through the operations described in FIG. 25). If the customer rating does not align with the community rating, then flow moves to block 2635 where the customer reputation score is reduced by an amount. Thus, the customer's reputation score will be reduced when it has rated a visitor that does not align with the community rating. If the customer rating aligns with the community rating, then flow moves to block 2630 where the customer reputation score is increased by an amount. Thus, the customer's reputation score will be increased when it has rated a visitor that aligns with the community rating. Flow moves from block 2630 and 2635 back to block 2615.

Figure 27:
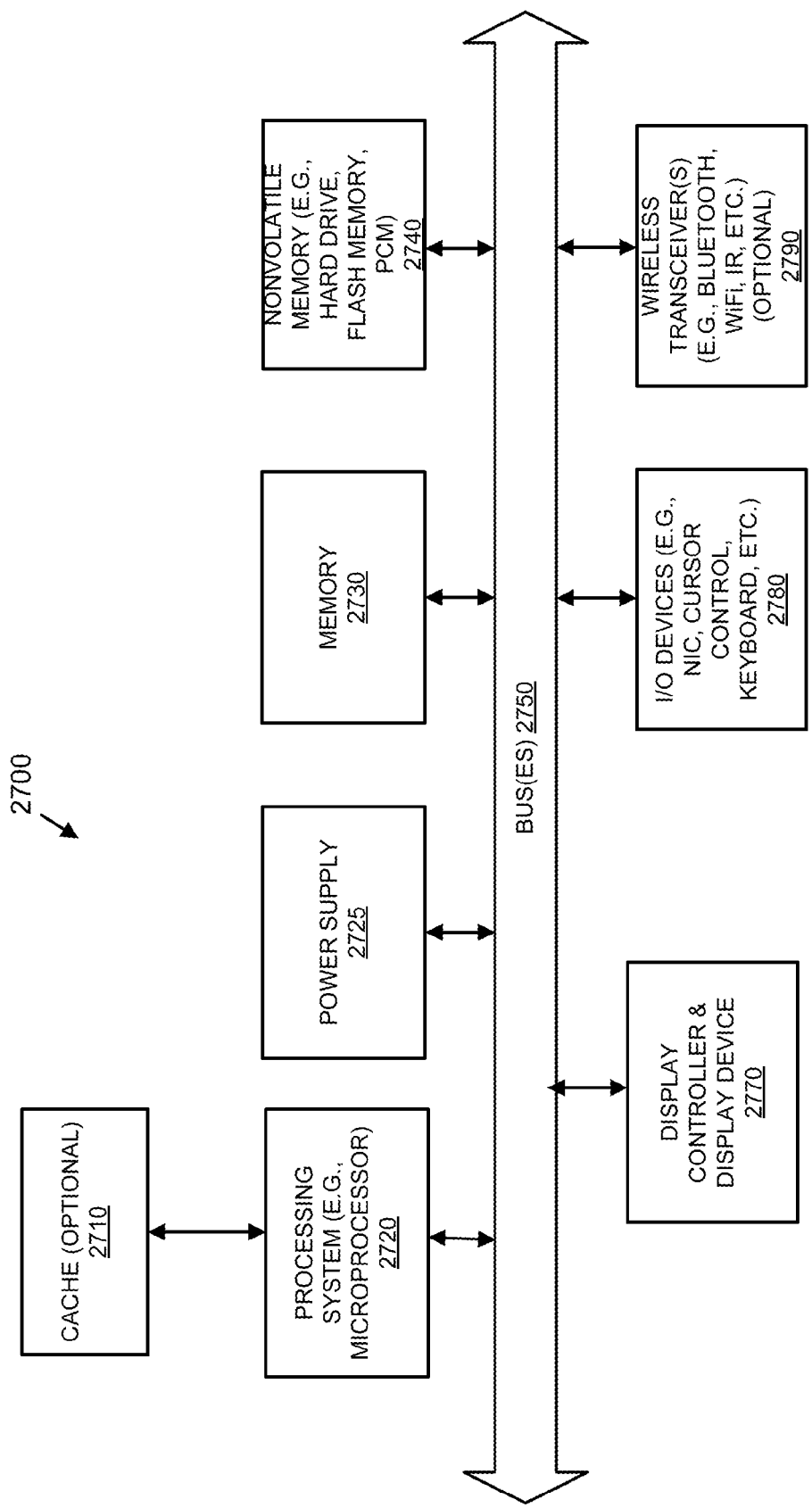
FIG. 27 is a block diagram illustrating an exemplary computer system according to one embodiment of the invention.

As illustrated in FIG. 27, the computer system 2700, which is a form of a data processing system, includes the bus(es) 2750 which is coupled with the processing system 2720, power supply 2725, memory 2730, and the nonvolatile memory 2740 (e.g., a hard drive, flash memory, Phase-Change Memory (PCM), etc.). The bus(es) 2750 may be connected to each other through various bridges, controllers, and/or adapters as is well known in the art. The processing system 2720 may retrieve instruction(s) from the memory 2730 and/or the nonvolatile memory 2740, and execute the instructions to perform operations described herein. The bus 2750 interconnects the above components together and also interconnects those components to the display controller & display device 2770, Input/Output devices 2780 (e.g., NIC (Network Interface Card), a cursor control (e.g., mouse, touchscreen, touchpad, etc.), a keyboard, etc.), and the optional wireless transceiver(s) 2790 (e.g., Bluetooth, WiFi, Infrared, etc.). In one embodiment, the client devices 110A-I, the service server 125, the proxy server 120, the validating domain server 180, and/or the origin servers 130A-L can take the form of the computer system 2700.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In some embodiments, different aspects of the service are disabled during periods of heavy load on particular proxy servers and/or the service as a whole. For example, to disable the features, the zone file records for the domains may be changed such that DNS resolution requests for the domains owned by the domain owners 135A-L, which correspond with the origin servers 130A-L respectively, resolve back to the appropriate origin servers instead of the proxy server 120. This may occur on a proxy server by proxy server basis, globally across all proxy servers in the service, or any combination thereof. In one embodiment, the DNS zone file records are changed automatically without input from the customer domain owners (e.g., the service server 125 records the original zone file information when the customers initially changed their DNS zone file records). It should be understood that once the zone file records are changed, requests will be transmitted directly to the origin web servers and thus the caching service, the threat analysis/blocking service, analytical service, etc., that is provided by the service will not be available.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server for limiting Internet connection speed of visitors that pose a threat, comprising:
   receiving, from a client device, a request to perform an action on an identified resource that is hosted at an origin server for a domain as a result of a DNS (Domain Name System) request for the domain resolving to the proxy server, wherein the origin server is one of a plurality of origin servers that belong to different domains that resolve to the proxy server and are owned by different entities;
   analyzing the request to determine whether a visitor belonging to the request poses a threat;
   responsive to a determination that the visitor belonging to the request poses a threat, reducing the speed at which the proxy server processes the request while keeping a connection to the client device open;
   determining whether the requested resource is available in cache;
   responsive to a determination that the requested resource is available in cache, transmitting, at a reduced speed to the client device, a response having the requested resource without transmitting the request to the origin server;
   responsive to a determination that the requested resource is not available in cache, performing the following:
      transmitting the request at a reduced speed to the origin server,
      receiving a response to the request from the origin server, and
      transmitting the response to the client device at the reduced speed; and
   wherein the transmitted response includes a set of one or more false links to one or more false pages of one or more of the different domains of the origin servers such that if the visitor follows one of those false links, the corresponding request is received at the proxy server and processed at the reduced speed and will cause another response to be generated that includes another set of one or more false links to one or more false pages of one or more of the different domains that are processed at the reduced speed in an attempt to occupy that visitor and prevent the visitor from performing suspicious activity on any of the plurality of origin servers that resolve to the proxy server and other origin servers that do not resolve to the proxy server.

2. The method of claim 1, wherein analyzing the request to determine whether the visitor poses a threat includes performing the following:
   determining whether an IP address of the request is on one or more of:
      a global restricted IP address list that identifies IP addresses that are not allowed to access content of any of the plurality of origin servers, and
      a local IP restricted address list that identifies IP addresses that are not allowed to access content of the requested origin server.

3. The method of claim 1, further comprising:
   including, in the response, a mechanism for the visitor to prove their legitimacy and thereby increase their connection speed;
   determining that the visitor has provide their legitimacy; and
   removing the processing of subsequent requests and responses at a reduced speed.

4. The method of claim 1, wherein the set of false links are hidden from a rendered view of the response while being capable of being read and followed by bots that scan a source of the response.

5. A proxy server to limit Internet connection speed of visitors that pose a threat, comprising:
   a memory to store instructions;
   a processor coupled with the memory to process the stored instructions to:
      receive, from a client device, a request to perform an action on an identified resource that is hosted at an origin server for a domain as a result of a DNS (Domain Name System) request for the domain resolving to the proxy server, wherein the origin server is one of a plurality of origin servers that belong to different domains that resolve to the proxy server and are owned by different entities;
      analyze the request to determine whether a visitor belonging to the request poses a threat;
      responsive to a determination that the visitor belonging to the request poses a threat, reduce the speed at which the proxy server processes the request while keeping a connection to the client device open;
      determine whether the requested resource is available in cache;
      responsive to a determination that the requested resource is available in cache, transmit, at a reduced speed to the client device, a response having the requested resource without transmitting the request to the origin server;
      responsive to a determination that the requested resource is not available in cache, perform the following:
         transmit the request at a reduced speed to the origin server, receive a response to the request from the origin server, and transmit the response to the client device at the reduced speed; and wherein the transmitted response includes a set of one or more false links to one or more false pages of one or more of the different domains of the origin servers such that if the visitor follows one of those false links, the corresponding request is received at the proxy server and processed at the reduced speed and will cause another response to be generated that includes another set of one or more false links to one or more false pages of one or more of the different domains that are processed at the reduced speed in an attempt to occupy that visitor and prevent the visitor from performing suspicious activity on any of the plurality of origin servers that resolve to the proxy server and other origin servers that do not resolve to the proxy server.

6. The proxy server of claim 5, wherein the processor to analyze the request to determine whether the visitor poses a threat includes the processor to perform the following:

determine whether an IP address of the request is on one or more of:

a global restricted IP address list that identifies IP addresses that are not allowed to access content of any of the plurality of origin servers, and a local IP restricted address list that identifies IP addresses that are not allowed to access content of the requested origin server.

7. The proxy server of claim 5, wherein the processor is further to process the stored instructions to:

include, in the response, a mechanism for the visitor to prove their legitimacy and thereby increase their connection speed;

determine that the visitor has provide their legitimacy; and remove the processing of subsequent requests and responses at a reduced speed.

8. The proxy server of claim 5, wherein the processor is to include the set of false links in the response such that they are hidden from a rendered view of the response while being capable of being read and followed by bots that scan a source of the response.

9. A non-transitory machine-readable storage medium that provides instructions that, when executed by a processor of a proxy server, cause said processor to perform operations comprising:

receiving, from a client device, a request to perform an action on an identified resource that is hosted at an origin server for a domain as a result of a DNS (Domain Name System) request for the domain resolving to the proxy server, wherein the origin server is one of a plurality of origin servers that belong to different domains that resolve to the proxy server and are owned by different entities;

analyzing the request to determine whether a visitor belonging to the request poses a threat;

responsive to a determination that the visitor belonging to the request poses a threat, reducing the speed at which the proxy server processes the request while keeping a connection to the client device open;

determining whether the requested resource is available in cache;

responsive to a determination that the requested resource is available in cache, transmitting, at a reduced speed to the client device, a response having the requested resource without transmitting the request to the origin server;

responsive to a determination that the requested resource is not available in cache, performing the following:

transmitting the request at a reduced speed to the origin server, receiving a response to the request from the origin server, and transmitting the response to the client device at the reduced speed; and wherein the transmitted response includes a set of one or more false links to one or more false pages of one or more of the different domains of the origin servers such that if the visitor follows one of those false links, the corresponding request is received at the proxy server and processed at the reduced speed and will cause another response to be generated that includes another set of one or more false links to one or more false pages of one or more of the different domains that are processed at the reduced speed in an attempt to occupy that visitor and prevent the visitor from performing suspicious activity on any of the plurality of origin servers that resolve to the proxy server and other origin servers that do not resolve to the proxy server.

10. The non-transitory machine-readable storage medium of claim 9, wherein analyzing the request to determine whether the visitor poses a threat includes performing the following:

determining whether an IP address of the request is on one or more of:

a global restricted IP address list that identifies IP addresses that are not allowed to access content of any of the plurality of origin servers, and a local IP restricted address list that identifies IP addresses that are not allowed to access content of the requested origin server.

11. The non-transitory machine-readable storage medium of claim 9, further comprising:

including, in the response, a mechanism for the visitor to prove their legitimacy and thereby increase their connection speed;

determining that the visitor has provide their legitimacy; and removing the processing of subsequent requests and responses at a reduced speed.

12. The non-transitory machine-readable storage medium of claim 9, wherein the set of false links are hidden from a rendered view of the response while being capable of being read and followed by bots that scan a source of the response.

* * * * *